United States Patent
Yu et al.

(10) Patent No.: US 12,551,478 B2
(45) Date of Patent: Feb. 17, 2026

(54) QUINOLINE DERIVATIVE HAVING INDOLEAMINE-2,3-DIOXYGENASE INHIBITORY ACTIVITY

(71) Applicant: SHENZHEN CHIPSCREEN BIOSCIENCES CO., LTD., Guangdong (CN)

(72) Inventors: Jindi Yu, Shenzhen (CN); Lijun Xin, Shenzhen (CN); Song Shan, Shenzhen (CN); Jiangfei Zhu, Shenzhen (CN); Lin Yang, Shenzhen (CN); Chao Fu, Shenzhen (CN); Zhibin Li, Shenzhen (CN); Xianping Lu, Shenzhen (CN)

(73) Assignee: SHENZHEN CHIPSCREEN BIOSCIENCES CO., LTD., Guangdong (CN)

( * ) Notice: Subject to any disclaimer, the term of this patent is extended or adjusted under 35 U.S.C. 154(b) by 939 days.

(21) Appl. No.: 17/280,395

(22) PCT Filed: Sep. 25, 2019

(86) PCT No.: PCT/CN2019/107690
§ 371 (c)(1),
(2) Date: Mar. 26, 2021

(87) PCT Pub. No.: WO2020/063618
PCT Pub. Date: Apr. 2, 2020

(65) Prior Publication Data
US 2021/0379052 A1    Dec. 9, 2021

(30) Foreign Application Priority Data
Sep. 27, 2018 (CN) .......................... 201811128800.6

(51) Int. Cl.
| | |
|---|---|
| A61K 31/4709 | (2006.01) |
| A61K 31/454 | (2006.01) |
| A61K 31/4725 | (2006.01) |
| A61K 31/517 | (2006.01) |
| A61P 35/00 | (2006.01) |
| C07D 401/12 | (2006.01) |
| C07D 403/12 | (2006.01) |
| C07D 405/14 | (2006.01) |
| C07D 471/04 | (2006.01) |
| C07D 487/04 | (2006.01) |

(52) U.S. Cl.
CPC ........ *A61K 31/4709* (2013.01); *A61K 31/454* (2013.01); *A61K 31/4725* (2013.01); *A61K 31/517* (2013.01); *A61P 35/00* (2018.01); *C07D 401/12* (2013.01); *C07D 403/12* (2013.01); *C07D 405/14* (2013.01); *C07D 471/04* (2013.01); *C07D 487/04* (2013.01)

(58) Field of Classification Search
CPC .............. A61K 31/4709; A61K 31/454; A61K 31/4725; A61K 31/517; A61K 31/4406; A61K 45/06; A61K 2300/00; A61P 35/00; A61P 25/22; A61P 25/24; A61P 25/28; A61P 27/12; A61P 37/00; A61P 37/06; C07D 401/12; C07D 403/12; C07D 405/14; C07D 471/04; C07D 487/04; C07D 401/14; C07D 403/04
See application file for complete search history.

(56) References Cited

U.S. PATENT DOCUMENTS

| | | | | |
|---|---|---|---|---|
| 6,476,046 | B1 * | 11/2002 | Wu ....................... | C07D 471/04 546/113 |
| 7,973,164 | B2 * | 7/2011 | Jung ...................... | A61P 27/02 546/160 |
| 8,889,702 | B2 * | 11/2014 | Abouabdellah ......... | A61P 11/00 514/278 |
| 2009/0176789 | A1 | 7/2009 | Breslin et al. | |
| 2010/0324030 | A1 | 12/2010 | Dale et al. | |
| 2018/0086719 | A1 | 3/2018 | Chandrasekhar et al. | |
| 2018/0086768 | A1 | 3/2018 | Chandrasekhar et al. | |

(Continued)

FOREIGN PATENT DOCUMENTS

| | | |
|---|---|---|
| CN | 101312976 A | 11/2008 |
| CN | 101400674 A | 4/2009 |

(Continued)

OTHER PUBLICATIONS

Huck, B. R. et al. Small Molecules Drive Big Improvements in Immuno-Oncology Therapies. Angewandte Chemie (International ed. in English), 2018. vol. 57(16), 4412-4428. Published Online on Feb. 22, 2018. (Year: 2018).*
Qin, L. et al. Diversity-Oriented Synthesis of Libraries Based on Benzofuran and 2,3-Dihydrobenzofuran Scaffolds. ACS Comb Sci., 2017. vol. 19(6): 370-376. (Year: 2017).*
"Showing metabocard for 2,3-Dihydrobenzofuran (HMDB0013815)". Human Metabolume Database [Online]. Published online on May 2012. Retrieved from Internet <https://www.hmdb.ca/metabolites/HMDB0013815> on Jun. 26, 2025. (Year: 2012).*
European Search Report and Written Opinion, Application No. EP 19 86 5170, May 24, 2022 (11 pages).

(Continued)

*Primary Examiner* — Jean P Cornet
*Assistant Examiner* — Chihyi Lee
(74) *Attorney, Agent, or Firm* — Ware, Fressola, Maguire & Barber LLP

(57) ABSTRACT

Provided is a quinoline derivative having indoleamine-2,3-dioxygenase inhibitory activity, specifically, provided is a compound of general Formula (I) or pharmaceutically acceptable salt thereof, its pharmaceutical composition, preparation method and use in the manufacture of a medicament for immunomodulating and preventing and/or treating of a disease associated with IDO expression abnormality and/or tryptophan metabolism abnormality. Also provided is use of a combination medication of the quinoline derivative and HDAC inhibitor and its use in the manufacture of an anti-tumor drug.

$$A-X-B-Y-M \quad \text{Formula (I)}$$

5 Claims, 6 Drawing Sheets

(56) References Cited

U.S. PATENT DOCUMENTS

| | | | |
|---|---|---|---|
| 2019/0352307 A1 | 11/2019 | Yu et al. | |
| 2020/0138804 A1* | 5/2020 | Parasuraman | C07K 16/2818 |
| 2020/0276180 A1 | 9/2020 | Zhang et al. | |
| 2020/0331887 A1 | 10/2020 | Li et al. | |
| 2021/0047290 A1 | 2/2021 | Wang et al. | |

FOREIGN PATENT DOCUMENTS

| | | |
|---|---|---|
| CN | 102382065 A | 3/2012 |
| CN | 103547579 A | 1/2014 |
| CN | 101932325 B | 5/2014 |
| CN | 102579452 B | 5/2014 |
| CN | 105732636 A | 7/2016 |
| CN | 106459083 A | 2/2017 |
| CN | 107663159 A | 2/2018 |
| CN | 110156656 A | 8/2019 |
| CN | 110540521 A | 12/2019 |
| EP | 2796460 A1 | 10/2014 |
| EP | 3287461 A1 | 2/2018 |
| JP | 2009501135 A | 1/2009 |
| JP | 2009506061 A | 2/2009 |
| JP | 2015500845 A | 1/2015 |
| JP | 2017537080 A | 2/2017 |
| JP | 2018513145 A | 5/2018 |
| JP | 2018527398 A | 9/2018 |
| WO | 2006135721 A1 | 12/2006 |
| WO | 2007025069 A2 | 3/2007 |
| WO | 2007061978 A1 | 5/2007 |
| WO | 2007105154 A2 | 9/2007 |
| WO | 2009073620 A2 | 6/2009 |
| WO | 2012142237 A1 | 10/2012 |
| WO | 2014039714 A2 | 3/2014 |
| WO | 2015185208 A1 | 12/2015 |
| WO | 2016073770 A1 | 5/2016 |
| WO | 2016100157 A2 | 6/2016 |
| WO | 2017053243 A1 | 3/2017 |
| WO | 2017112768 A1 | 6/2017 |
| WO | 2017192840 A1 | 11/2017 |
| WO | 2017192844 A1 | 11/2017 |
| WO | 2018113624 A1 | 6/2018 |
| WO | 2018136437 A2 | 7/2018 |
| WO | 2019057123 A1 | 3/2019 |
| WO | 2019078968 A2 | 4/2019 |
| WO | 2019129114 A1 | 7/2019 |
| WO | 2019158051 A1 | 8/2019 |

OTHER PUBLICATIONS

International Search Report and Written Opinion and English Translations from PCT/CN2019/107690, mailed Dec. 24, 2019 (29 pages).

Friberg et al., "Indoleamine 2,3-dioxygenase contributes to tumor cell evasion of T cell-mediated rejection", 101 Int. J. Cancer 151-155, Jun. 2002 (5 pages).

Leklem, "Quantitative aspects of tryptophan metabolism in humans and other species: a review", 24 The American Journal of Clinical Nutrition 659-672, Jun. 1971 (15 pages).

Yamamoto et al. "Tryptophan Pyrrolase of Rabbit Intestine", The Journal of Biological Chemistry, vol. 242, Iss. No. 22, pp. 5260-5266, Nov. 1967 (7 pages).

MacKenzie et al., "Role of Indoleamine 2,3-Dioxygenase in Antimicrobial Defence and Immuno-Regulation: Tryptophan Depletion Versus Production of Toxic Kynurenines", Current Drug Metabolism, vol. 3, Iss. No. 3, pp. 237-244, 2007 (9 pages).

King et al., "Molecules in focus: Indoleamine 2,3-dioxygenase", 39 The International Journal of Biochemistry and Cell Biology 2167-2172, 2007 (6 pages).

Roy et al. "Neuronal localization of indoleamine 2, 3-dioxygenase in mice", 387 Neuroscience Letters 95-99, Jul. 2005 (5 pages).

Takikawa et al., "Indoleamine 2,3-dioxygenase in the Human Lens, the First Enzyme the Synthesis of UV Filters", 72 Exp. Eye Res. 271-277, 2001 (7 pages).

RN 1060495-78-4, STN Registry, Oct. 13, 2008 (2 pages).

Office Action, Application No. JP 2021-542247, Nov. 24, 2023, (8 pages).

Decision to Grant, Application No. JP 2021-542247, Feb. 29, 2024, (6 pages).

* cited by examiner

QUINOLINE DERIVATIVE HAVING INDOLEAMINE-2,3-DIOXYGENASE INHIBITORY ACTIVITY

CROSS-REFERENCE TO RELATED APPLICATIONS

The present application is a U.S. National Stage Entry of PCT/CN2019/107690, which is based on the application with CN application number of 201811128800.6 and application date of Sep. 27, 2018, and claims the benefit of priority thereof. The disclosure of this CN application is hereby incorporated by reference as if set forth in its entirety.

TECHNICAL FIELD

The present application relates to the field of medicine, in particular to a quinoline derivative having indoleamine 2,3-dioxygenase (IDO) inhibitory activity or a pharmaceutically acceptable salt thereof, and its pharmaceutical composition, preparation method and use in the manufacture a medicament for immune regulation and prevention and/or treatment of a disease associated with IDO expression abnormality and/or tryptophan metabolism abnormality. The present application also relates to a combination medication of the quinoline derivative and an epigenetic modulator and its use in the manufacture of an anti-tumor drug.

BACKGROUND ART

Tryptophan (Trp) is an essential amino acid for human body. Part of the tryptophan obtained from the diet is used to synthesize protein, niacin and neurotransmitter serotonin, while the rest is mainly metabolized through the kynurenine pathway (Leklem J. E, Am J Clin Nutr, 1971, 24 (6): 659-672). IDO is a key enzyme involved in this metabolic pathway.

IDO is an enzyme containing heme in cells, which was first discovered in the intestine of rabbits in 1967 (Yamaoto S. et al., J Biol Chem, 1967, 242(22): 5260-5266), and is the only enzyme outside the liver that is capable of catalyzing the rate-limiting step of oxygenolysis of the indole ring in tryptophan molecule to undergo catabolism along the kynuric acid pathway (MacKenzie, C R et al. Current Drug Metabolism, 2007, 8: 237-244).

The expression of IDO in cells and tissues is related to various inflammatory cytokines, especially IFN-γ, and others such as IFN-α, IFN-β, TNF-α and LPS which stimulate the expression of IDO at transcriptional level (King N J et al., The Int J Biochem Cell Biol, 2007 39(12): 2167-2172). In addition, other immunological competent molecules such as prostaglandin, cytotoxic T lymphocyte associate protein (CTLA-4), CD40, Toll-like receptor, etc. can also regulate the expression of IDO.

In some studies, it is reported that there are two kinds of IDO namely IDO-1 and IDO-2, and it is mainly IDO-1 that plays the role of immunosuppression, while the role of IDO-2 in immunosuppression is not very clear. There are many factors involved in the mechanism of IDO-1 in immunosuppression, and one of them is that the high expression of IDO-1 causes local L-tryptophan depletion, which is sensed by surrounding T lymphocytes through GCN2 and other mechanisms, causing cell cycle arrest or apoptosis of $CD8^+$ cytotoxic T cells. The second is that the high expression of IDO-1 leads to an increase in tryptophan metabolite kynurenine (Kyn), the generated kynurenine may leave the cells and enter the extracellular matrix, and then enter the nearby lymphocytes to regulate $CD8^+$ T cells and regulatory Treg cells by binding to endogenous aromatic hydrocarbon receptor (AHR), for example, the activity of $CD8^+$ cytotoxic T cells is inhibited, while regulatory Treg cells induce proliferation and are activated, resulting in the suppression of immune activation function (Friberg M. et al., Int J Cancer, 2002, 101(2): 151-155). In addition, IDO-1 on antigen-presenting cells such as macrophages and dendritic cells (DC) can induce immune tolerance of T cell to tumor antigens by inhibiting T cell proliferation (Terness P. et al., Blood, 2005, 105(6): 2480-2486).

IDO is closely related to the pathogenesis of many diseases, and has been proven to be a target for major diseases such as cancers, Alzheimer's disease, depression and cataracts (CN101932325B, CN102579452B). IDO is closely related to neurological diseases (Roy E. J. et al., Neurosci Lett, 2005, 387(2): 95-99). It is also involved in age-related nuclear cataracts (Takikawa O. et al. Exp. Eye Res. 2001, 72:271-277).

Currently, there are three IDO inhibitors in different clinical research stages, including: 1) Epacadostat of Incyte Co., which is in clinical phase II, for the treatment of myelodysplastic syndrome, melanoma and female reproductive system cancer; 2) Indoximod of Newlink Co., which is in clinical phase II, for the treatment of breast cancer, prostate cancer, malignant brain tumor, pancreatic cancer and melanoma; 3) GDC-0919 of Roche Co., which is in clinical phase I, for the treatment of advanced solid tumors.

IDO inhibitors as drugs have good application prospects in the pharmaceutical industry. However, until so far, there is not a suitable IDO inhibitor on the market. In order to achieve better therapeutic effect and fully meet market demands, it is of great theoretical significance and application value to develop a new generation of IDO inhibitors.

Epigenetics is the current hot spot of genetics research, which mainly includes DNA methylation, histone methylation, histone acetylation, phosphorylation and ubiquitination, and the activity of transcription factors involved in binding histone modification sites. These epigenetic changes play an important role in gene transcription regulation. Histones are the basic unit of human chromosomes, and the post-transcriptional modifications of histones play a decisive role in gene expression. The methylation, especially acetylation, of histone lysine or arginine sites, is an important modification method. Extensive studies have shown that the imbalance of acetylation caused by the overexpression of histone deacetylase (HDAC) in cancer cells leads to the occurrence of tumors, while the inhibition of HDAC can well inhibit tumorigenesis.

However, there have not been any related studies and reports on the combination medication of epigenetic modulators and IDO inhibitors in the treatment of tumors or diseases related to tryptophan metabolism.

SUMMARY OF THE DISCLOSURE

In an aspect, the present application provides a compound of general Formula (I) or pharmaceutically acceptable salt thereof, $$A-X-B-Y-M \quad (I)$$

wherein,
A represents a 9- to 15-membered fused aromatic heterocycle containing 1 to 5 heteroatoms selected from the group consisting of nitrogen, oxygen and sulfur; optionally, the fused aromatic heterocycle is substituted with one or more substituents selected from the group consisting of halogen, hydroxyl, amino, $C_{1-6}$ alkyl, $C_{1-6}$ alkoxy, halogenated $C_{1-6}$ alkyl and hydroxyl-substituted $C_{1-6}$ alkyl;

X represents a single covalent bond, —C(R$^1$R$^2$)—,

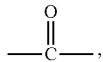

—O—, —O—$C_{1-6}$ alkylene-, —NR$^1$—, —S—, —S(O)— or

wherein R$^1$ and R$^2$ are each independently selected from the group consisting of hydrogen, halogen, hydroxyl, amino, $C_{1-6}$ alkyl, $C_{1-6}$ alkoxy, halogenated $C_{1-6}$ alkyl and hydroxyl-substituted $C_{1-6}$ alkyl;

B represents a 6- to 12-membered polycyclic aliphatic heterocycle containing 1 to 3 heteroatoms selected from the group consisting of nitrogen, oxygen and sulfur;

Y represents

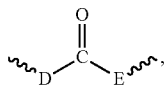

wherein, D represents a single covalent bond or $C_{1-6}$ alkylene, optionally, the $C_{1-6}$ alkylene is substituted with one or more substituents selected from the group consisting of halogen, hydroxyl, amino, $C_{1-6}$ alkyl, $C_{1-6}$ alkoxy, halogenated $C_{1-6}$ alkyl and hydroxyl-substituted $C_{1-6}$ alkyl; E represents a single covalent bond, $C_{1-6}$ alkylene, $C_{2-6}$ alkenylene, —NR$^3$— or —$C_{1-6}$ alkylene-NR$^3$—, wherein, R$^3$ is selected from the group consisting of hydrogen, halogen, hydroxyl, amino, $C_{1-6}$ alkyl, halogenated $C_{1-6}$ alkyl and hydroxyl-substituted $C_{1-6}$ alkyl;

M represents a 6- to 10-membered aromatic ring; 3- to 7-membered aliphatic carbocycle; 5- to 10-membered monocyclic or polycyclic aromatic heterocycle, each of which contains 1 to 4 heteroatoms selected from the group consisting of nitrogen, oxygen and sulfur; 3- to 7-membered saturated or partially unsaturated monocyclic aliphatic heterocycle or 6- to 12-membered polycyclic aliphatic heterocycle, each of which contains 1 to 5 heteroatoms selected from the group consisting of nitrogen, oxygen and sulfur; optionally, the aromatic ring, carbocycle, aromatic heterocycle and aliphatic heterocycle are substituted with one or more substituents selected from the group consisting of halogen, hydroxyl, amino, $C_{1-6}$ alkyl, $C_{2-6}$ alkenyl, $C_{1-6}$ alkoxy, $C_{1-6}$ alkylamino,

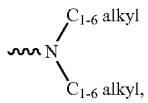

halogenated $C_{1-6}$ alkoxy, hydroxyl-substituted $C_{1-6}$ alkoxy and $C_{1-6}$ alkoxy-substituted $C_{2-6}$ alkenyl.

In another aspect, the present application provides a pharmaceutical composition, comprising the compound or pharmaceutically acceptable salt thereof as disclosed in the present application, and at least one pharmaceutically acceptable carrier or excipient.

In another aspect, the present application provides a combination medication, comprising a first active ingredient and a second active ingredient, and optionally a pharmaceutically acceptable carrier or excipient; wherein, the first active ingredient is selected from the group consisting of the compound or pharmaceutically acceptable salt as disclosed, and other IDO inhibitors; and the second active ingredient is selected from an epigenetic modulator.

In another aspect, the present application provides use of the compound or pharmaceutically acceptable salt thereof, the pharmaceutical composition or the combination medication as disclosed in the manufacture of an immunomodulator or a medicament for preventing and/or treating a disease associated with IDO expression abnormality and/or tryptophan metabolism abnormality.

In another aspect, the present application provides the compound or pharmaceutically acceptable salt thereof, the pharmaceutical composition or the combination medication as disclosed, for use in regulating immunity or preventing and/or treating a disease associated with IDO expression abnormality and/or tryptophan metabolism of an individual.

In another aspect, the present application provides a method for regulating immunity, comprising administering to a subject in need thereof an effective amount of the compound or pharmaceutically acceptable salt thereof, the pharmaceutical composition or the combination medication as disclosed in the present application.

In another aspect, the present application provides a method for preventing and/or treating a disease associated with IDO expression abnormality and/or tryptophan metabolism abnormality, comprising administering to a subject in need thereof an effective amount of the compound or pharmaceutically acceptable salt thereof, the pharmaceutical composition or the combination medication as disclosed in the present application.

In another aspect, the present application provides a method for preparing the compound of general Formula (I) as disclosed, and use of each intermediate involved in the method for preparing the compound of general Formula (I).

Compounds

In an aspect, the present application provides a compound of general Formula (I) or a pharmaceutically acceptable salt thereof,

A-X—B—Y-M       (I)

wherein,

A represents a 9- to 15-membered fused heteroaromatic ring containing 1 to 5 heteroatoms selected from nitrogen, oxygen and sulfur; optionally, the fused heteroaromatic ring is substituted with one or more substituents selected from the group consisting of: halogen, hydroxyl, amino, $C_{1-6}$ alkyl, $C_{1-6}$ alkoxy, halogenated $C_{1-6}$ alkyl and hydroxy-substituted $C_{1-6}$ alkyl;

X represents a single covalent bond, —C(R$^1$R$^2$)—,

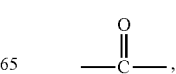

—O—, —O—C$_{1-6}$ alkylene-, —NR$^1$—, —S—, —S(O)— or

wherein R$^1$ and R$^2$ is each independently is selected from the group consisting of hydrogen, halogen, hydroxyl, amino, C$_{1-6}$ alkyl, C$_{1-6}$ alkoxy, halogenated C$_{1-6}$ alkyl and hydroxy-substituted C$_{1-6}$ alkyl;

B represents a 6- to 12-membered polycyclic aliphatic heterocyclic ring containing 1 to 3 heteroatoms selected from the group consisting of nitrogen, oxygen and sulfur;

Y represents

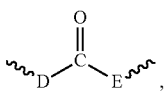

wherein, D represents a single covalent bond or C$_{1-6}$ alkylene, optionally, the C$_{1-6}$ alkylene is substituted with one or more substituents selected from the group consisting of halogen, hydroxyl, amino, C$_{1-6}$ alkyl, C$_{1-6}$ alkoxy, halogenated C$_{1-6}$ alkyl and hydroxy-substituted C$_{1-6}$ alkyl; E represents a single covalent bond, C$_{1-6}$ alkylene, C$_{2-6}$ alkenylene, —NR$^3$— or —C$_{1-6}$ alkylene-NR$^3$—, wherein, the R$^3$ is selected from the group consisting of hydrogen, halogen, hydroxyl, amino, C$_{1-6}$ alkyl, halogenated C$_{1-6}$ alkyl and hydroxy-substituted C$_{1-6}$ alkyl;

M represents a 6- to 10-membered aromatic ring, 3- to 7-membered aliphatic carbocyclic ring, 5- to 10-membered monocyclic or polycyclic aromatic heterocyclic ring containing 1 to 4 heteroatoms selected from the group consisting of nitrogen, oxygen and sulfur, 3 to 7-membered saturated or partially unsaturated monocyclic aliphatic heterocyclic ring or 6- to 12-membered polycyclic aliphatic heterocyclic ring containing 1 to 5 heteroatoms selected from the group consisting of nitrogen, oxygen and sulfur; optionally, the aromatic ring, carbocyclic ring, aromatic heterocyclic ring and aliphatic heterocyclic ring are substituted with one or more substituents selected from the group consisting of: halogen, hydroxyl, amino, C$_{1-6}$ alkyl, C$_{2-6}$ alkenyl, C$_{1-6}$ alkoxy, C$_{1-6}$ alkylamino,

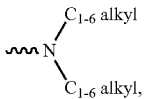

halogenated C$_{1-6}$ alkoxy, hydroxy-substituted C$_{1-6}$ alkoxy and C$_{1-6}$ alkoxy-substituted C$_{2-6}$ alkenyl.

In some preferred embodiments, A represents a 9- to 10-membered fused aromatic heterocycle containing 1 to 2 heteroatoms selected from the group consisting of nitrogen, oxygen and sulfur; optionally, the fused aromatic heterocycle is substituted with one or more substituents selected from the group consisting of halogen, hydroxyl, amino, C$_{1-4}$ alkyl, C$_{1-4}$ alkoxy, halogenated C$_{1-4}$ alkyl and hydroxyl-substituted C$_{1-4}$ alkyl. In some preferred embodiments, A represents a 9- to 10-membered fused aromatic heterocycle containing 1 to 2 nitrogen atoms; optionally, the fused aromatic heterocycle is substituted with one or more substituents selected from the group consisting of halogen, hydroxyl, amino, C$_{1-2}$ alkyl, C$_{1-2}$ alkoxy, halogenated C$_{1-2}$ alkyl and hydroxyl-substituted C$_{1-2}$ alkyl. In some preferred embodiments, A is selected from the following groups optionally substituted with one or more halogens: benzimidazolyl, imidazopyridyl, quinolinyl, isoquinolinyl, cinnolinyl, quinazolinyl, quinoxalinyl and naphthyridinyl. In some preferred embodiments, A is 6-fluoroquinolinyl.

In some preferred embodiments, X represents a single covalent bond, —C(R$^1$R$^2$)—,

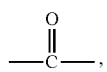

—O—, —O—C$_{1-4}$ alkylene-, —NR$^1$—, —S—, —S(O)— or

wherein R$^1$ and R$^2$ are each independently selected from the group consisting of hydrogen, halogen, hydroxyl, amino, C$_{1-4}$ alkyl, C$_{1-4}$ alkoxy, halogenated C$_{1-4}$ alkyl and hydroxyl-substituted C$_{1-4}$ alkyl. In some preferred embodiments, X represents a single covalent bond, —O—, —O—C$_{1-2}$ alkylene- or —NR$^1$—; wherein R$^1$ and R$^2$ are each independently selected from the group consisting of hydrogen and C$_{1-2}$ alkyl. In some preferred embodiments, X represents a single covalent bond, —O—, —OCH$_2$—, —NH— or —N(CH$_3$)—. In some preferred embodiments, X represents —O—, —NH— or —N(CH$_3$)—. In some preferred embodiments, X represents —O— or —NH—. In some preferred embodiments, X represents —O—. In some preferred embodiments, X represents a single covalent bond. In some preferred embodiments, X represents —N(CH$_3$)—.

In some preferred embodiments, B represents a 6- to 9-membered polycyclic aliphatic heterocycle containing 1 to 3 heteroatoms selected from the group consisting of nitrogen, oxygen and sulfur; preferably, at least one of the heteroatoms is nitrogen. In some preferred embodiments, B represents a 6- to 9-membered bicyclic aliphatic heterocycle containing 1 to 3 heteroatoms selected from the group consisting of nitrogen, oxygen and sulfur; preferably, at least one of the heteroatoms is nitrogen. In some preferred embodiments, B represents a 6- to 9-membered spiro heterocycle or 6- to 9-membered fused heterocycle, each of which contains 1 to 3 nitrogen atoms. In some preferred embodiments, B is connected to Y through a nitrogen atom on its ring. In some preferred embodiments, B is selected from

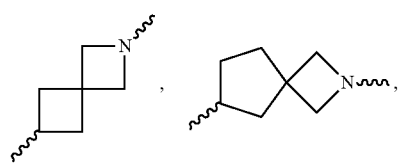

-continued

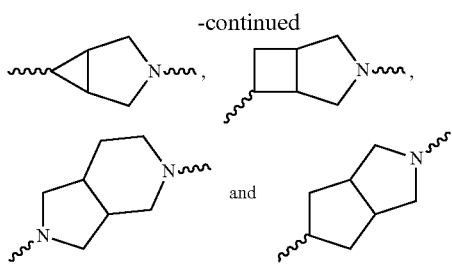

In some preferred embodiments, B is selected from

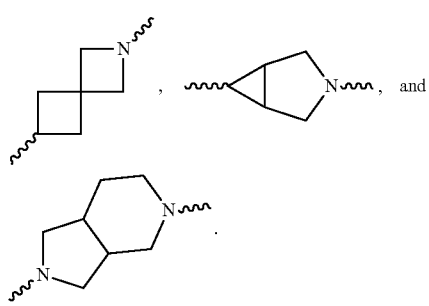

In some embodiments, B is

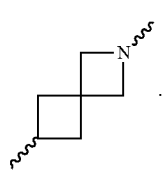

In some embodiments, B is

In some embodiments, B is. In some embodiments, B is

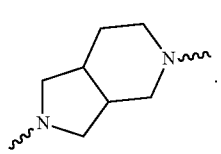

In some preferred embodiments, Y represents

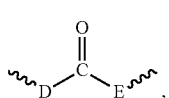

wherein D represents a single covalent bond or $C_{1-4}$ alkylene, optionally, the $C_{1-4}$ alkylene is substituted with one or more substituents selected from the group consisting of halogen, hydroxyl, amino, $C_{1-4}$ alkyl, $C_{1-4}$ alkoxy, halogenated $C_{1-4}$ alkyl and hydroxyl-substituted $C_{1-4}$ alkyl; E represents a single covalent bond, $C_{1-4}$ alkylene, $C_{2-4}$ alkenylene, —$NR^3$— or —$C_{1-4}$ alkylene-$NR^3$—, wherein $R^3$ is selected from the group consisting of hydrogen, halogen, hydroxyl, amino, $C_{1-4}$ alkyl, halogenated $C_{1-4}$ alkyl and hydroxyl-substituted $C_{1-4}$ alkyl. In some preferred embodiments, Y represents

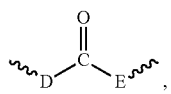

wherein D represents a single covalent bond or $C_{1-2}$ alkylene, optionally, Y represents

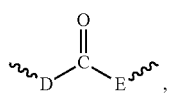

wherein D represents a single covalent bond or $C_{1-2}$ alkylene, optionally, the $C_{1-2}$ alkylene is substituted with one or more hydroxyl groups; E represents a single covalent bond, vinylidene, —NH— or —$C_{1-2}$ alkylene-NH—. In some preferred embodiments, Y represents —C(O)—,

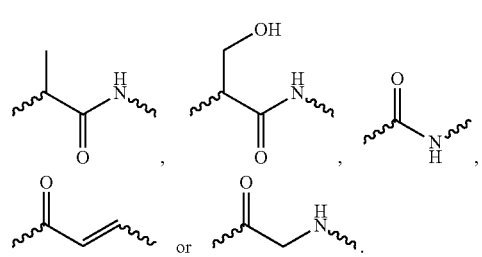

In some embodiments, Y represents —C(O)—,

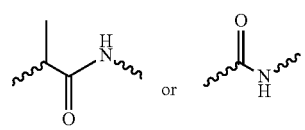

In some embodiments, Y represents

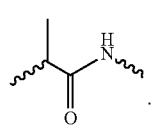

In some embodiments, Y represents

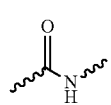

In some preferred embodiments, M represents a 6- to 10-membered aromatic ring; 3- to 7-membered aliphatic carbocycle; 5- to 6-membered monocyclic aromatic heterocycle or 8- to 10-membered bicyclic aromatic heterocycle, each of which contains 1 to 4 heteroatoms selected from the group consisting of nitrogen, oxygen and sulfur; 3- to 6-membered monocyclic aliphatic heterocycle or 7- to 10-membered bicyclic aliphatic heterocycle, each of which contains 1 to 5 heteroatoms selected from the group consisting of nitrogen, oxygen and sulfur; optionally, the aromatic ring, carbocycle, aromatic heterocycle, or aliphatic heterocycle is substituted with one or more substituents selected from the group consisting of halogen, hydroxyl, amino, $C_{1-4}$ alkyl, $C_{2-4}$ alkenyl, $C_{1-4}$ alkoxy, $C_{1-4}$ alkylamino,

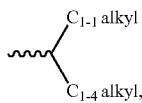

halogenated $C_{1-4}$ alkoxy, hydroxyl-substituted $C_{1-4}$ alkoxy and $C_{1-4}$ alkoxyl-substituted $C_{2-4}$ alkenyl. In some preferred embodiments, M represents a benzene ring; 3- to 7-membered aliphatic carbocycle; 5- to 6-membered monocyclic aromatic heterocycle or 8- to 10-membered bicyclic aromatic heterocycle, each of which contains 1 to 2 heteroatoms selected from the group consisting of nitrogen, oxygen and sulfur; 3- to 6-membered monocyclic aliphatic heterocycle containing 1 to 2 heteroatoms selected from the group consisting of nitrogen, oxygen and sulfur; optionally, the benzene ring, carbocycle, 5- to 6-membered monocyclic aromatic heterocycle, 8- to 10-membered bicyclic aromatic heterocycle, or 3- to 6-membered monocyclic aliphatic heterocycle is substituted with one or more substituents selected from the group consisting of halogen, hydroxyl, amino, $C_{1-2}$ alkyl, vinyl, $C_{1-2}$ alkoxy, $C_{1-2}$ alkylamino,

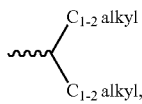

halogenated $C_{1-2}$ alkoxy, hydroxyl-substituted $C_{1-2}$ alkoxy and $C_{1-2}$ alkoxy-substituted $C_{2-4}$ alkenyl. In some preferred embodiments, M represents a benzene ring; 3- to 7-membered aliphatic carbocycle; 5- to 6-membered monocyclic aromatic heterocycle or 8- to 10-membered bicyclic aromatic heterocycle, each of which contains 1 to 2 heteroatoms selected from the group consisting of nitrogen and oxygen; optionally, the benzene ring, carbocycle, 5- to 6-membered monocyclic aromatic heterocycle or 8- to 10-membered bicyclic aromatic heterocycle is substituted with one or more substituents selected from the group consisting of: halogen, $C_{1-2}$ alkoxy,

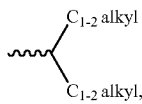

and $C_{1-2}$ alkoxy-substituted $C_{2-4}$ alkenyl. In some preferred embodiments, M represents a benzene ring, cyclohexane ring, pyridine ring, 2,3-dihydrobenzofuran ring, benzo[1,3]dioxole ring or 2,3-dihydrobenzo[1,4]dioxane ring; optionally, the benzene ring is substituted with one or more substituents selected from the group consisting of fluorine, chlorine, methoxy, dimethylamino and methoxy-substituted propenyl. In some embodiments, M represents a benzene ring, halogenated benzene ring (e.g., chlorobenzene ring, fluorobenzene ring), or methoxy-substituted benzene ring. In some embodiments, M represents a halogenated benzene ring. In some embodiments, M represents a 4-chlorobenzene ring.

In some preferred embodiments, B represents a 6- to 9-membered bicyclic aliphatic heterocycle containing 1 to 3 heteroatoms selected from the group consisting of nitrogen, oxygen and sulfur;

Y represents

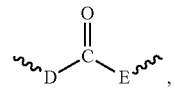

where D represents a single covalent bond or $C_{1-4}$ alkylene, optionally, the $C_{1-4}$ alkylene is substituted with one or more hydroxyl groups; E represents a single covalent bond, vinylidene, —NH— or —$C_{1-4}$ alkylene-NH—; or E represents a single covalent bond, $C_{1-4}$ alkylene, $C_{2-4}$ alkenylene, —NR$^3$— or —$C_{1-4}$ alkylene-NR$^3$—, wherein R$^3$ is selected from hydrogen, halogen, hydroxyl, amino, $C_{1-4}$ alkyl, halogenated $C_{1-4}$ alkyl and hydroxyl-substituted $C_{1-4}$ alkyl.

In some preferred embodiments, B represents a 6- to 9-membered spiro heterocycle or 6- to 9-membered fused heterocycle, each of which contains 1 to 3 nitrogen atoms;

Y represents

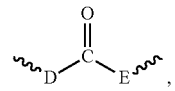

wherein D represents a single covalent bond or $C_{1-2}$ alkylene, optionally, the $C_{1-2}$ alkylene is substituted with one or more hydroxyl groups; E represents a single covalent bond, vinylidene, —NH— or —$C_{1-2}$ alkylene-NH—; and, B is connected to Y through a nitrogen atom on its ring.

In some preferred embodiments, —B—Y— is selected from

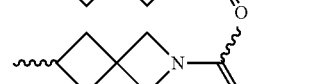

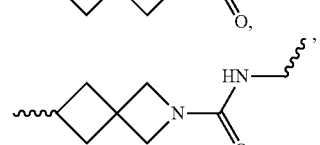

-continued

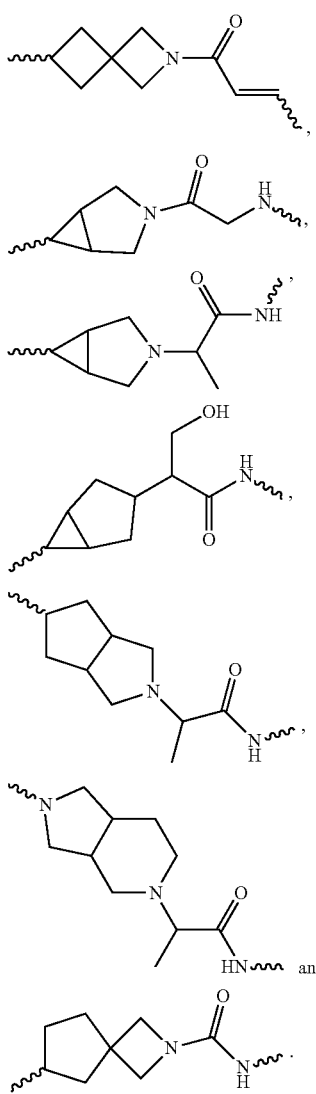

In some preferred embodiments, —B—Y— is selected from

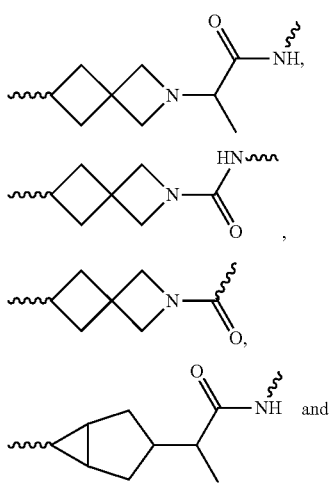

-continued

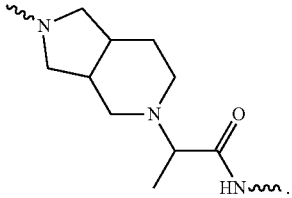

In some preferred embodiments, X represents a single covalent bond, —C(R¹R²)—,

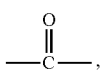

—O—, —O—C$_{1-4}$ alkylene-, —NR¹—, —S—, —S(O)— or

wherein R¹ and R² are each independently selected from the group consisting of hydrogen, halogen, hydroxyl, amino, C$_{1-4}$ alkyl, C$_{1-4}$ alkoxy, halogenated C$_{1-4}$ alkyl and hydroxyl-substituted C$_{1-4}$ alkyl;

B represents a 6- to 9-membered bicyclic aliphatic heterocycle containing 1 to 3 heteroatoms selected from nitrogen, oxygen and sulfur;

Y represents

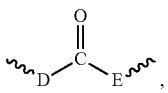

wherein D represents a single covalent bond or C$_{1-4}$ alkylene, optionally, the C$_{1-4}$ alkylene is substituted with one or more hydroxyl groups; E represents a single covalent bond, vinylidene, —NH— or —C$_{1-4}$ alkylene-NH—; or E represents a single covalent bond, C$_{1-4}$ alkylene, C$_{2-4}$ alkenylene, —NR³— or —C$_{1-4}$ alkylene-NR³—, wherein R³ is selected from the group consisting of hydrogen, halogen, hydroxyl, amino, C$_{1-4}$ alkyl, halogenated C$_{1-4}$ alkyl and hydroxyl-substituted C$_{1-4}$ alkyl.

In some preferred embodiments, X represents a single covalent bond, —O—, —O—C$_{1-2}$ alkylene- or —NR¹—; wherein R¹ and R² are each independently selected from the group consisting of hydrogen and C$_{1-2}$ alkyl;

B represents a 6- to 9-membered spiro heterocycle or 6- to 9-membered fused heterocycle, each of which contains 1 to 3 nitrogen atoms;

Y represents

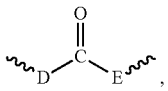

wherein D represents a single covalent bond or $C_{1-2}$ alkylene, optionally, the $C_{1-2}$ alkylene is substituted with one or more hydroxyl groups; E represents a single covalent bond, vinylidene, —NH— or —$C_{1-2}$ alkylene-NH—; and, B is connected to Y through a nitrogen atom on its ring.

In some preferred embodiments, X represents a single covalent bond, —O—, —OCH$_2$—, —NH— or —N(CH$_3$)—;

—B—Y— is selected from

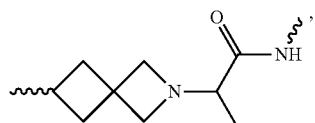

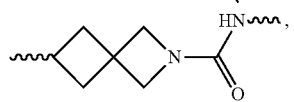

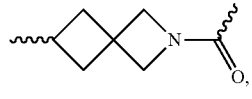

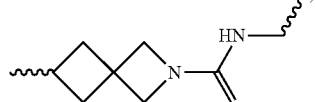

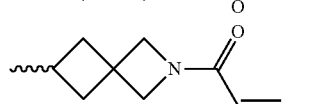

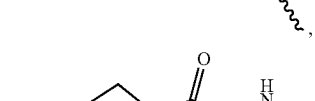

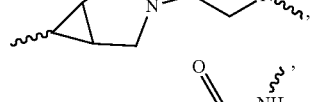

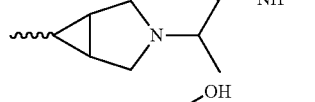

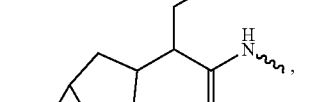

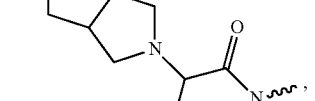

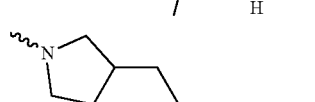 and

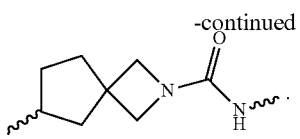

In some preferred embodiments, the compound of the present application is selected from:

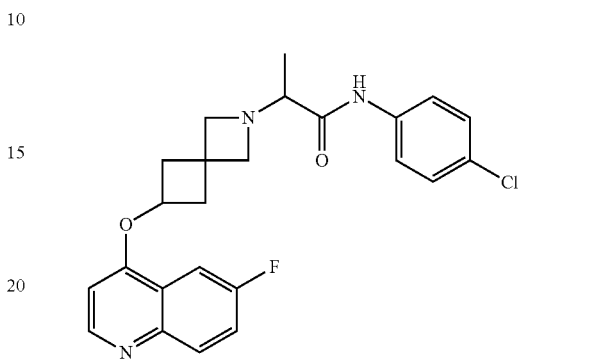

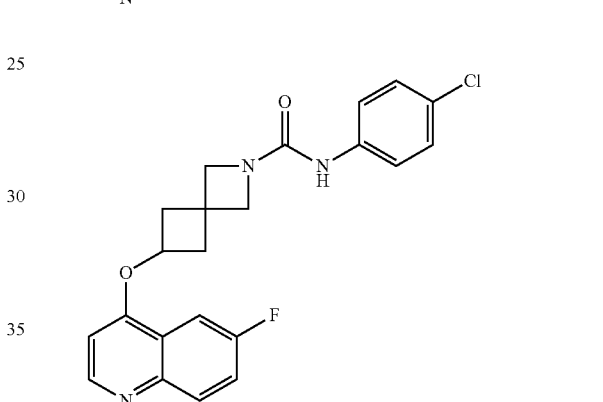

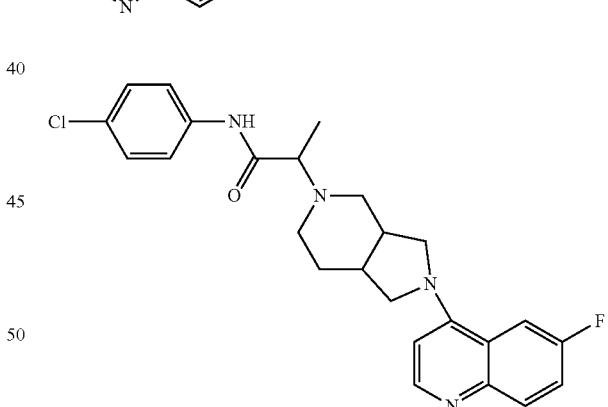

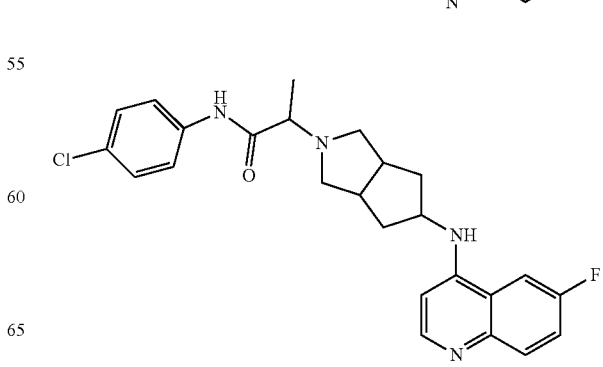

-continued
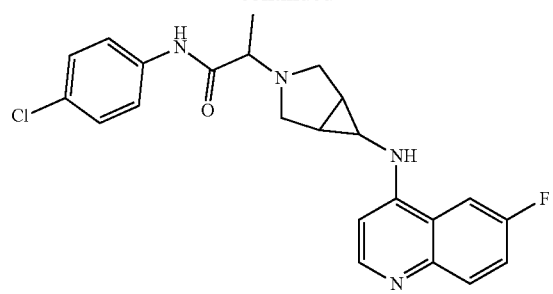
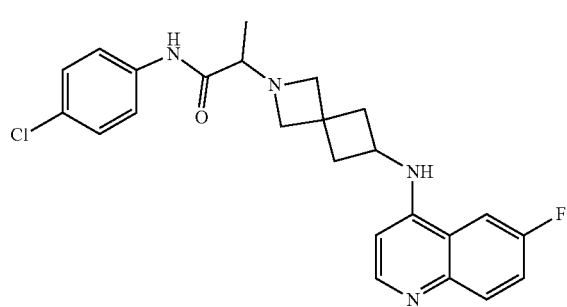
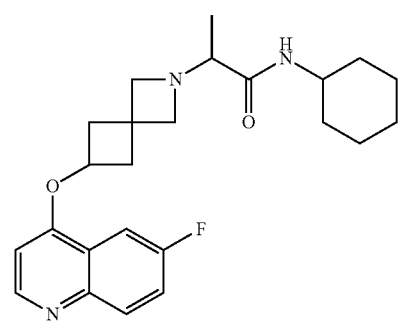
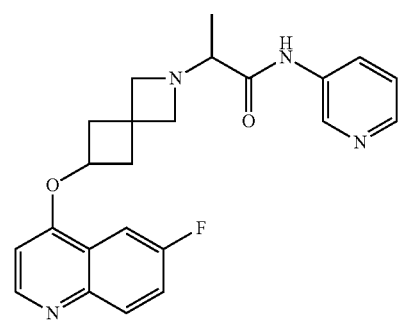
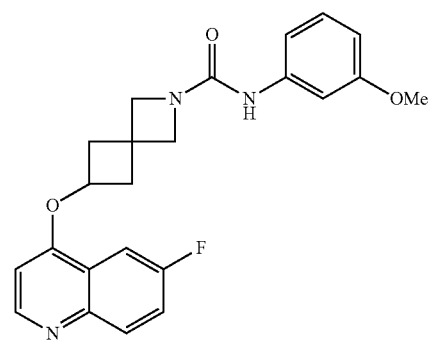
-continued
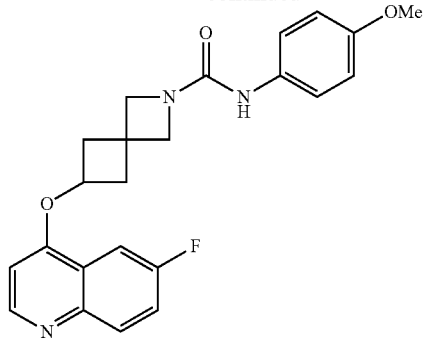
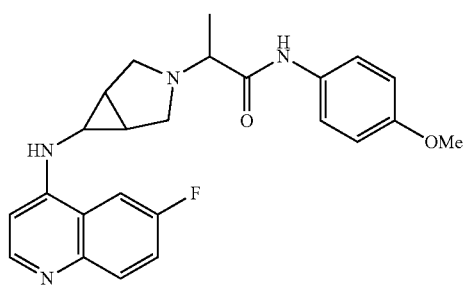
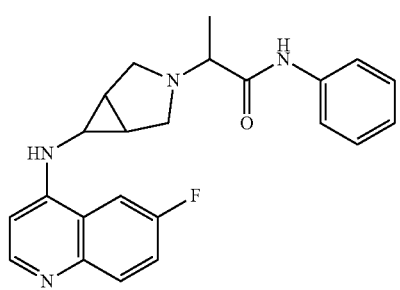
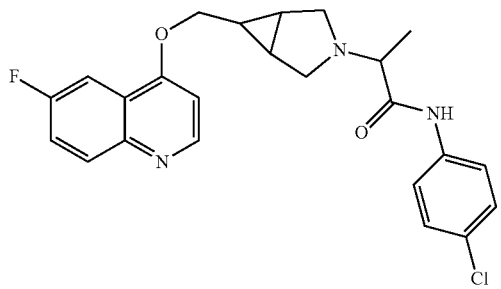
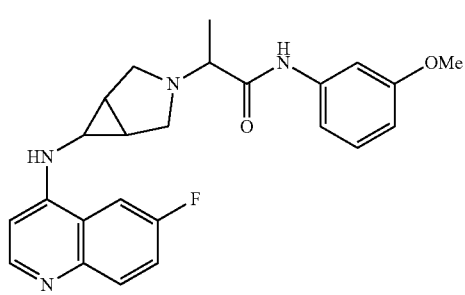

-continued
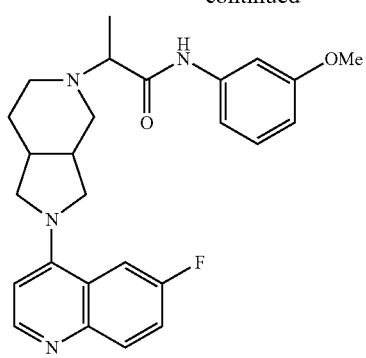
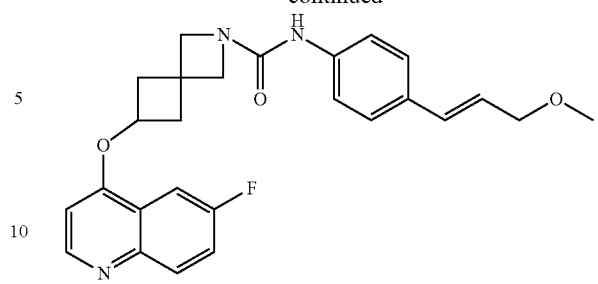
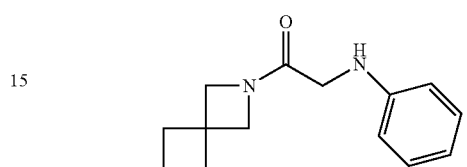
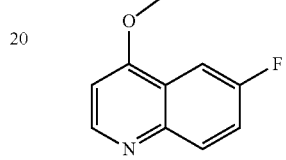
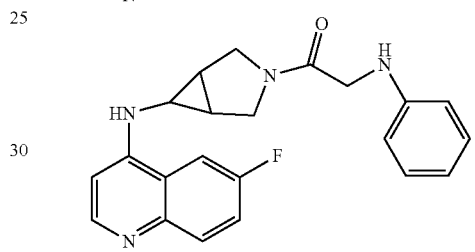
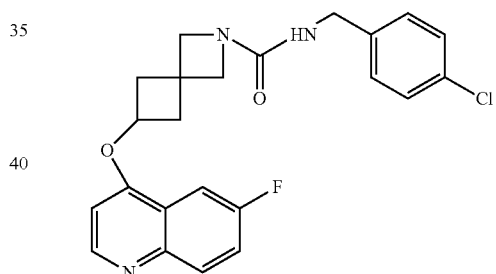
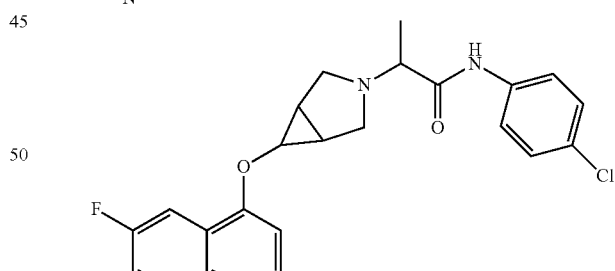
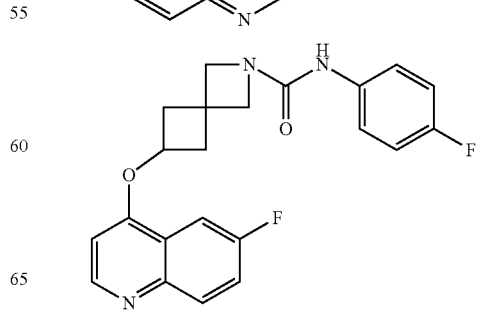

-continued
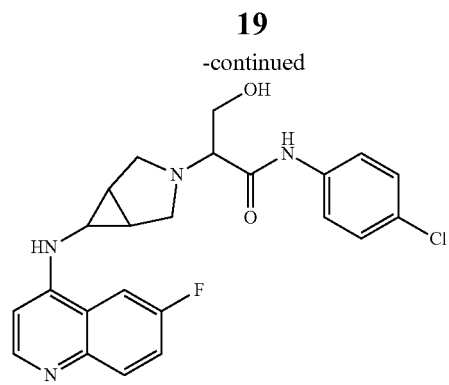
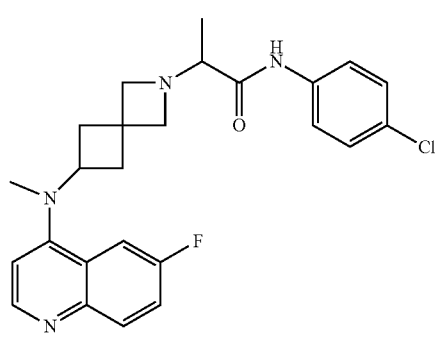
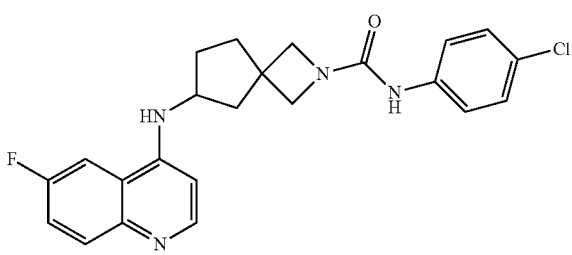
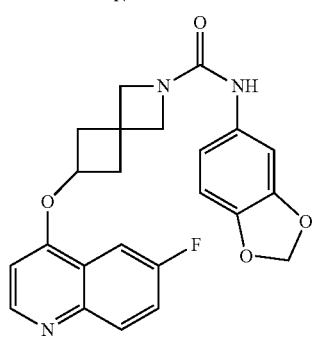
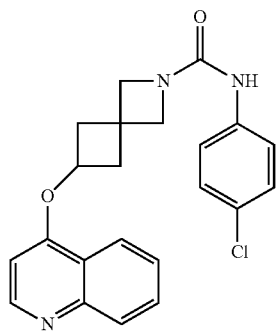
-continued
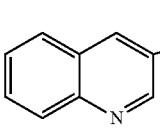
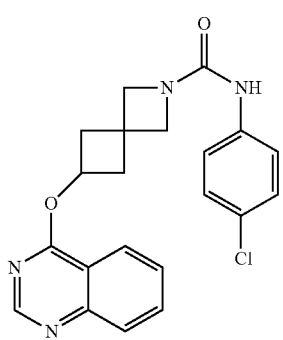
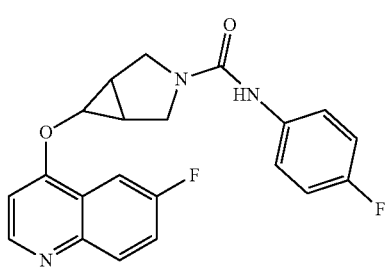
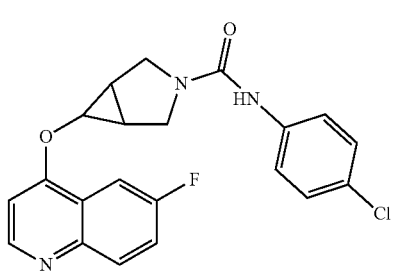
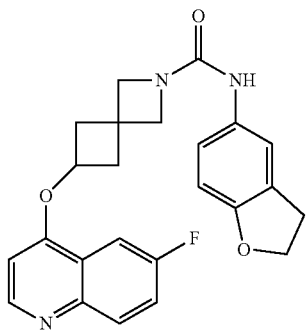

-continued

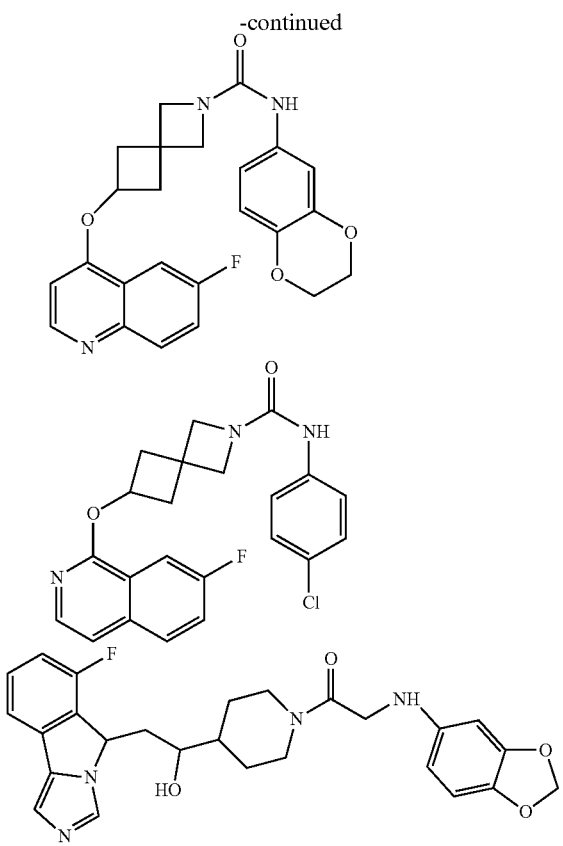

In the text, for the bivalent structure in the compound of general Formula (I), such as "X", "B", "Y", "D" or "E", both ends of it can be connected to adjacent structures, and it is preferably connected to the adjacent structures according to the writing format, that is, the left end is connected to the left structure, and the right end is connected to the right structure. In some embodiments, when E is —$C_{1-6}$ alkylene-$NR^3$—, it can be connected to the carbonyl in Y through the left $C_{1-6}$ alkylene, and it can also be connected to the carbonyl in Y through the right —$NR^3$—.

Pharmaceutical Composition

When administered as a medicine, the compound can be administered in the form of a pharmaceutical composition. Therefore, in another aspect, the present application provides a pharmaceutical composition, comprising the compound or pharmaceutically acceptable salt thereof, and at least one pharmaceutically acceptable carrier or excipient.

The term "composition" as used refers to a product comprising the compound or pharmaceutically acceptable salt thereof as disclosed in the present application as a specific active ingredient, and any other product that is directly or indirectly combined with the active ingredient.

Generally, the pharmaceutical composition comprises at least one pharmaceutically acceptable carrier or excipient. The term "pharmaceutically acceptable" means that the carrier or excipient is compatible with other ingredients in the formulation and harmless to the subject. The carrier described herein refers to a substance used to improve the selectivity, efficacy and/or safety of a drug during delivery. The carrier is mainly used to control the release of the drug, and can also be used to improve the pharmacokinetics properties, especially bioavailability of the drug. The excipient refers to a substance other than active ingredients in the pharmaceutical preparation, which is mainly used for maintaining long-term stability, filling solid preparation (therefore, it also often refer in particular to is "filler") or enhancing product efficacy (e.g., promoting absorption, reducing viscosity or increasing solubility, etc.).

In some embodiments, the pharmaceutical composition also comprises other IDO inhibitors. In some preferred embodiments, the IDO inhibitor may be a tryptophan analog (e.g., Indoximod) or an IDO1 inhibitor (e.g., Epacadostat, NLG919). In some preferred embodiments, the pharmaceutical composition also comprises an epigenetic modulator. In some preferred embodiments, the epigenetic modulator is selected from the group consisting of a DNA methyltransferase inhibitor (e.g., Azacitidine (5-Aza), Decitabine), a histone methyltransferase inhibitor (e.g., EZH2 inhibitor), a histone demethylase inhibitor (e.g., LSD inhibitor), a histone deacetylase (HDAC) inhibitor. In some preferred embodiments, the HDAC inhibitor is selected from the group consisting of a benzamide HDAC inhibitor (e.g., Chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid).

In some preferred embodiments, the pharmaceutical composition comprises 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-one or pharmaceutically acceptable salt thereof, and at least one pharmaceutically acceptable carrier or excipient; optionally, it also comprises one or more other therapeutic agents. In some preferred embodiments, the other therapeutic agent may be other IDO inhibitors. In some preferred embodiments, the IDO inhibitor may be a tryptophan analog (e.g., Indoximod) or an IDO1 inhibitor (e.g., Epacadostat, NLG919). In some preferred embodiments, the other therapeutic agent may be an epigenetic modulator. In some preferred embodiments, the epigenetic modulator is selected from the group consisting of a DNA methyltransferase inhibitor (e.g., Azacitidine (5-Aza), Decitabine), a histone methyltransferase inhibitor (e.g., EZH2 inhibitor), a histone demethylase inhibitor (e.g., LSD inhibitor), a histone deacetylase (HDAC) inhibitor. In some preferred embodiments, the HDAC inhibitor is selected from the group consisting of a benzamide HDAC inhibitor (e.g., Chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid). In some preferred embodiments, the pharmaceutical composition comprises 2-(benzo[d][1,3]dioxol-5-ylamino)-1-(4-(2-(6-fluoro-5H-imidazo[5,1-a] isoindol-5-yl)-1-hydroxyethyl)piperidin-1-yl)ethyl-1-one or pharmaceutically acceptable salt thereof and chidamide, as well as at least one pharmaceutically acceptable carrier or excipient.

In some preferred embodiments, the pharmaceutical composition comprises N-(4-chlorophenyl)-6-((6-fluoroquinolin-4-yl)oxy)-2-aza-spiro[3.3]heptane-2-carboxamide, N-(benzo[d][1,3]dioxol-5-yl)-6-((6-fluoroquinolin-4-yl)oxy)-2-aza-spiro[3.3]heptane-2-carboxamide, 2-(6-((6-fluoroquinolin-4-yl)amino)-3-aza-bicyclo[3.1.0]hexan-3-yl)-N-(4-chlorophenyl)propionamide or 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-one, or pharmaceutically acceptable salt thereof, and at least one pharmaceutically acceptable carrier or excipient as well as at least one pharmaceutically acceptable carrier or excipient; optionally, it also comprises one or more other therapeutic agents. In some preferred embodiments, the other therapeutic agent may be other IDO inhibitors. In some preferred embodiments, the IDO inhibitor may be a tryptophan analog (e.g., Indoximod) or an IDO1 inhibitor (e.g., Epacadostat, NLG919). In some preferred embodiments, the other therapeutic agent may be an epigenetic modulator. In some preferred embodiments, the epigenetic modulator is selected from the group consisting of a DNA methyltransferase inhibitor (e.g., Azacitidine (5-Aza), Decitabine), a histone methyltransferase inhibitor (e.g., EZH2 inhibitor), a histone demethylase inhibitor (e.g., LSD inhibitor), a histone deacetylase (HDAC) inhibitor. In some preferred embodiments, the HDAC inhibitor is selected from the group consisting of a benzamide HDAC inhibitor (e.g., Chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid). In some preferred embodiments, the pharmaceutical composition comprises N-(4-chlorophenyl)-6-((6-fluoroquinolin-4-yl)oxy)-2-aza-spiro[3.3]heptane-2-carboxamide, N-(benzo[d][1,3]dioxol-5-yl)-6-((6-fluoroquinolin-4-yl)oxy)-2-aza-spiro[3.3]heptane-2-carboxamide, 2-(6-((6-fluoroquinolin-4-yl)amino)-3-aza-bicyclo[3.1.0]hexan-3-yl)-N-(4-chlorophenyl)propionamide or 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-one or pharmaceutically acceptable salt thereof and chidamide, as well as at least one pharmaceutically acceptable carrier or excipient.

Combination Medication

Epigenetics is the current hot spot of genetics research, which mainly includes DNA methylation, histone methylation, histone acetylation, phosphorylation, ubiquitination, and the activity of transcription factors involved in binding histone modification sites, etc., and these epigenetic changes play an important role in gene transcription regulation. DNA methylation mainly occurs at CpG dinucleotide sites in genome, and is catalyzed by DNA methyltransferase. Generally, there is a negative correlation between DNA methylation and gene expression. Some studies have shown that abnormal DNA methylation may participate in tumorigenesis by affecting chromatin structure and the expression of oncogenes and tumor suppressor genes. DNA methyltransferase inhibitors commonly used in clinic are Azacitidine (5-Aza), Decitabine, etc. Histones are the basic unit of human chromosomes, and the post-transcriptional modifications of histones play a decisive role in gene expression. The methylation, especially acetylation, of histone lysine or arginine sites, is an important modification method. Extensive studies have shown that the imbalance of acetylation caused by overexpression of HDAC in cancer cells leads to the occurrence of tumors, while the inhibition of HDAC may inhibit tumorigenesis very well. Currently, in terms of entering clinical trial research stage, there are EZH2 inhibitors for the histone methylase inhibitors, LSD inhibitors for histone demethylase inhibitors, etc., and benzamide HDAC inhibitors (e.g., chidamide), hydroxamic acid HDAC inhibitors (e.g., Vorinostat), cyclic peptide HDAC inhibitors (e.g., Romidepsin) and short-chain fatty acid HDAC inhibitors (e.g., valproic acid) for HDAC inhibitors. In addition, transcription factors that bind to histone modification sites, such as members of the BET protein family containing bromobinding domains, are also involved in cyclin expression, chromatin plasticity, and even act as enhancers to directly promote the abnormal expression of oncogenes such as Myc to induce tumorigenesis. At present, some BET inhibitors have entered the clinical research stage. The inventors of the present application unexpectedly found that in the tumor model constructed by inoculating CT-26 colon cancer cells in Balb/c mice, a compound with IDO inhibitory activity and an HDAC inhibitor have showed excellent synergistic effect, and showed significantly better anti-tumor activity than single-target IDO inhibitor or HDAC inhibitor. Therefore, another aspect of the present application provides a combination medication, comprising a first active ingredient and a second active ingredient, and optionally a pharmaceutically acceptable carrier or excipient; wherein, the first active ingredient is selected from the compound or pharmaceutically acceptable salt thereof as disclosed in the present application, and other IDO inhibitor; and the second active ingredient is selected from epigenetic modulators.

In some preferred embodiments, the IDO inhibitor is selected from the group consisting of a tryptophan analog (e.g., Indoximod) and an IDO1 inhibitor (e.g., Epacadostat, NLG919). In some preferred embodiments, the epigenetic modulator is selected from the group consisting of a DNA methyltransferase inhibitor (e.g., Azacitidine (5-Aza), Decitabine), a histone methyltransferase inhibitor (e.g., EZH2 inhibitor), a histone demethylase inhibitor (e.g., LSD inhibitor) and a HDAC inhibitor. In some preferred embodiments, the HDAC inhibitor is selected from the group consisting of a benzamide HDAC inhibitor (e.g., chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid). In some preferred embodiments, the first active ingredient and the second active ingredient are in the same preparation unit. In some preferred embodiments, the first active ingredient and the second active ingredient are in different preparation units. In some preferred embodiments, the first active ingredient and the second active ingredient are administrated simultaneously, respectively or sequentially. In some preferred embodiments, the first active ingredient is N-(4-chlorophenyl)-6-((6-fluoroquinolin-4-yl)oxy)-2-aza-spiro [3.3]heptane-2-carboxamide or pharmaceutically acceptable salt thereof, and the second active ingredient is chidamide.

In some preferred embodiments, the first active ingredient is 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-one or pharmaceutically acceptable salt thereof; the second active ingredient is selected from epigenetic modulators. In some preferred embodiments, the epigenetic modulator is selected from the group consisting of a DNA methyltransferase inhibitor (e.g., azacitidine (5-Aza), Decitabine), a histone methyltransferase inhibitor (e.g., EZH2 inhibitor), a histone demethylase inhibitor (e.g., LSD inhibitor), a histone deacetylase (HDAC) inhibitor. In some preferred embodiments, the HDAC inhibitor is selected from the group consisting of a benzamide HDAC inhibitor (e.g., Chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid). In some preferred embodiments, the first active ingredient is 2-(benzo[d][1,3]dioxol-5-ylamino)-1-(4-(2-(6-fluoro-5H-imidazo[5,1-a]isoindol-5-yl)-1-hydroxyethyl) piperidin-1-yl)ethyl-1-one or pharmaceutically acceptable salt thereof; the second active ingredient is chidamide.

In some preferred embodiments, the first active ingredient is selected from N-(4-chlorophenyl)-6-((6-fluoroquinolin-4-yl)oxy)-2-aza-spiro[3.3]heptane-2-carboxamide, N-(benzo[d][1,3]dioxol-5-yl)-6-((6-fluoroquinolin-4-yl)oxy)-2-aza-spiro[3.3]heptane-2-carboxamide, 2-(6-((6-fluoroquinolin-4-yl)amino)-3-aza-bicyclo[3.1.0]hexan-3-yl)-N-(4-chlorophenyl)propionamide and 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-one or pharmaceutically acceptable salt thereof, the second active ingredient is selected from epigenetic modulators. In some preferred embodiments, the epigenetic modulator is selected from the group consisting of a DNA methyltransferase inhibitor (e.g., Azacitidine (5-Aza), Decitabine), a histone methyltransferase inhibitor (e.g., EZH2 inhibitor), a histone demethylase inhibitor (e.g., LSD inhibitor), a histone deacetylase (HDAC) inhibitor. In some preferred embodiments, the HDAC inhibitor is selected from the group consisting of a benzamide HDAC inhibitor (e.g., Chidamide), a hydroxamic acid HDAC inhibitor (e.g., Vorinostat), a cyclic peptide HDAC inhibitor (e.g., Romidepsin) and a short-chain fatty acid HDAC inhibitor (e.g., valproic acid). In some preferred embodiments, the first active ingredient is 2-(benzo[d][1,3]dioxol-5-ylamino)-1-(4-(2-(6-fluoro-5H-imidazo[5,1-a]isoindol-5-yl)-1-hydroxyethyl)piperidin-1-yl)ethyl-1-ketone or pharmaceutically acceptable salt thereof; and the second active ingredient is chidamide.

Use

As mentioned above, IDO1 has immunosuppressive function and is closely related to the pathogenesis of many diseases, for example, it is a target of major diseases such as cancers, Alzheimer's disease, depression, and cataracts. In addition, it also involves in the occurrence of age-related nuclear cataracts. In the activity experiment part, the compound as disclosed in the present application shows significant inhibitory activity against hIDO1.

Therefore, in another aspect, the present application provides use of the compound or pharmaceutically acceptable salt thereof, the pharmaceutical composition or the combination medication in the manufacture of an immunomodulator or a medicament for preventing and/or treating a disease associated with IDO expression abnormality and/or tryptophan metabolism abnormality. In some preferred embodiments, the disease is selected from the group consisting of tumor, autoimmune disease, cataract, Alzheimer's disease, depression disorder and anxiety disorder.

The present application also provides the compound or pharmaceutically acceptable salt thereof, the pharmaceutical composition or the combination medication, for use in regulating immunity or preventing and/or treating a disease associated with IDO expression abnormality and/or tryptophan metabolism of an individual. In some preferred embodiments, the disease is selected from the group consisting of tumor, autoimmune disease, cataract, Alzheimer's disease, depression disorder and anxiety disorder.

The present application also provides a method for regulating immunity, comprising administering to a subject in need thereof an effective amount of the compound or pharmaceutically acceptable salt thereof, the pharmaceutical composition or the combination medication as disclosed in the present application.

The present application also provides a method for preventing and/or treating a disease associated with IDO expression abnormality and/or tryptophan metabolism abnormality, comprising administering to a subject in need thereof an effective amount of the compound or pharmaceutically acceptable salt thereof, the pharmaceutical composition or the combination medication as disclosed in the present application. In some preferred embodiments, the disease is selected from the group consisting of tumor, autoimmune disease, cataract, Alzheimer's disease, depression disorder and anxiety disorder.

As used herein, the term "subject" or "individual" refers to an animal, including but not limited to primate (e.g., human), cow, pig, sheep, goat, horse, dog, cat, rabbit, rat or mouse. "Individual" and "patient" are used interchangeably herein, for example, referring to a mammalian subject, such as a human subject. In some embodiments, the subject is human.

As used herein, the term "treatment" is intended to include alleviation or elimination of a condition, disorder or disease, or one or more symptoms associated with the condition, disorder or disease; or alleviation or elimination of the cause itself that results in the condition, disorder or disease.

As used herein, the term "prevention" is intended to include a method for alleviation and/or elimination of a condition, disorder or disease, and/or onset of accompanying symptoms; preventing of an individual from acquiring the condition, disorder or disease; or reducing the risk of an individual that suffers from the condition, disorder or disease.

The term "effective amount" refers to an amount sufficient to obtain or at least partially obtain the desired effect. For example, a prophylactically effective amount refers to an amount sufficient to prevent, stop, or delay the occurrence of a disease; a therapeutically effective amount refers to an amount sufficient to cure or at least partially prevent a disease and complication thereof in a patient who has already suffered from the disease. It is completely within the abilities of those skilled in the art to determine such an effective amount. For example, an effective amount for therapeutic purposes will depend on the severity of disease to be treated, the overall condition of patient's own immune system, the patient's general condition such as age, weight and gender, method of administration, and therapies performed at the same time, etc.

Preparation Method

On the other hand, the present application provides a method for preparing the compound of general Formula (I), which is selected from the following methods:

Method 1 when Y is

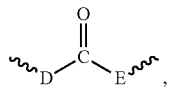

D is a single covalent bond, and E is —NR$^3$—, the compound of general Formula (I) can be prepared by the following method: in an organic solvent, in the presence of a base, reacting a compound of Formula I-1, a compound of Formula I-2 and an ureation reagent to obtain a compound of general Formula (I),

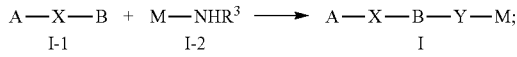

Method 2 when Y is

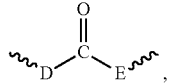

D is a single covalent bond, E is a single covalent bond, $C_{1-6}$ alkylene, $C_{2-6}$ alkenylene or $-C_{1-6}$ alkylene-$NR^3-$, the compound of general Formula (I) can be prepared by the following method: subjecting a compound of Formula I-1 and a compound of Formula I-3 to a coupling reaction to obtain a compound of Formula (I);

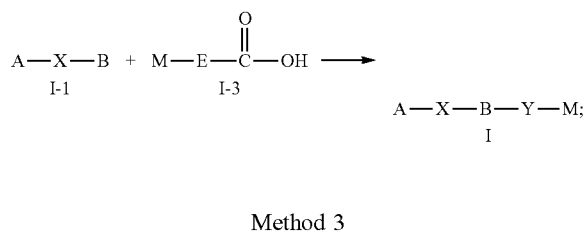

Method 3 when Y is

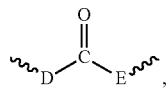

D is a substituted or unsubstituted $C_{1-6}$ alkylene, and E is $-NR^3-$, the compound of general Formula (I) can be prepared by the following method: subjecting a compound of Formula I-4 and a compound of Formula I-2 to a coupling reaction to obtain a compound of general Formula (I),

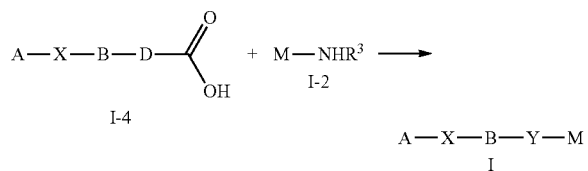

wherein, A, X, B, $R^3$ and M are defined as described above.

In some preferred embodiments, B in the compound of general Formula (I) represents a 6- to 12-membered polycyclic heterocyclic alkylene containing 1 to 3 heteroatoms selected from the group consisting of nitrogen, oxygen and sulfur, and at least one of the heteroatoms is nitrogen, and B is connected through a nitrogen atom on its ring to Y.

In some preferred embodiments, in Method 1 (1), the organic solvent may be dichloromethane, THF, toluene, ethyl acetate or benzene, etc. In some preferred embodiments, in Method 1 (1), the base is triethylamine, pyridine, DIPEA or NaOH. In some preferred embodiments, in Method 1 (1), the ureation reagent is selected from isocyanate, triphosgene, phosgene, diphosgene, chloroformamide, carbonyldiimidazole (CDI) and potassium isocyanate.

In some preferred embodiments, in Method 2 and/or Method 3, a peptide condensing agent is used as a catalyst for the coupling reaction, such as 1-hydroxybenzotriazole (HOBt), 1-ethyl-3-(3-dimethylaminopropyl)carbodiimide (EDC), N,N'-dicyclohexylcarbodiimide (DCC), N,N'-carbonyldiimidazole (CDI), 2-(7-aza-benzotriazole)-N,N,N',N'-tetramethylurea hexafluorophosphate (HATU), etc. In some preferred embodiments, in Method 2 and/or Method 3, the coupling reaction is conducted at 0° C. to 60° C. In some preferred embodiments, in Method 2 and/or Method 3, the coupling reaction is conducted for 2 to 72 hours. In some preferred embodiments, in Method 2 and/or Method 3, the solvent used in the coupling reaction is selected from the group consisting of benzene, toluene, tetrahydrofuran, dioxane, dichloromethane, chloroform and N,N'-dimethylformamide, etc. In some preferred embodiments, in Method 1(2) and/or Method 2, if necessary, a base, such as sodium hydroxide, triethylamine, DMAP or pyridine, is used for the coupling reaction.

The compound of general Formula (I) can be purified by a common separation method, such as extraction, recrystallization, column chromatography, etc.

Preparation of Compound of Formula I-1

In addition, the present application further provides a method for preparing a compound of Formula I-1, comprising steps (a) to (b):

(a) under the action of a base, subjecting Compound 1 and Compound 2 to a nucleophilic substitution reaction to obtain Compound 3:

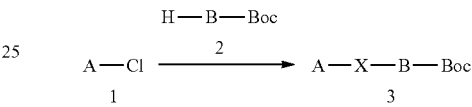

(b) under the action of an acid, deprotecting Compound 3 to obtain Formula I-1:

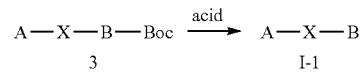

wherein, A, X and B are as defined above.

In some preferred embodiments, KHMDS, NaH, NaOH, $Na_2CO_3$ or $K_2CO_3$ is used as a deacidification agent in the nucleophilic substitution reaction of step (a). In some preferred embodiments, the reaction of step (a) is conducted at 25° C. to 140° C. In some preferred embodiments, the reaction of step (a) is conducted for 2 to 72 hours. In some preferred embodiments, the solvent used in the nucleophilic substitution reaction in step (a) is selected from the group consisting of water, methanol, ethanol, acetonitrile, benzene, xylene, acetone, N,N'-dimethylformamide and DMSO, etc.

In some preferred embodiments, the acid in step (b) is selected from the group consisting of trifluoroacetic acid and hydrochloride solution. In some preferred embodiments, the base in step (b) is NaOH. In some preferred embodiments, the reaction of step (b) is conducted at 25° C. to 140° C. In some preferred embodiments, the reaction of step (b) is conducted for 2 to 72 hours. In some preferred embodiments, the solvent used in step (b) is selected from the group consisting of water, methanol, ethanol, acetonitrile, benzene, xylene, acetone, N,N'-dimethylformamide and DMSO, etc.

Preparation of Compound of Formula I-4

In addition, the present application further provides a method for preparing a compound of Formula I-4, comprising steps (c) to (d):

(c) subjecting a compound of Formula I-1 and a halogenated carboxylic acid ester 4 (e.g., chloroformate, 2-bromoacetate, 2-bromopropionate, 1-hydroxyl-2-bromopropionate) to a nucleophilic substitution reaction under the action of a base to obtain Compound 5;

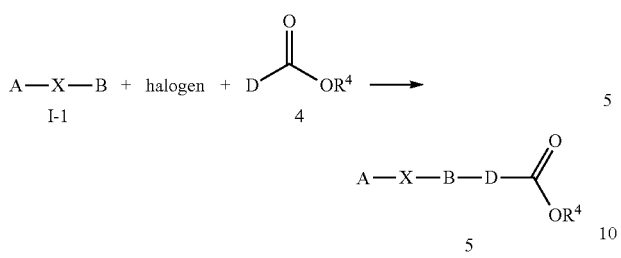

(d) subjecting Compound 5 to a hydrolysis reaction under alkaline condition to obtain a compound of Formula I-4;

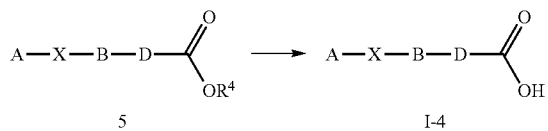

wherein, $R^4$ represents $C_{1-6}$ alkyl, A, X, B and D are as defined above.

In particular, when the halogenated carboxylic acid ester described in step (c) is 2-halopropionate, the compound of Formula I-4 has the structure shown in Formula F:

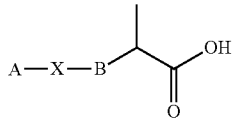

Therefore, the present application further provides a method for preparing a compound of Formula F, comprising steps (e) to (f):

(e) under the action of a base, subjecting a compound of Formula I-1 and 2-halopropionate (e.g., ethyl 2-bromopropionate) to a nucleophilic substitution reaction to obtain Compound 6;

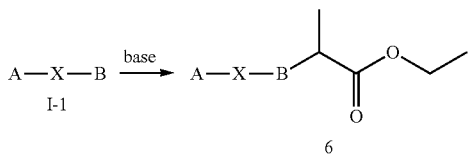

(f) subjecting Compound 4 to a hydrolysis reaction under alkaline condition to obtain a compound of Formula F;

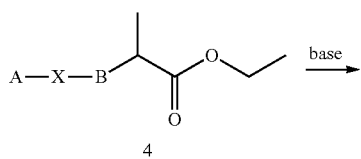

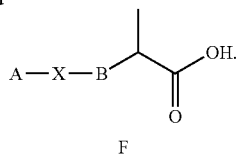

In some preferred embodiments, NaOH, $Na_2CO_3$, or $K_2CO_3$, etc. is used as a deacidification agent for the nucleophilic substitution reaction of step (c) and/or step (e). In some preferred embodiments, the reaction of step (c) and/or step (e) is conducted at 25° C. to 140° C. In some preferred embodiments, the reaction of step (c) and/or step (e) is conducted for 2 to 72 hours. In some preferred embodiments, the solvent used in the reaction in step (c) and/or step (e) is selected from the group consisting of water, methanol, ethanol, acetonitrile, benzene, xylene, acetone, N,N'-dimethylformamide and DMSO, etc.

In some preferred embodiments, NaOH or LiOH, etc. is used as the base for the hydrolysis reaction of step (d) and/or step (f). In some preferred embodiments, the reaction of step (d) and/or step (f) is conducted at 0° C. to 60° C. In some preferred embodiments, the reaction of step (d) and/or step (f) is conducted for 0.5 to 2 hours. In some preferred embodiments, the solvent used in step (d) and/or step (f) is selected from the group consisting of water, methanol, ethanol, tetrahydrofuran and N,N'-dimethylformamide, etc.

In particular, the present application also provides use of each intermediate (e.g., compound of Formula I-1, compound of Formula I-4, compound of Formula F) in the above-mentioned preparation methods for preparing a compound of general Formula (I) as disclosed in the present application.

In the present application, unless otherwise specified, the scientific and technical terms used herein have the meanings commonly understood by those skilled in the art. Also, the cell culture, molecular genetics, nucleic acid chemistry, and immunology laboratory operation steps used herein are conventional steps widely used in the corresponding fields. At the same time, in order to better understand the present disclosure, the definitions and explanations of related terms are provided as follows.

As used herein, the term "pharmaceutically acceptable salt" refers to: (1) a salt formed by an acidic functional group (e.g., —COOH, —OH, —$SO_3H$, etc.) present in the compound as disclosed in the present application and an appropriate inorganic or organic cation (base), for example, a salt formed by the compound as disclosed in the present application and an alkali metal or alkaline earth metal, an ammonium salt of the compound disclosed in the present application, and a salt formed by the compound as disclosed in the present application and a nitrogen-containing organic base; and (2) a salt formed by a basic functional group (e.g., —$NH_2$, etc.) present in the compound as disclosed in the present application and an appropriate inorganic or organic anion (acid), for example, a salt formed by the compound as disclosed in the present application and an inorganic acid or organic carboxylic acid.

As used herein, the term "halogen" includes fluorine, chlorine, bromine, and iodine.

As used herein, the term "alkyl" refers to a linear or branched saturated hydrocarbonyl. It includes, for example, "$C_{1-6}$ alkyl", "$C_{1-4}$ alkyl", "$C_{1-3}$ alkyl", "$C_{1-2}$ alkyl", etc., and specific examples include but are not limited to: methyl, ethyl, n-propyl, isopropyl, n-butyl, isobutyl, sec-butyl, tert-butyl, n-pentyl, isopentyl, 2-methylbutyl, neopentyl, 1-ethylpropyl, n-hexyl, isohexyl, 3-methylpentyl, 2-methylpentyl, 1-methylpentyl, 3,3-dimethylbutyl, 2,2-dimethylbutyl, 1,1-dimethylbutyl, 1,2-dimethylbutyl, 1,3-dimethylbutyl, 2,3-dimethylbutyl, 2-ethylbutyl, 1,2-dimethylpropyl, etc.

As used herein, the term "alkylene" refers to a group obtained by losing two hydrogen atoms in a linear or branched alkane, for example, $C_{1-6}$ alkylene, $C_{1-4}$ alkylene, and $C_{1-2}$ alkylene. Specific examples thereof include but are not limited to methylene, 1,2-ethylene 1, 2-ethylene, 1,3-propylene, 1,4-butylene, etc.

As used herein, the term "alkoxy" refers to a group having the structure of alkyl-O—, wherein alkyl is as defined above. It includes, for example, "$C_{1-6}$ alkoxy", "$C_{1-4}$ alkoxy", "$C_{1-3}$ alkoxy", "$C_{1-2}$ alkoxy" etc. Specific examples include but are not limited to methoxy, ethoxy, propoxy, isopropoxy, n-propoxy, isopropoxy, n-butoxy, isobutoxy, tert-butoxy, pentoxy, hexoxy, etc.

As used herein, the term "halogenated $C_{1-6}$ alkyl" refers to a group obtained by substituting at least one hydrogen atom (e.g., one, two or three) in the aforementioned $C_{1-6}$ alkyl with halogen atom (e.g., fluorine or chlorine). Specific examples thereof include but are not limited to fluoromethyl, difluoromethyl, trifluoromethyl, etc.

As used herein, the term "alkenyl" refers to a straight or branched chain alkenyl group containing at least one double bond, including, for example, "$C_{2-6}$ alkenyl", "$C_{2-4}$ alkenyl", etc. Specific examples include but are not limited to: vinyl, 1-propenyl, 2-propenyl, 1-butenyl, 2-butenyl, 1,3-butadienyl, 1-pentenyl, 2-pentenyl, 3-pentenyl, 1,3-pentadienyl, 1,4-pentadienyl, 1-hexenyl, 2-hexenyl, 3-hexenyl, 1,4-hexadienyl, cyclopentenyl, 1,3-cyclopentadienyl, cyclohexenyl, 1,4-cyclohexadienyl, etc.

As used herein, the term "alkenylene" refers to a group obtained by losing two hydrogen atoms in a linear or branched alkene, for example, $C_{2-6}$ alkenylene and $C_{2-4}$ alkenylene. Specific examples include but not limited to vinylidene, 1,3-propenylene, etc.

As used herein, the term "carbocycle" refers to a cyclic structure in which all ring members are carbon atoms, including aliphatic carbocycles and aromatic carbocycles, wherein the aliphatic carbocycle refers to a saturated or partially unsaturated ring structure without aromatic properties. For example, 3- to 7-membered aliphatic carbocycle, 3- to 6-membered aliphatic carbocycle, 4- to 6-membered aliphatic carbocycle, 5- to 6-membered aliphatic carbocycle, etc. Specific examples include but are not limited to: cyclopropane ring, cyclobutane ring, cyclopentane ring, cyclohexane ring, cycloheptane ring, cyclooctane ring, etc.

As used herein, the term "aliphatic heterocycle" refers to a non-aromatic ring group in which at least one ring atom is heteroatom, wherein the heteroatom is selected from the group consisting of nitrogen atom, oxygen atom and sulfur atom. The aliphatic heterocycle includes monocyclic or polycyclic aliphatic heterocycle, wherein the monocyclic aliphatic heterocycle may be a saturated or partially unsaturated 3- to 7-membered (e.g., 3- to 6-membered, 5- to 6-membered, 3-, 4-, 5-, 6- or 7-membered) monocyclic aliphatic heterocycle containing 1 to 5 (e.g., 1 to 2) heteroatoms selected from the group consisting of nitrogen, oxygen and sulfur. Specific examples include but are not limited to oxiranyl, oxocyclobutyl, pyrrolidinyl, tetrahydrofuranyl, piperidinyl, piperazinyl, tetrahydropyranyl, homopiperazinyl, etc.

The polycyclic aliphatic heterocycle may be, for example, a 6- to 12-membered polycyclic aliphatic heterocycle containing 1 to 5 heteroatoms selected from the group consisting of nitrogen, oxygen and sulfur, and may be a 6- to 9-membered polycyclic aliphatic heterocycle containing 1 to 3 heteroatoms selected from the group consisting of nitrogen, oxygen and sulfur, or a 6- to 12-membered bicyclic aliphatic heterocycle containing 1 to 5 heteroatoms selected from the group consisting of nitrogen, oxygen and sulfur, a 7- to 10-membered bicyclic aliphatic heterocycle containing 1 to 5 heteroatoms selected from the group consisting of nitrogen, oxygen and sulfur, or a 6- to 9-membered bicyclic aliphatic heterocycle containing 1 to 3 heteroatoms selected from the group consisting of nitrogen, oxygen and sulfur. The bicyclic aliphatic heterocycle can be a spiro heterocycle, a bridged heterocycle or a fused heterocycle, wherein the spiro heterocycle is formed by two rings sharing a carbon atom with each other, for example, a 6- to 9-membered spiro heterocycle containing 1 to 3 (e.g., 1 to 2) heteroatoms selected from the group consisting of nitrogen, oxygen and sulfur. Specific examples thereof include but are not limited to:

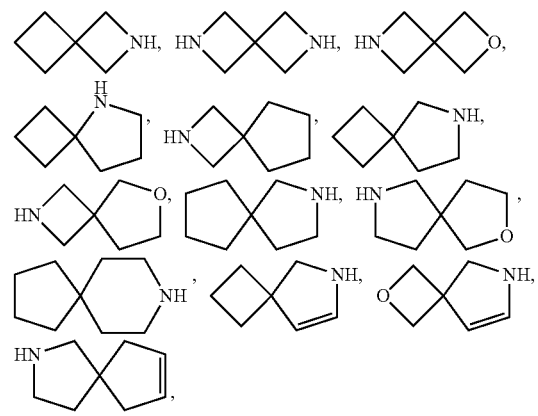

etc.

The bridged heterocycle is formed by two or more than two rings sharing two non-adjacent ring atoms between each other, such as a 6- to 9-membered bridged heterocycle containing 1 to 3 heteroatoms selected from the group consisting of nitrogen, oxygen and sulfur. Specific examples include but are not limited to:

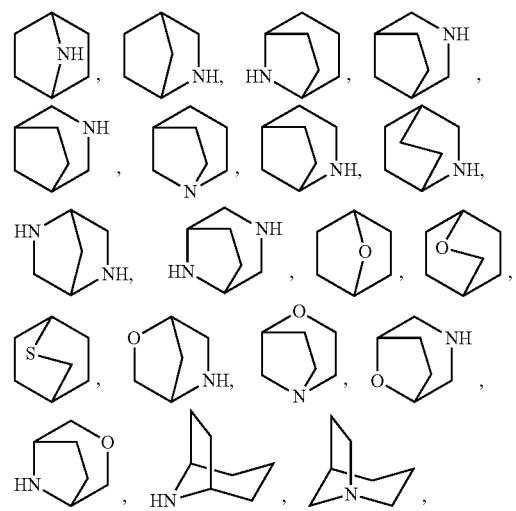

33

-continued

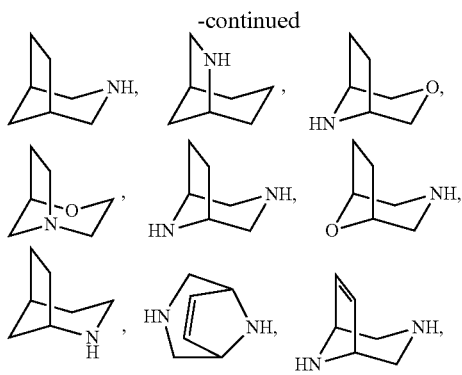

etc.

The fused heterocycle is formed by two or more than two rings sharing two adjacent atoms between each other, for example, a 6- to 9-membered fused heterocycle containing 1 to 3 heteroatoms selected from the group consisting of nitrogen, oxygen and sulfur. Specific examples thereof include but are not limited to:

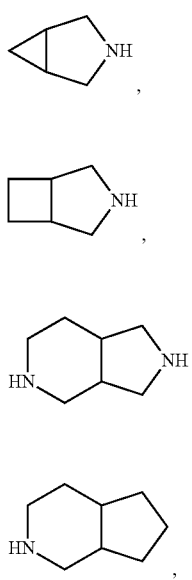

etc.

As used herein, the term "aromatic heterocycle" refers to an aromatic ring group containing at least one ring atom is heteroatom selected from the group consisting of nitrogen, oxygen and sulfur, including monocyclic aromatic heterocycle and polycyclic aromatic heterocycle (e.g., bicyclic aromatic heterocycle). For example, a 5- to 10-membered aromatic heterocycle containing 1 to 5 heteroatoms selected from the group consisting of nitrogen, oxygen and sulfur, a 5- to 6-membered monocyclic aromatic heterocycle containing 1 to 4 (e.g., 1 to 2) heteroatoms selected from the group consisting of nitrogen, oxygen and sulfur, a 8- to 10-membered bicyclic aromatic heterocycle containing 1 to 4 (e.g., 1 to 2) heteroatoms selected from the group consisting of nitrogen, oxygen and sulfur, preferably, the heteroatom is nitrogen. Specific examples thereof include but are not limited to furan ring, thiophene ring, pyrrole ring, thiazole ring, isothiazole ring, thiadiazole ring, oxazole ring, isoxazole ring, oxadiazole ring, imidazole ring, pyrazole ring, 1,2,3-triazole ring, 1,2,4-triazole ring, 1,2,3-oxadiazole ring, 1,2,4-oxadiazole ring, 1,2,5-oxadiazole ring, 1,3,4-oxadiazole ring, pyridine ring, pyrimidine ring, pyridazine ring, pyrazine ring, 1,2,3-triazine ring, 1,3,5-triazine ring, 1,2,4,5-tetrazine ring, benzimidazolyl, imidazopyridyl, quinolinyl, isoquinolinyl, cinnolinyl, quinazolinyl, quinoxalinyl and naphthyridinyl etc.

As used herein, the term "aryl" refers to an aromatic monocyclic or polycyclic hydrocarbonyl, for example, 6- to 10-membered aryl. Specific examples thereof include, but are not limited to, phenyl, naphthyl, anthryl, phenanthryl, etc.

DETAILED DESCRIPTION

Figure 1:
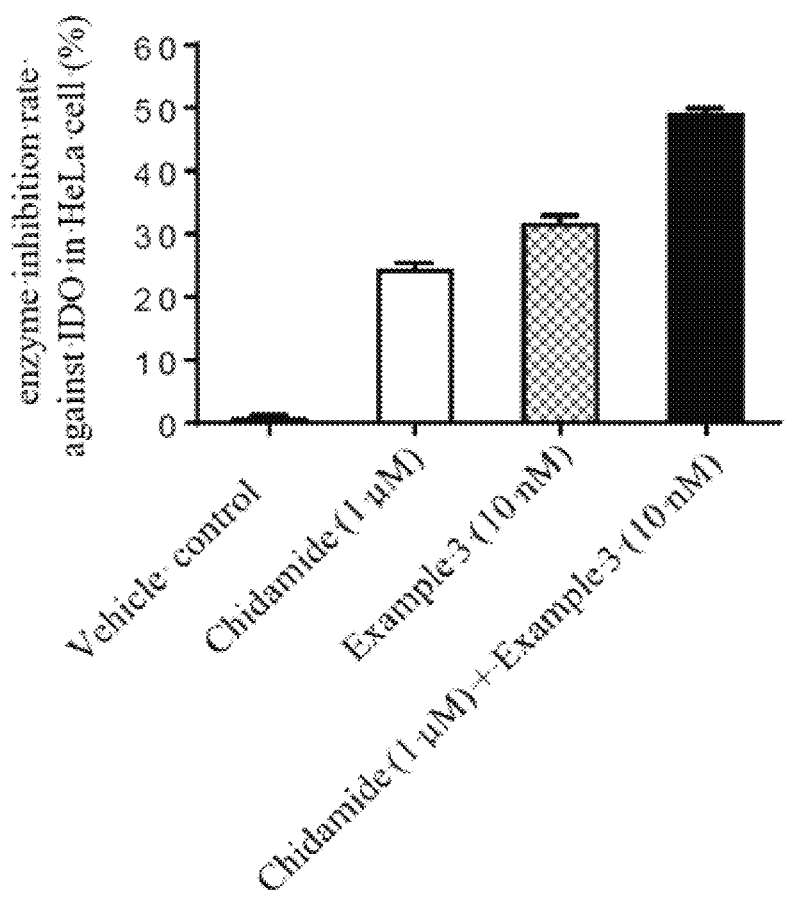
FIG. 1 shows the inhibition of IDO enzyme activity of HeLa cells by Chidamide in combination with Example 3.

The embodiments of the present application will be described in detail below with reference to examples, but those skilled in the art shall understand that the following examples are only used for illustration, and should not be regarded as limiting the scope of the present invention. In the following, if not particularly specified, the materials and operation methods in the present application are well-known in the art. Those without specific conditions in the examples are carried out in accordance with the conventional conditions or the conditions recommended by the manufacturers. The reagents or instruments used without indicating manufacturers are all conventional products obtained from the market.

The complete names represented by the abbreviations of reagents used in the examples are as follows:

KHMDS potassium hexamethyldisilazide
HATU 2-(7-azabenzotriazol-1-yl)-N,N,N',N'-tetramethyluronium hexafluorophosphate
DIPEA diisopropylethylamine
HOBt 1-hydroxybenzotriazole
EDCI·HCl 1-ethyl-(3-dimethylaminopropyl)carbodiimide hydrochloride
DMF N,N-dimethylformamide
THF tetrahydrofuran
EA ethyl acetate
DCM dichloromethane

Example 1: Preparation of tert-butyl 6-((6-fluoroquinolin-4-yl)oxy)-2-aza-spiro[3.3] heptan-2-carboxylate

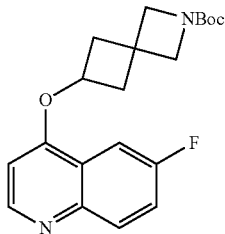 [SMILES: CC(C)(C)OC(=O)N1CC2(CC(Oc3ccnc4ccc(F)cc34)C2)C1]

Tert-butyl 6-Hydroxy-2-aza-spiro[3.3]heptan-2-carboxylate (2.04 g, 9.6 mmol) was dissolved in dioxane (16 mL) and stirred at room temperature, added with KHMDS (9.6 mL, 9.6 mmol), stirred at room temperature for 5 minutes, and then added with a solution of 4-chloro-6-fluoroquinoline (1.46 g, 8.0 mmol) in dioxane (5 mL). The reaction solution was stirred at 60° C. for 30 minutes, cooled to room temperature by stopping heating and stirred for 15 hours, then poured into water, adjusted with aqueous solution of NaHCO$_3$ to reach a pH value of 8-10, extracted with ethyl acetate, the organic phases were combined and dried, filtered, and distilled under reduced pressure to obtain the residue, which was then separated by column chromatography [ethyl acetate/petroleum ether=3/2] to obtain a light yellow viscous oily substance tert-butyl 6-((6-fluoroquinolin-4-yl)oxy)-2-aza-spiro[3.3]heptan-2-carboxylate (1.3 g, yield: 45%), LC-MS (m/z) 359 (M+1).

Example 2: Preparation of 4-((2-aza-spiro[3.3]heptan-6-yl)oxy)-6-fluoroquinoline Hydrochloride

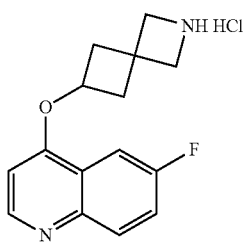

Tert-butyl ((6-Fluoroquinolin-4-yl)oxy)-2-aza-spiro[3.3] heptan-2-carboxylate (1.3 g, 3.6 mmol) was dissolved in 20 mL of dichloromethane, then added with concentrated hydrochloric acid (1 mL). The reaction solution was stirred at room temperature for 16 hours and then concentrated directly to obtain an off-white solid 4-((2-aza-spiro[3.3] heptan-6-yl)oxy)-6-fluoroquinoline hydrochloride (1.0 g, yield: 94%), LC-MS (m/z) 259 (M+1).

Example 3: Preparation of N-(4-chlorophenyl)-6-((6-fluoroquinolin-4-yl)oxy)-2-aza-spiro[3.3]heptan-2-carboxamide

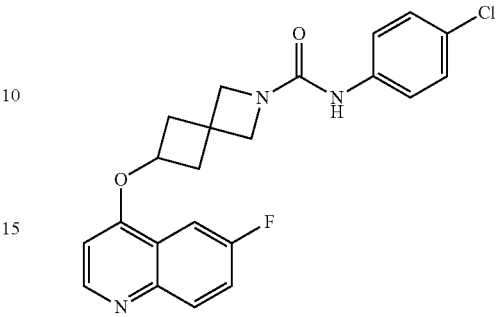

p-Chloroaniline (50 mg, 0.39 mmol) was dissolved in ultra-dry tetrahydrofuran (5 mL), added with triphosgene (116 mg, 0.39 mmol) under ice bath, and then slowly added dropwise with triethylamine (0.2 mL, 1.6 mmol). The reaction solution was stirred for 25 minutes under ice bath, then concentrated under reduced pressure, added with ultra-dry N,N-dimethylformamide (5 mL), and under ice bath added with a solution of 4-((2-aza-spiro[3.3]heptan-6-yl)oxy)-6-fluoroquinoline hydrochloride (115 mg, 0.43 mmol) in N,N-dimethylformamide (1 mL), and then slowly added dropwise with triethylamine (0.3 mL, 2.3 mmol). After the reaction solution was stirred under ice bath for 10 minutes, the ice bath was removed, the reaction solution was stirred at room temperature for 40 minutes, and then poured into water. The solid was precipitated, filtered, washed with water, and dried, the obtained solid was subjected to column chromatography separation [methanol/dichloromethane=1/20] to obtain a white solid N-(4-chlorophenyl)-6-((6-fluoroquinolin-4-yl)oxy)-2-aza-spiro[3.3]heptan-2-carboxamide (120 mg, yield: 70%).

$^1$H NMR (400 MHz, DMSO-d$_6$) δ 8.70 (d, J=5.1 Hz, 1H), 8.55 (s, 1H), 8.02 (dd, J=9.2, 5.4 Hz, 1H), 7.79 (dd, J=9.7, 3.0 Hz, 1H), 7.69-7.62 (m, 1H), 7.56-7.50 (m, 2H), 7.30-7.24 (m, 2H), 6.92 (d, J=5.2 Hz, 1H), 4.97 (p, J=6.6 Hz, 1H), 4.06 (s, 2H), 4.01 (s, 2H), 2.95-2.84 (m, 2H), 2.47-2.39 (m, 2H).

LC-MS (m/z) 412 (M+1).

Example 4: Preparation of N-(3-methoxyphenyl)-6-((6-fluoroquinolin-4-yl)oxy)-2-aza-spiro[3.3]heptan-2-carboxamide

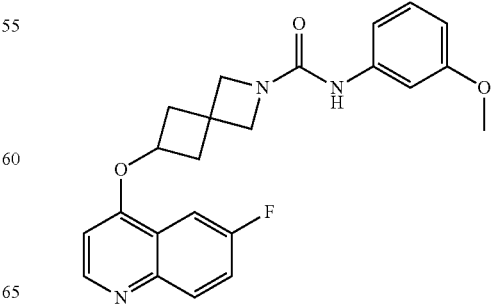

According to the steps similar to those in Example 3, a white solid N-(3-methoxyphenyl)-6-((6-fluoroquinolin-4-yl)oxy)-2-aza-spiro[3.3]heptan-2-carboxamide (32 mg, 57% yield) was prepared from 4-((2-aza-spiro[3.3]heptan-6-yl)oxy)-6-fluoroquinoline hydrochloride (40 mg, 0.14 mmol) and 3-methoxyaniline (18 mg, 0.14 mmol).

$^1$H NMR (400 MHz, DMSO-d$_6$) δ 8.70 (d, J=5.1 Hz, 1H), 8.41 (s, 1H), 8.02 (dd, J=9.2, 5.4 Hz, 1H), 7.79 (dd, J=9.7, 2.9 Hz, 1H), 7.66 (td, J=8.8, 3.0 Hz, 1H), 7.19 (t, J=2.2 Hz, 1H), 7.14-7.03 (m, 2H), 6.92 (d, J=5.3 Hz, 1H), 6.49 (ddd, J=8.0, 2.7, 1.2 Hz, 1H), 4.97 (p, J=6.7 Hz, 1H), 4.05 (s, 2H), 3.99 (s, 2H), 3.69 (s, 3H), 2.92-2.81 (m, 2H), 2.49-2.36 (m, 2H).

LC-MS (m/z) 408 (M+1).

Example 5: Preparation of N-(4-methoxyphenyl)-6-((6-fluoroquinolin-4-yl)oxy)-2-aza-spiro[3.3]heptan-2-carboxamide

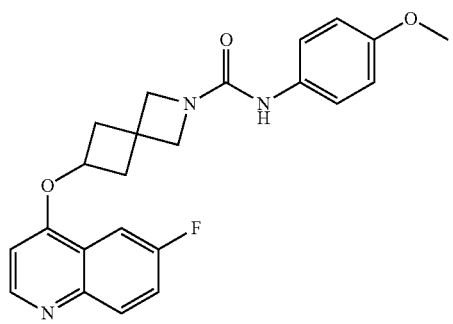 [SMILES: COc1ccc(NC(=O)N2CC3(CC(Oc4ccnc5ccc(F)cc45)C3)C2)cc1]

According to the steps similar to those in Example 3, a white solid N-(4-methoxyphenyl)-6-((6-fluoroquinolin-4-yl)oxy)-2-aza-spiro[3.3]heptan-2-carboxamide (26 mg, 47% yield) was prepared from 4-((2-aza-spiro[3.3]heptan-6-yl)oxy)-6-fluoroquinoline hydrochloride (40 mg, 0.14 mmol) and 4-methoxyaniline (18 mg, 0.14 mmol).

$^1$H NMR (400 MHz, DMSO-d$_6$) δ 8.70 (d, J=5.1 Hz, 1H), 8.25 (s, 1H), 8.02 (dd, J=9.4, 5.3 Hz, 1H), 7.83-7.75 (m, 1H), 7.66 (t, J=8.8 Hz, 1H), 7.37 (d, J=8.7 Hz, 2H), 6.92 (d, J=5.2 Hz, 1H), 6.81 (d, J=8.6 Hz, 2H), 5.02-4.92 (m, 1H), 4.03 (s, 2H), 3.97 (s, 2H), 3.69 (s, 3H), 3.32 (s, 5H), 2.87 (s, 2H), 2.44 (d, J=6.7 Hz, 2H).

LC-MS (m/z) 408 (M+1).

Example 6: Preparation of (4-chlorophenyl)(6-((6-fluoroquinolin-4-yl)oxy)-2-aza-spiro[3.3]heptan-2-yl) methanone

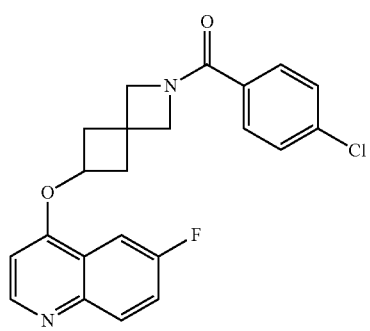 [SMILES: O=C(c1ccc(Cl)cc1)N1CC2(CC(Oc3ccnc4ccc(F)cc34)C2)C1]

4-((2-Aza-spiro[3.3]heptan-6-yl)oxy)-6-fluoroquinoline hydrochloride (60 mg, 0.2 mmol) was dissolved in 10 ml of DMF, then added with p-chlorobenzoic acid (38.2 mg, 0.24 mmol), EDCI (77.8 mg, 0.4 mmol), HOBt (55 mg, 0.4 mmol), DIPEA 1 ml, stirred at room temperature for 16 hours, the reaction solution was poured into 40 ml of ice water, extracted with ethyl acetate (20 ml) twice, the organic phases were combined, washed with saturated brine (40 ml), dried over anhydrous sodium sulfate, subjected to rotary evaporation to remove the organic phase, and separated by column chromatography (dichloromethane/methanol=20/1) to obtain a white solid (20 mg, 25% yield).

$^1$H NMR (400 MHz, DMSO-d$_6$) δ 8.68 (d, J=5.1 Hz, 1H), 8.01 (dd, J=9.2, 5.4 Hz, 1H), 7.76 (t, J=7.4 Hz, 1H), 7.70-7.59 (m, 3H), 7.51 (t, J=9.2 Hz, 2H), 6.87 (dd, J=17.2, 5.2 Hz, 1H), 4.93 (p, J=6.6 Hz, 1H), 3.54-3.40 (m, 4H), 2.88 (t, J=9.9 Hz, 2H), 2.43 (d, J=8.5 Hz, 2H).

LC-MS (m/z) 397 (M+1).

Example 7: Preparation of (E)-3-(4-chlorophenyl)-1-(6-((6-fluoroquinolin-4-yl)oxy)-2-aza-spiro[3.3]heptan-2-yl)prop-2-en-1-one

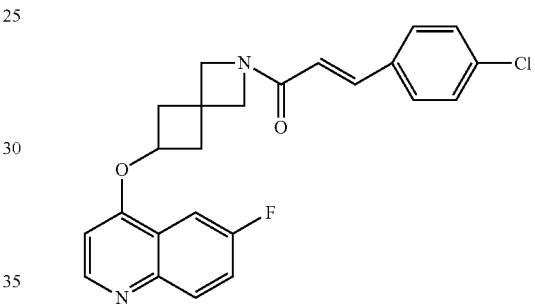

According to the steps similar to those in Example 6, a white solid (E)-3-(4-chlorophenyl)-1-(6-((6-fluoroquinolin-4-yl)oxy)-2-aza-spiro[3.3]heptan-2-yl)prop-2-en-1-one (18 mg, 21% yield) was prepared from 4-((2-aza-spiro[3.3]heptan-6-yl)oxy)-6-fluoroquinoline hydrochloride (40 mg, 0.14 mmol) and 4-chlorocinnamic acid (18 mg, 0.14 mmol).

$^1$H NMR (400 MHz, DMSO-d$_6$) δ 8.71 (d, J=5.1 Hz, 1H), 8.03 (dd, J=9.2, 5.4 Hz, 1H), 7.92 (td, J=6.4, 3.7 Hz, 1H), 7.80 (dd, J=9.7, 2.9 Hz, 1H), 7.75 (dd, J=15.6, 1.7 Hz, 1H), 7.66 (td, J=8.8, 3.0 Hz, 1H), 7.57-7.49 (m, 1H), 7.47-7.35 (m, 2H), 6.92 (t, J=4.9 Hz, 1H), 6.77 (dd, J=15.6, 8.5 Hz, 1H), 4.99 (p, J=6.6 Hz, 1H), 4.40 (d, J=27.1 Hz, 2H), 4.07 (d, J=27.4 Hz, 2H), 2.92 (ddd, J=13.1, 6.2, 2.6 Hz, 2H), 2.46 (ddt, J=9.7, 6.2, 3.2 Hz, 2H).

LC-MS (m/z) 423 (M+1).

Example 8: Preparation of p-nitrocinnamyl Methyl Ether

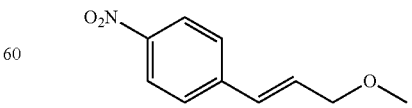

p-Nitrocinnamyl alcohol (200 mg, 1.1 mmol) was dissolved in 20 ml of dry tetrahydrofuran, stirred under nitrogen protection until fully dissolved, added with sodium hydride (178 mg, 4.4 mmol), reacted under stirring for 20 minutes, then added with methyl iodide (174 mg, 1.2 mmol), reacted at room temperature for 16 hours, the reaction solution was poured into 20 ml of ice water, extracted twice with ethyl acetate (20 ml), dried over anhydrous sodium sulfate, subjected to rotary evaporation to remove the organic phase, and separated by solid column chromatography [ethyl acetate/petroleum ether=1/2] to obtain a light yellow solid (60 mg, 28% yield).

Example 9: Preparation of p-aminocinnamyl Methyl Ether

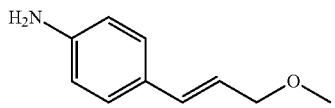

p-Nitrocinnamyl methyl ether (60 mg, 0.31 mmol) was dissolved in 10 ml of ethanol, added with iron powder (52 mg, 0.93 mmol), stirred for 10 minutes, heated to reflux for 2 hours, poured into ice water (20 ml), adjusted with sodium bicarbonate to pH=8, extracted twice with ethyl acetate (20 ml), the organic phases were combined, dried over anhydrous sodium sulfate, filtered, and distilled under reduced pressure to obtain the residue, which was then separated by column chromatography [ethyl acetate/petroleum ether=3/2] to obtain a brown solid (20 mg, 39% yield), LC-MS (m/z) 164 (M+1).

Example 10: Preparation of (E)-(6-(((6-fluoroquinolin-4-yl)oxy)-N-(4-(3-methoxyprop-1-en-1-yl)phenyl)-2-aza-spiro[3.3]heptan-2-carboxamide

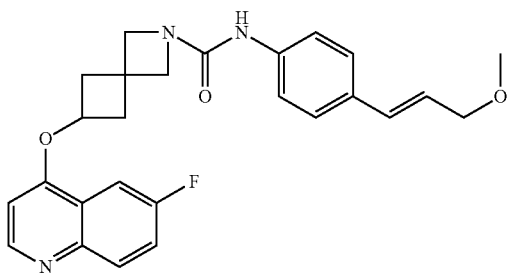 [SMILES: COC/C=C/c1ccc(NC(=O)N2CC3(CC(Oc4ccnc5ccc(F)cc45)C3)C2)cc1]

According to the steps similar to those in Example 3, a white solid (E)-(6-(((6-fluoroquinolin-4-yl)oxy)-N-(4-(3-methoxyprop-1-en-1-yl)phenyl)-2-aza-spiro[3.3]heptan-2-carboxamide (6 mg, 11% yield) was prepared from 4-((2-aza-spiro[3.3]heptan-6-yl)oxy)-6-fluoroquinoline hydrochloride (36 mg, 0.12 mmol) and p-aminocinnamyl methyl ether (20 mg, 0.12 mmol).

1H NMR (400 MHz, DMSO-d6) δ 8.71 (d, J=5.1 Hz, 1H), 8.48 (s, 1H), 8.03 (dd, J=9.3, 5.4 Hz, 1H), 7.80 (dd, J=9.7, 3.0 Hz, 1H), 7.66 (ddd, J=9.3, 8.4, 3.0 Hz, 1H), 7.48 (d, J=8.7 Hz, 2H), 7.32 (d, J=8.6 Hz, 2H), 6.93 (d, J=5.2 Hz, 1H), 6.51 (d, J=16.2 Hz, 1H), 6.20 (dt, J=16.0, 6.0 Hz, 1H), 5.76 (s, 2H), 5.07-4.89 (m, 1H), 4.07 (s, 2H), 4.04-3.94 (m, 2H), 3.27 (s, 3H), 2.95-2.76 (m, 2H), 2.48-2.34 (m, 2H).

LC-MS (m/z) 448 (M+1).

Example 11: Preparation of 1-(6-((6-fluoroquinolin-4-yl)oxy)-2-aza-cyclo[3.3]heptan-2-yl)-2-(anilino)ethyl-1-one

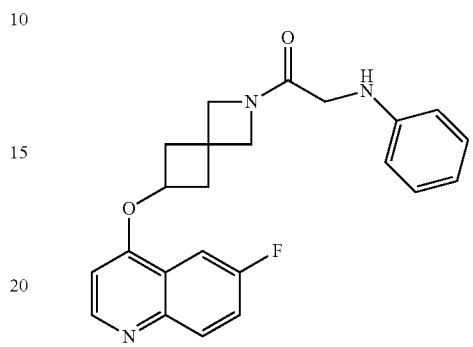

According to the steps similar to those in Example 6, a white solid 1-(6-((6-fluoroquinolin-4-yl)oxy)-2-aza-cyclo[3.3]heptan-2-yl)-2-(anilino)ethyl-1-one (35 mg, 52% yield) was prepared from 4-((2-aza-spiro[3.3]heptan-6-yl)oxy)-6-fluoroquinoline hydrochloride (50 mg, 0.17 mmol) and 2-(anilino)acetic acid (30.8 mg, 0.2 mmol).

$^1$H NMR (400 MHz, DMSO-d$_6$) δ 8.69 (d, J=5.1 Hz, 1H), 8.02 (dd, J=9.4, 5.4 Hz, 1H), 7.77 (t, J=6.9 Hz, 1H), 7.64 (t, J=8.6 Hz, 1H), 7.08 (q, J=7.5 Hz, 2H), 6.92-6.86 (m, 1H), 6.62-6.52 (m, 2H), 5.75 (s, 2H), 5.00-4.89 (m, 1H), 4.02 (s, 2H), 3.94 (s, 2H), 3.67 (d, J=10.4 Hz, 2H), 2.94-2.80 (m, 2H), 2.45-2.40 (m, 2H).

LC-MS (m/z) 492 (M+1).

Example 12: Preparation of tert-butyl 6-(((6-fluoroquinolin-4-yl)oxy)-3-aza-cyclo[3.1.0]hexan-3-carboxylate

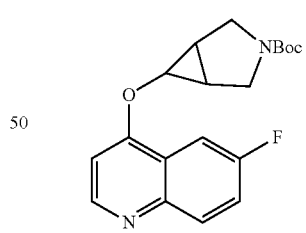

Tert-butyl 6-hydroxy-3-aza-bicyclo[3.1.0]hexan-3-carboxylate (603 mg, 3.03 mmol) was dissolved in 30 ml of DMF, added with sodium hydride (550 mg, 13.7 mmol) under ice bath, stirred for 30 minutes, then added with 6-fluoro-4-chloroquinoline (500 mg, 2.75 mmol), heated to 75° C. and reacted for 2 hours, poured into ice water (20 ml), and extracted twice with ethyl acetate (20 ml), dried over anhydrous sodium sulfate, subjected to rotary evaporation to remove the solvent, separated by column chromatography (ethyl acetate:petroleum ether=1:1) to obtain a white solid (230 mg, 24% yield), LC-MS (m/z) 345 (M+1).

Example 13: Preparation of 4-((3-aza-cyclo[3.1.0]hex-4-yl)oxy)-6-fluoroquinoline Hydrochloride

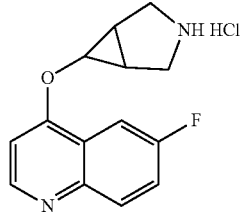

Tert-butyl ((6-fluoroquinolin-4-yl)oxy)-3-aza-cyclo[3.1.0]hexan-3-carboxylate (50 mg, 0.145 mmol) was dissolved in 20 mL of dichloromethane, then added with concentrated hydrochloric acid (0.5 mL), stirred at room temperature for 3 hours, and then concentrated directly to obtain a white solid (38.8 mg, 95% yield), LC-MS (m/z) 245 (M+1).

Example 14: Preparation of 1-(6-(((6-fluoroquinolin-4-yl)oxy)-2-aza-cyclo[3.1.0]hept-3-yl)-2-(anilino)ethyl-1-one

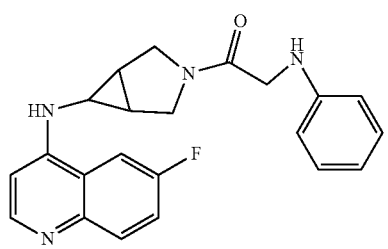 [SMILES: O=C(CNc1ccccc1)N1CC2C(C1)C2Nc1ccnc2ccc(F)cc12]

According to the steps similar to those in Example 6, a white solid 1-(6-(((6-fluoroquinolin-4-yl)oxy)-2-aza-cyclo[3.1.0]hept-3-yl)-2-(anilino)ethyl-1-one (60 mg, 89% yield) was prepared from 4-((3-aza-cyclo[3.1.0]hex-4-yl)oxy)-6-fluoroquinoline hydrochloride (50 mg, 0.18 mmol) and 2-(anilino)acetic acid (33.7 mg, 0.21 mmol).

$^1$H NMR (400 MHz, DMSO-d$_6$) δ 8.47 (d, J=5.2 Hz, 1H), 8.01 (dd, J=11.0, 2.8 Hz, 1H), 7.86 (dd, J=9.2, 5.8 Hz, 1H), 7.52 (ddd, J=9.3, 8.1, 2.7 Hz, 1H), 7.43 (s, 1H), 7.09 (dd, J=8.4, 7.1 Hz, 2H), 6.74 (d, J=5.2 Hz, 1H), 6.68-6.61 (m, 2H), 6.56 (tt, J=7.2, 1.1 Hz, 1H), 5.53 (t, J=5.1 Hz, 1H), 3.99 (d, J=10.4 Hz, 1H), 3.91-3.86 (m, 2H), 3.78-3.69 (m, 2H), 3.53-3.47 (m, 2H), 2.32 (d, J=2.4 Hz, 2H).

LC-MS (m/z) 377 (M+1).

Example 15: Preparation of N-(4-chlorobenzyl)-6-(((6-fluoroquinolin-4-yl)oxy)-2-aza-spiro[3.3]heptan-2-carboxamide

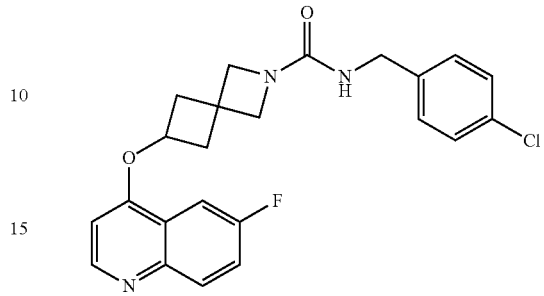

According to the steps similar to those in Example 3, a white solid N-(4-chlorobenzyl)-6-(((6-fluoroquinolin-4-yl)oxy)-2-aza-spiro[3.3]heptan-2-carboxamide (20 mg, 14% yield) was prepared from 4-((2-aza-spiro[3.3]heptan-6-yl)oxy)-6-fluoroquinoline hydrochloride (100 mg, 0.36 mmol) and 4-chlorobenzylamine (40 mg, 0.36 mmol).

$^1$H NMR (400 MHz, DMSO-d$_6$) δ 8.72 (d, J=5.1 Hz, 1H), 8.04 (dd, J=9.2, 5.4 Hz, 1H), 7.80 (dd, J=9.7, 3.0 Hz, 1H), 7.67 (td, J=8.8, 3.0 Hz, 1H), 7.42-7.35 (m, 2H), 7.29 (d, J=8.4 Hz, 2H), 6.94 (dd, J=7.7, 5.5 Hz, 2H), 4.97 (p, J=6.7 Hz, 1H), 4.20 (d, J=6.1 Hz, 2H), 3.96 (s, 2H), 3.89 (s, 2H), 2.91-2.80 (m, 2H), 2.46-2.34 (m, 2H).

LC-MS (m/z) 426 (M+1).

Example 16: Preparation of N-(4-fluorophenyl)-6-(((6-fluoroquinolin-4-yl)oxy)-2-aza-spiro[3.3]heptan-2-carboxamide

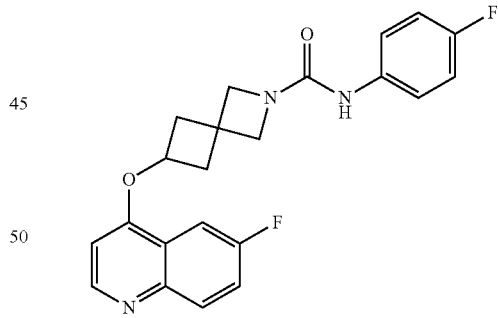

According to the steps similar to those in Example 3, a white solid N-(4-fluorophenyl)-6-(((6-fluoroquinolin-4-yl)oxy)-2-aza-spiro[3.3]heptan-2-carboxamide (20 mg, 14% yield) was prepared from 4-((2-aza-spiro[3.3]heptan-6-yl)oxy)-6-fluoroquinoline hydrochloride (100 mg, 0.36 mmol) and 4-fluoroaniline (40 mg, 0.36 mmol).

$^1$H NMR (400 MHz, DMSO-d$_6$) δ 8.70 (d, J=5.1 Hz, 1H), 8.47 (s, 1H), 8.03 (dd, J=9.2, 5.4 Hz, 1H), 7.79 (dd, J=9.7, 3.0 Hz, 1H), 7.66 (m, 1H), 7.49 (m, 2H), 7.05 (m, 2H), 6.92 (d, J=5.1 Hz, 1H), 4.97 (t, J=6.7 Hz, 1H), 4.05 (s, 2H), 4.00 (s, 2H), 2.91-2.86 (m, 2H), 2.46-2.41 (m, 2H).

LC-MS (m/z) 396 (M+1).

Example 17: Preparation of tert-butyl 6-((6-fluoro-quinolin-4-yl)amino)-2-aza-spiro[3.4]octan-2-carboxylate

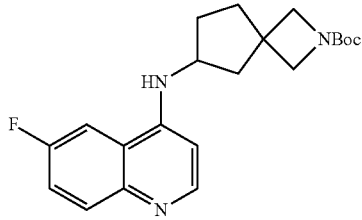 [SMILES: CC(C)(C)OC(=O)N1CC2(CCC(Nc3ccnc4ccc(F)cc34)C2)C1]

4-Chloro-6-fluoroquinoline (181 mg, 1.0 mmol), tert-butyl 6-amino-2-azo-azole[3.4]octan-2-carboxylate (226 mg, 1.0 mmol) and cesium carbonate (980 mg, 3.0 mmol) were dissolved in dioxane (5 mL), then added with 2-dicyclohexylphospho-2,4,6-triisopropylbiphenyl (48 mg, 0.1 mmol) and tri(dibenzylideneacetone) dipalladium (46 mg, 0.05 mmol), protected by nitrogen atmosphere. The reaction solution was heated to 123° C. and stirred for 7 hours, then poured into water, extracted with ethyl acetate, washed with water, and the organic phase was concentrated under reduced pressure to obtain a residue, which was separated by column chromatography to obtain tert-butyl 6-((6-fluoroquinolin-4-yl)amino)-2-aza-spiro[3.4]octan-2-carboxylate (100 mg, 27% yield), LC-MS (m/z) 372 (M+1).

Example 18: Preparation of 4-(2-aza-spiro[3.4]oct-6-yl)amino-6-fluoroquinoline Hydrochloride

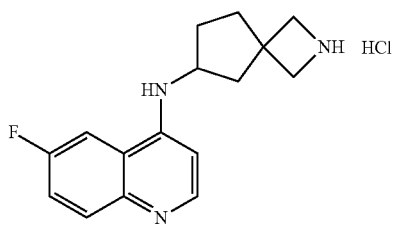 [SMILES: Fc1ccc2nccc(NC3CCC4(CNC4)C3)c2c1 ; Cl]

Tert-butyl ((6-fluoroquinolin-4-yl)amino)-2-aza-spiro[3.4]octan-2-carboxylate (100 mg, 0.27 mmol) was dissolved in 5 mL of dichloromethane, then added with concentrated hydrochloric acid (1 mL). The reaction solution was stirred at room temperature for 16 hours and then concentrated directly to obtain an off-white solid 4-(2-aza-spiro[3.4]oct-6-yl)amino-6-fluoroquinoline hydrochloride (80 mg, 94% yield), LC-MS (m/z) 272 (M+1).

Example 19: Preparation of N-(4-chlorophenyl)-2-(6-((6-fluoroquinolin-4-yl)amino)-2-aza-spiro[3.4]octan-2-carboxamide

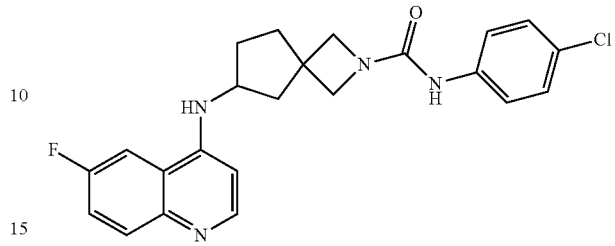

p-Chloroaniline (30 mg, 0.24 mmol) was dissolved in ultra-dry tetrahydrofuran (5 mL), added with triphosgene (70 mg, 0.24 mmol) under ice bath, then slowly added dropwise with triethylamine (0.2 mL, 1.6 mmol). The reaction solution was stirred under ice bath for 25 minutes, then concentrated under reduced pressure, added with ultra-dry N,N-dimethylformamide (5 mL), added under ice bath with a solution of 4-(2-aza-spiro[3.4]oct-6-yl)amino-6-fluoroquinoline hydrochloride (65 mg, 0.21 mmol) in N,N-dimethylformamide (1 mL), then slowly added dropwise with triethylamine (0.3 mL, 2.3 mmol). After the reaction solution was stirred for 10 minutes under ice bath, the ice bath was removed. The reaction solution was stirred at room temperature for 40 minutes, then poured into water to precipitate a solid, which was filtered, washed with water, and dried and separated by solid column chromatography [methanol/dichloromethane=1/20] to obtain a white solid N-(4-chlorophenyl)-2-(6-((6-fluoroquinolin-4-yl)amino)-2-aza-spiro[3.4]octan-2-carboxamide (68 mg, 70% yield).
$^1$H NMR (400 MHz, DMSO-$d_6$) δ 8.53 (s, 1H), 8.41 (d, J=5.3 Hz, 1H), 8.18 (dd, J=11.2, 2.9 Hz, 1H), 7.85 (dd, J=9.2, 5.8 Hz, 1H), 7.54 (d, J=9.0 Hz, 2H), 7.28 (d, J=8.9 Hz, 2H), 6.81 (d, J=6.0 Hz, 1H), 6.51 (d, J=5.4 Hz, 1H), 3.98-3.81 (m, 3H), 2.43-2.33 (m, 1H), 2.21-2.11 (m, 2H), 2.10-1.96 (m, 2H), 1.96-1.84 (m, 2H), 1.83-1.73 (m, 2H). LC-MS (m/z) 425 (M+1).

Example 20: Preparation of N-(benzo[d][1,3]dioxol-5-yl)-6-((6-fluoroquinolin-4-yl)oxy)-2-aza-spiro[3.3]heptan-2-carboxamide

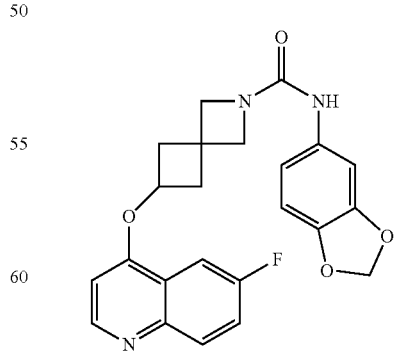

According to the steps similar to those in Example 3, a white solid N-(benzo[d] [1,3]dioxol-5-yl)-6-((6-fluoroquinolin-4-yl)oxy)-2-aza-spiro[3.3]heptan-2-carboxamide (45 mg, 45% yield) was prepared from 4-((2-aza-spiro[3.3] heptan-6-yl)oxy)-6-fluoroquinoline hydrochloride (65 mg, 0.22 mmol) and 3,4-methylenedioxyaniline (33 mg, 0.242 mmol).

¹H NMR (400 MHz, DMSO-d₆) δ 8.70 (d, J=5.1 Hz, 1H), 8.31 (s, 1H), 8.02 (dd, J=9.2, 5.4 Hz, 1H), 7.79 (dd, J=9.7, 3.0 Hz, 1H), 7.66 (td, J=8.8, 3.0 Hz, 1H), 7.18 (d, J=2.0 Hz, 1H), 6.92 (d, J=5.2 Hz, 1H), 6.85 (dd, J=8.4, 2.1 Hz, 1H), 6.77 (d, J=8.4 Hz, 1H), 5.93 (s, 2H), 4.97 (p, J=6.6 Hz, 1H), 4.03 (s, 2H), 3.97 (s, 2H), 2.94-2.79 (m, 2H), 2.47-2.38 (m, 2H).

LC-MS (m/z) 422 (M+1).

Example 21: Preparation of tert-butyl 6-((quinolin-4-yl)oxy)-2-aza-spiro[3.4]heptan-2-carboxylate

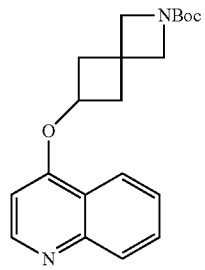 [SMILES: CC(C)(C)OC(=O)N1CC2(CC(Oc3ccnc4ccccc34)C2)C1]

Tert-butyl 6-hydroxy-2-aza-spiro[3.3]heptan-2-carboxylate (0.717 g, 3.3 mmol) was dissolved in dioxane (20 mL) and stirred at room temperature, added with KHMDS (3.6 mL, 3.6 mmol), stirred at room temperature for 30 minutes, then added with a solution of 4-chloroquinoline (0.5 g, 3.0 mmol) in dioxane (5 mL). The reaction solution was stirred at 75° C. for 60 minutes, cooled to room temperature by stopping heating and stirred for 15 hours, then poured into 20 ml of water, extracted twice with ethyl acetate (20 ml), the organic phases were combined, dried, filtered, and distilled under reduced pressure to obtain a residue, which was then separated by column chromatography (ethyl acetate/petroleum ether=3/2) to obtain a light yellow oil (0.35 g, 33% yield), LC-MS (m/z) 341.16 (M+1).

Example 22: Preparation of 4-(2-aza-spiro[3.3]heptan-6-yl)oxyquinoline Hydrochloride

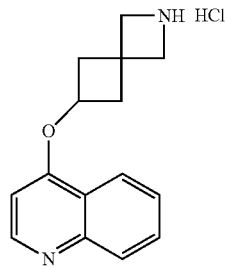

Tert-butyl 6-((quinolin-4-yl)oxy)-2-aza-spiro[3.4]heptan-2-carboxylate (0.35 g, 1.028 mmol) was dissolved in 20 mL of dichloromethane, then added with concentrated hydrochloric acid (0.5 mL), stirred at room temperature for 3 hours, and then directly concentrated to obtain an off-white solid (0.235 g, 95% yield), LC-MS (m/z) 241.2 (M+1).

Example 23: Preparation of N-(4-chlorophenyl)-6-(quinolin-4-yloxy)-2-aza-spiro[3.3]heptan-2-carboxamide

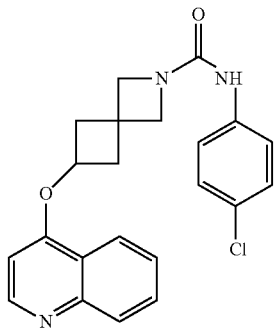 [SMILES: O=C(Nc1ccc(Cl)cc1)N1CC2(CC(Oc3ccnc4ccccc34)C2)C1]

p-Chloroaniline (25.3 mg, 0.198 mmol) was dissolved in ultra-dry dichloromethane (10 mL), protected by nitrogen, added with triphosgene (21.4 mg, 0.072 mmol) under ice bath, then added with triethylamine (0.5 mL, 3.6 mmol), stirred under ice bath for 25 minutes, then added under ice bath with a solution of 4-(2-aza-spiro[3.3]heptan-6-yl)oxyquinoline hydrochloride (50 mg, 0.18 mmol) in dichloromethane (5 mL) and triethylamine (0.5 ml), the reaction solution was stirred under ice bath for 10 minutes, then the ice bath was removed, the reaction solution was stirred at room temperature for 120 minutes, added with 5 ml of methanol and stirred for 5 minutes, subjected to rotary evaporation to remove the solvent, and separated by solid column chromatography [methanol/dichloromethane=1/20] to obtain a white solid (38 mg, 53.6% yield).

¹H NMR (400 MHz, DMSO-d₆) δ 8.71 (d, J=5.1 Hz, 1H), 8.57 (s, 1H), 8.17-8.10 (m, 1H), 7.95 (d, J=8.4 Hz, 1H), 7.74 (ddd, J=8.6, 6.8, 1.5 Hz, 1H), 7.62-7.48 (m, 3H), 7.30-7.24 (m, 2H), 6.88 (d, J=5.2 Hz, 1H), 4.97 (t, J=6.6 Hz, 1H), 4.07 (s, 2H), 4.01 (s, 2H), 2.96-2.84 (m, 2H), 2.48-2.37 (m, 2H).

LC-MS (m/z) 394 (M+1).

Example 24: Preparation of tert-butyl 6-((quinolin-3-yl)oxy)-2-aza-spiro[3.4]heptan-2-carboxylate

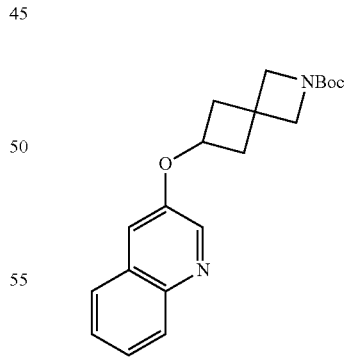

Tert-butyl 6-hydroxy-2-aza-spiro[3.3]heptan-2-carboxylate (98.7 mg, 0.458 mmol) was dissolved in 10 ml of DMF, added with sodium hydride (61.1 mg, 1.5 mmol) and stirred for 30 minutes, then added with 3-chloroquinoline (50 mg, 0.3 mmol), heated to 75° C. and reacted for 1 hour, poured into ice water (20 ml), extracted twice with ethyl acetate (20 ml), the organic phases were combined, dried over anhydrous sodium sulfate, filtered, and distilled under reduced

Example 25: Preparation of 3-(2-aza-spiro[3.3]heptan-6-yl)oxyquinoline Hydrochloride

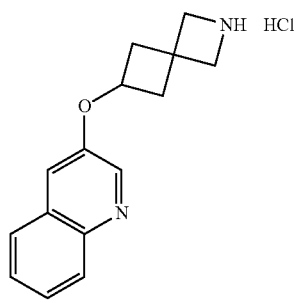 [SMILES: c1ccc2ncc(OC3CC4(CNC4)C3)cc2c1 ; Cl]

Tert-butyl 6-((quinolin-3-yl)oxy)-2-aza-spiro[3.4]heptan-2-carboxylate (30 mg, 0.088 mmol) was dissolved in 20 mL of dichloromethane, added with concentrated hydrochloric acid (0.5 mL) stirred at room temperature for 3 hours and then concentrated directly to obtain a white solid (23.1 mg, 95% yield), LC-MS (m/z) 241 (M+1).

Example 26: Preparation of N-(4-chlorophenyl)-6-(quinolin-3-yloxy)-2-aza-spiro[3.3]heptan-2-carboxamide

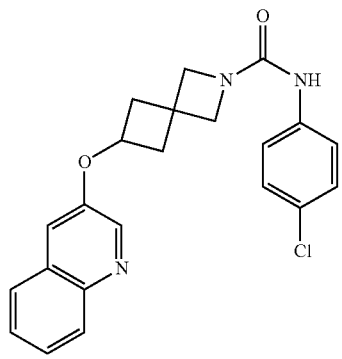 [SMILES: O=C(Nc1ccc(Cl)cc1)N1CC2(CC(Oc3cnc4ccccc4c3)C2)C1]

p-Chloroaniline (13.5 mg, 0.1 mmol) was dissolved in ultra-dry dichloromethane (10 mL), protected by nitrogen, added with triphosgene (13 mg, 0.043 mmol) under ice bath, then added with triethylamine (0.5 mL, 3.6 mmol), stirred under ice bath for 25 minutes, then added under ice bath with a solution of 3-(2-aza-spiro[3.3]heptan-6-yl)oxyquinoline hydrochloride (23.1 mg, 0.08 mmol) in dichloromethane (5 mL) and triethylamine (0.5 ml), the reaction solution was stirred under ice bath for 10 minutes, then the ice bath was removed, the reaction solution was stirred at room temperature for 120 minutes, added with 5 ml of methanol and stirred for 5 minutes, subjected to rotary evaporation to remove the solvent, and separated by solid column chromatography [methanol/dichloromethane=1/20] to obtain a white solid (25 mg, 79% yield).

$^1$H NMR (400 MHz, DMSO-d$_6$) δ 8.60 (d, J=2.8 Hz, 2H), 7.95-7.88 (m, 2H), 7.63-7.52 (m, 5H), 7.27 (d, J=8.9 Hz, 2H), 4.86-4.82 (m, 1H), 4.06 (s, 2H), 3.99 (s, 2H), 2.89-2.84 (m, 2H), 2.37-2.32 (m, 2H).

LC-MS (m/z) 394.2 (M+1).

Example 27: Preparation of tert-butyl 6-(quinazolin-4-yloxy)-2-aza-spiro[3.3]heptan-2-carboxylate

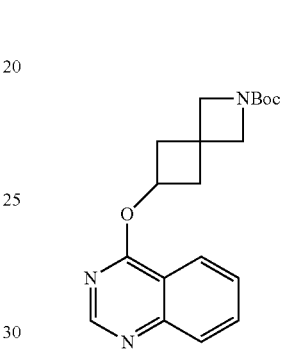

Tert-butyl 6-hydroxy-2-aza-spiro[3.3]heptan-2-carboxylate (155.5 mg, 0.729 mmol) was dissolved in 20 ml of DMF, added with sodium hydride (120 mg, 3 mmol) under ice bath and stirred for 30 minutes, then added with 3-chloroquinoline (100 mg, 0.6 mmol), reacted at room temperature for 0.5 hours, poured into ice water (30 ml), extracted twice with ethyl acetate (20 ml), the organic phases were combined, dried over anhydrous sodium sulfate, filtered, and subjected to rotary evaporation under reduced pressure to obtain a brown liquid (120 mg, 58% yield). LC-MS (m/z) 342 (M+1).

Example 28: Preparation of 4-(2-aza-spiro[3.3]heptan-6-yl)oxyquinazoline Trifluoroacetate

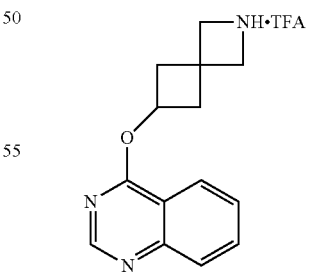

Tert-butyl 6-(quinazolin-4-yloxy)-2-aza-spiro[3.3]heptan-2-carboxylate (70 mg, 0.2 mmol) was dissolved in 20 mL of dichloromethane, then added with trifluoroacetic acid (0.5 mL), stirred at room temperature for 3 hours and concentrated directly to obtain a gray liquid (58.7 mg, 95% yield). LC-MS (m/z) 241 (M+1).

Example 29: Preparation of N-(4-chlorophenyl)-6-(quinazolin-4-yloxy)-2-aza-spiro[3.3]heptan-2-carboxamide

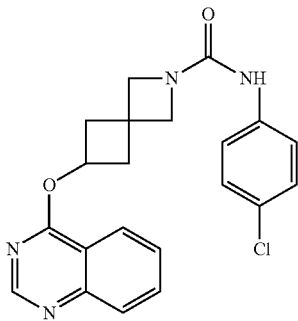 [SMILES: O=C(Nc1ccc(Cl)cc1)N1CC2(CC(Oc3ncnc4ccccc34)C2)C1]

p-Chloroaniline (31.3 mg, 0.24 mmol) was dissolved in ultra-dry dichloromethane (10 mL), protected by nitrogen, added with triphosgene (24 mg, 0.08 mmol) under ice bath, then added with triethylamine (0.5 mL, 3.6 mmol), stirred under ice bath for 25 minutes, added under ice bath with a solution of 4-(2-aza-spiro[3.3]heptan-6-yl)oxyquinazoline trifluoroacetate (58.7 mg, 0.195 mmol) in dichloromethane (5 mL) and triethylamine (0.5 ml), the reaction solution was stirred under ice bath for 10 minutes, then the ice bath was removed, the reaction solution was stirred at room temperature for 120 minutes, added with 5 ml of methanol, stirred for 5 minutes, subjected to rotary evaporation to remove the solvent, and separated by solid column chromatography [methanol/dichloromethane=1/20] to obtain a white solid (30 mg, 39% yield).

$^1$H NMR (400 MHz, DMSO-d$_6$) δ 8.78 (s, 1H), 8.56 (s, 1H), 8.21-8.13 (m, 1H), 8.01-7.86 (m, 2H), 7.70 (ddd, J=8.2, 6.6, 1.5 Hz, 1H), 7.57-7.49 (m, 2H), 7.31-7.20 (m, 2H), 5.40 (p, J=6.9 Hz, 1H), 5.00 (d, J=6.2 Hz, 4H), 2.90-2.80 (m, 2H), 2.49-2.42 (m, 2H).

LC-MS (m/z) 395 (M+1).

Example 30: Preparation of N-(4-fluorophenyl)-6-((6-fluoroquinolin-4-yl)oxy)-3-aza-cyclo[3.1.0]hexan-3-carboxamide

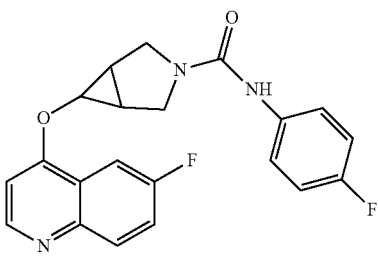 [SMILES: O=C(Nc1ccc(F)cc1)N1CC2C(C1)C2Oc1ccnc2ccc(F)cc12]

p-Fluoroaniline (19.3 mg, 0.174 mmol) was dissolved in ultra-dry dichloromethane (10 mL), protected by nitrogen, added with triphosgene (17.2 mg, 0.058 mmol) under ice bath, then added with triethylamine (0.5 mL, 3.6 mmol), stirred under ice bath for 25 minutes, added under ice bath with a solution of 4-((3-aza-cyclo[3.1.0]hex-4-yl)oxy)-6-fluoroquinoline hydrochloride (38.8 mg, 0.138 mmol) in dichloromethane (5 mL) and triethylamine (0.5 ml), the reaction solution was stirred under ice bath for 10 minutes, then the ice bath was removed, the reaction solution was stirred at room temperature for 120 minutes, added with 5 ml of methanol, stirred for 5 minutes, subjected to rotary evaporation to remove the solvent, and separated by solid column chromatography [methanol/dichloromethane=1/20] to obtain a white solid (18 mg, 34% yield).

$^1$H NMR (400 MHz, DMSO-d$_6$) δ 8.77 (d, J=5.1 Hz, 1H), 8.23 (s, 1H), 8.04 (dd, J=9.2, 5.4 Hz, 1H), 7.73 (dd, J=9.7, 2.9 Hz, 1H), 7.70-7.62 (m, 1H), 7.56-7.47 (m, 2H), 7.30 (d, J=5.1 Hz, 1H), 7.11-7.02 (m, 2H), 3.97 (d, J=1.5 Hz, 1H), 3.92 (d, J=10.5 Hz, 2H), 3.56 (dt, J=10.3, 2.3 Hz, 2H), 2.17 (dt, J=3.0, 1.5 Hz, 2H).

LC-MS (m/z) 382 (M+1).

Example 31: Preparation of N-(4-chlorophenyl)-6-((6-fluoroquinolin-4-yl)oxy)-3-aza-cyclo[3.1.0]hexan-3-carboxamide

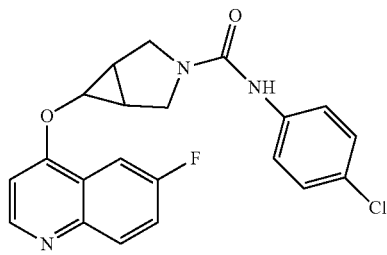 [SMILES: O=C(Nc1ccc(Cl)cc1)N1CC2C(C1)C2Oc1ccnc2ccc(F)cc12]

p-Chloroaniline (22.3 mg, 0.174 mmol) was dissolved in ultra-dry dichloromethane (10 mL), protected by nitrogen, added with triphosgene (17.2 mg, 0.058 mmol) under ice bath, then added with triethylamine (0.5 mL, 3.6 mmol), stirred under ice bath for 25 minutes, added under ice bath with a solution of 4-((3-aza-cyclo[3.1.0]hex-4-yl)oxy)-6-fluoroquinoline hydrochloride (38.8 mg, 0.138 mmol) in dichloromethane (5 mL) and triethylamine (0.5 ml), the reaction solution was stirred under ice bath for 10 minutes, then the ice bath was removed, and the reaction solution was stirred at room temperature for 120 minutes, added with 5 ml of methanol, stirred for 5 minutes, subjected to rotary evaporation to remove the solvent, and separated by solid column chromatography [methanol/dichloromethane=1/20] to obtain a white solid N-(4-chlorophenyl)-6-((6-fluoroquinolin-4-yl)oxy)-3-aza-cyclo[3.1.0]hexan-3-carboxamide (25 mg, 44.9% yield).

$^1$H NMR (400 MHz, DMSO-d$_6$) δ 8.77 (d, J=5.1 Hz, 1H), 8.32 (s, 1H), 8.04 (dd, J=9.2, 5.4 Hz, 1H), 7.72 (dd, J=9.7, 2.9 Hz, 1H), 7.70-7.62 (m, 1H), 7.61-7.54 (m, 2H), 7.32-7.25 (m, 3H), 3.97 (t, J=1.5 Hz, 1H), 3.93 (d, J=10.5 Hz, 2H), 3.57 (dt, J=10.5, 2.2 Hz, 2H), 2.16 (dt, J=3.0, 1.5 Hz, 2H).

LC-MS (m/z) 398 (M+1).

Example 32: Preparation of N-(2,3-dihydrobenzo-furan-5-yl)-6-((6-fluoroquinolin-4-yl)oxy)-2-aza-spiro[3.3]heptan-2-carboxamide

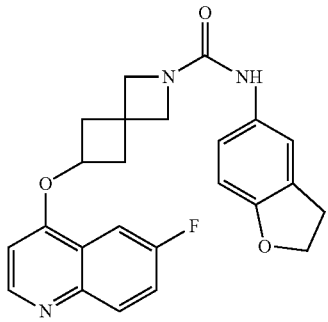 [SMILES: O=C(Nc1ccc2c(c1)CCO2)N1CC2(CC(Oc3ccnc4ccc(F)cc34)C2)C1]

According to the steps similar to those in Example 3, a white solid N-(2,3-dihydrobenzofuran-5-yl)-6-((6-fluoro-quinolin-4-yl)oxy)-2-aza-spiro[3.3]heptan-2-carboxamide (55 mg, 85% yield) was prepared from 4-((2-aza-spiro[3.3]heptan-6-yl)oxy)-6-fluoroquinoline hydrochloride (45 mg, 0.15 mmol) and 2,3-dihydrobenzofuran-5-amine (24.9 mg, 0.18 mmol).

$^1$H NMR (400 MHz, DMSO-d$_6$) δ 8.70 (d, J=5.1 Hz, 1H), 8.18 (s, 1H), 8.02 (dd, J=9.2, 5.4 Hz, 1H), 7.79 (dd, J=9.7, 3.0 Hz, 1H), 7.69-7.60 (m, 1H), 7.35 (d, J=2.2 Hz, 1H), 7.09 (dd, J=8.6, 2.3 Hz, 1H), 6.92 (d, J=5.2 Hz, 1H), 6.62 (d, J=8.5 Hz, 1H), 4.97 (p, J=6.6 Hz, 1H), 4.46 (t, J=8.7 Hz, 2H), 4.02 (s, 2H), 3.96 (s, 2H), 3.12 (t, J=8.6 Hz, 2H), 2.92-2.83 (m, 2H), 2.47-2.37 (m, 2H).

LC-MS (m/z) 420 (M+1).

Example 33: Preparation of N-(2,3-dihydrobenzo[b][1,4]dioxin-6-yl)-6-((6-fluoroquinolin-4-yl)oxy)-2-aza-spiro[3.3]heptan-2-carboxamide

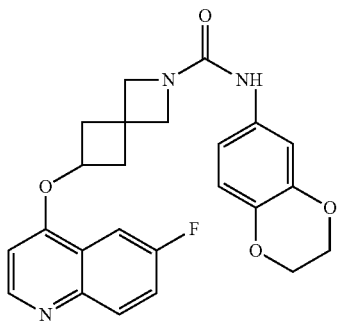 [SMILES: O=C(Nc1ccc2c(c1)OCCO2)N1CC2(CC(Oc3ccnc4ccc(F)cc34)C2)C1]

According to the steps similar to those in Example 3, a white solid N-(2,3-dihydrobenzo[b][1,4]dioxin-6-yl)-6-((6-fluoroquinolin-4-yl)oxy)-2-aza-spiro[3.3]heptan-2-carbox-amide (35 mg, 52% yield) was prepared from 4-((2-aza-spiro[3.3]heptan-6-yl)oxy)-6-fluoroquine hydrochloride (45 mg, 0.15 mmol) and 2,3-dihydrobenzo[b][1,4]dioxin-6-amine (27.8 mg, 0.18 mmol).

$^1$H NMR (400 MHz, DMSO-d$_6$) δ 8.70 (d, J=5.1 Hz, 1H), 8.21 (s, 1H), 8.02 (dd, J=9.2, 5.4 Hz, 1H), 7.79 (dd, J=9.7, 2.9 Hz, 1H), 7.65 (td, J=8.8, 2.9 Hz, 1H), 7.09 (d, J=2.5 Hz, 1H), 6.97-6.85 (m, 2H), 6.70 (d, J=8.7 Hz, 1H), 4.97 (p, J=6.6 Hz, 1H), 4.25-4.13 (m, 4H), 4.02 (s, 2H), 3.96 (s, 2H), 2.96-2.80 (m, 2H), 2.48-2.37 (m, 2H).

LC-MS (m/z) 436 (M+1).

Example 34: Preparation of tert-butyl 6-(isoquinolin-1-yloxy)-2-aza-spiro[3.3]heptan-2-carboxylate

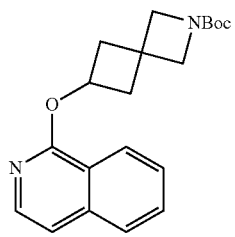 [SMILES: CC(C)(C)OC(=O)N1CC2(CC(Oc3nccc4ccccc34)C2)C1]

Tert-butyl 6-hydroxy-2-aza-spiro[3.3]heptan-2-carboxy-late (106 mg, 0.5 mmol) was dissolved in N,N-dimethylfor-mamide (10 ml), and added with sodium hydride (92 mg, 60% in mineral, 2.5 mmol), the reaction solution was stirred at room temperature for 5 minutes, and then added with 1-chloroisoquinoline (82 mg, 0.5 mmol). The reaction solution was stirred at room temperature for 15 hours, and quenched by adding water. The solid was precipitated by adding water, filtered and washed with water to obtain a pale yellow solid tert-butyl 6-(isoquinolin-1-yloxy)-2-aza-spiro[3.3]heptan-2-carboxylate (80 mg, 47% yield), LC-MS (m/z) 341 (M+1).

Example 35: Preparation of 1-(2-aza-spiro[3.3]heptan-6-yl)oxyisoquinoline Hydrochloride

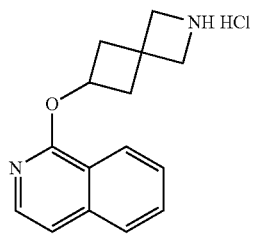

Tert-butyl 6-(isoquinolin-1-yloxy)-2-aza-spiro[3.3]heptan-2-carboxylate (80 mg, 0.23 mmol) was dissolved in 5 mL of dichloromethane, then added with concentrated hydrochloric acid (1 mL). The reaction solution was stirred at room temperature for 16 hours and then concentrated directly to obtain an off-white solid 1-(2-aza-spiro[3.3]heptan-6-yl)oxyisoquinoline hydrochloride (100 mg, 95% yield), LC-MS (m/z) 241 (M+1).

Example 36: Preparation of N-(4-chlorophenyl)-6-(isoquinolin-1-yloxy)-2-aza-spiro[3.3]heptan-2-carboxamide

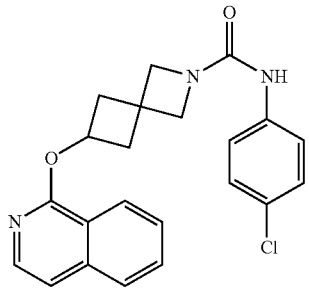 [SMILES: O=C(Nc1ccc(Cl)cc1)N1CC2(CC(Oc3nccc4ccccc34)C2)C1]

p-Chloroaniline (30 mg, 0.24 mmol) was dissolved in ultra-dry tetrahydrofuran (5 mL), added with triphosgene (70 mg, 0.24 mmol) under ice bath, then slowly added dropwise with triethylamine (0.2 mL, 1.6 mmol). The reaction solution was stirred under ice bath for 25 minutes, then concentrated under reduced pressure, added with ultra-dry N,N-dimethylformamide (5 mL), added under ice bath with a solution of 1-(2-aza-spiro[3.3]heptan-6-yl) oxyisoquinoline hydrochloride (60 mg, 0.21 mmol) in N,N-dimethylformamide (1 mL), and then slowly added dropwise with triethylamine (0.3 mL, 2.3 mmol). After the reaction solution was stirred under ice bath for 10 minutes, the ice bath was removed. The reaction solution was stirred at room temperature for 40 minutes, and then poured into water. The solid was precipitated, filtered, washed with water, dried, and separated by solid column chromatography [methanol/dichloromethane=1/25] to obtain a white solid N-(4-chlorophenyl)-6-(isoquinolin-1-yloxy)-2-aza-spiro[3.3]heptan-2-carboxamide (68 mg, 70% yield).

$^1$H NMR (400 MHz, DMSO-$d_6$) δ 8.56 (s, 1H), 8.18 (d, J=8.3 Hz, 1H), 7.98 (d, J=5.8 Hz, 1H), 7.89 (d, J=8.2 Hz, 1H), 7.80-7.72 (m, 1H), 7.63 (t, J=7.6 Hz, 1H), 7.56-7.51 (m, 2H), 7.38 (d, J=5.9 Hz, 1H), 7.30-7.24 (m, 2H), 5.32 (p, J=6.9 Hz, 1H), 4.07 (s, 2H), 4.00 (s, 2H), 2.88-2.76 (m, 2H), 2.45-2.36 (m, 2H).
LC-MS (m/z) 394 (M+1).

Example 37: Preparation of ethyl 2-(6-((6-fluoroquinolin-4-yl)oxy)-2-aza-spiro[3.3]heptan-2-yl)propionate

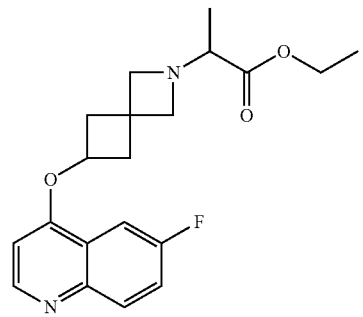 [SMILES: CCOC(=O)C(C)N1CC2(CC(Oc3ccnc4ccc(F)cc34)C2)C1]

4-((2-Aza-spiro[3.3]heptan-6-yl)oxy)-6-fluoroquinoline hydrochloride (600 mg, 2.0 mmol), ethyl 2-bromopropionate (841 mg, 4.0 mmol) and potassium carbonate (962 mg, 6.0 mmol) were dissolved in acetonitrile (30 mL). The reaction solution was stirred at room temperature for 16 hours, then poured into water, extracted with ethyl acetate, the organic phases were combined, dried, filtered, and distilled under reduced pressure to obtain a residue, which was then separated by column chromatography [methanol/dichloromethane=1/25] to obtain a colorless oily substance ethyl 2-(6-(((6-fluoroquinolin-4-yl)oxy)-2-aza-spiro[3.3]heptan-2-yl)propionate (450 mg, 61% yield), LC-MS (m/z) 259 (M+1).

Example 38: Preparation of 2-(6-(((6-fluoroquinolin-4-yl)oxy)-2-aza-spiro[3.3]heptan-2-yl)propionic Acid

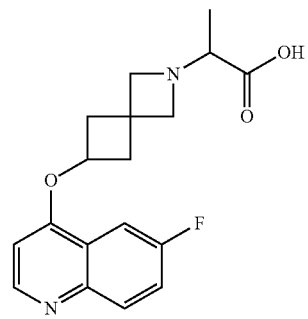 [SMILES: CC(C(=O)O)N1CC2(CC(Oc3ccnc4ccc(F)cc34)C2)C1]

Ethyl 2-(6-(((6-fluoroquinolin-4-yl)oxy)-2-aza-spiro[3.3]heptan-2-yl)propionate (380 mg, 1.0 mmol) was dissolved in ethanol (8 mL) and water (0.5 mL), then added with sodium hydroxide (85 mg, 2.0 mmol). The reaction solution was stirred at room temperature for 5 hours, then added with concentrated hydrochloric acid to adjust pH to 3-4, and directly concentrated to obtain a crude off-white solid 2-(6-(((6-fluoroquinolin-4-yl)oxy)-2-aza-spiro[3.3]heptan-2-yl) propionic acid (460 mg, crude product), which was used directly in the next step. LC-MS (m/z) 331 (M+1).

Example 39: Preparation of N-(4-chlorophenyl)-2-(6-(((6-fluoroquinolin-4-yl)oxo)-2-aza-spiro[3.3]heptan-2-yl)propionamide

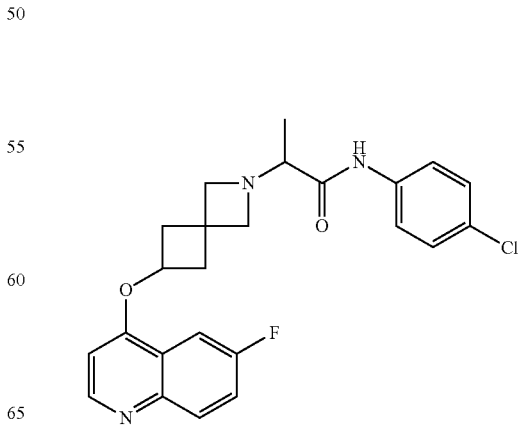

2-(6-(((6-Fluoroquinolin-4-yl)oxy)-2-aza-spiro[3.3]heptan-2-yl)propionic acid (350 mg, 1.1 mmol), p-chloroaniline (270 mg, 2.2 mmol) and N,N-diisopropylethylamine (0.66 mL, 3.6 mmol) were dissolved in N,N-dimethylformamide (15 mL), and then added with 1-hydroxybenzotriazole (223 mg, 1.6 mmol) and 1-ethyl-(3-dimethylaminopropyl)carbodiimide hydrochloride (420 mg, 2.2 mmol). The reaction solution was stirred at room temperature for 15 hours, then poured into water and adjusted with sodium hydrogen carbonate aqueous solution to pH 8-10, a solid was precipitated, filtered, washed with water, and dried to obtain a yellowish solid, which was separated by column chromatography [methanol/dichloromethane=1/25] to obtain a white solid N-(4-chlorophenyl)-2-(6-(((6-fluoroquinolin-4-yl)oxy)-2-aza-spiro[3.3]heptan-2-yl)propionamide (130 mg, 28% yield), LC-MS (m/z) 440 (M+1).

$^1$H NMR (400 MHz, DMSO-d$_6$) δ 9.72 (s, 1H), 8.68 (d, J=5.2 Hz, 1H), 8.01 (dd, J=9.6, 5.2 Hz, 1H), 7.77 (dd, J=9.6, 2.8 Hz, 1H), 7.72-7.62 (m, 3H), 7.38-7.34 (m, 2H), 6.90 (d, J=5.2 Hz, 1H), 4.96-4.90 (m, 1H), 3.37-3.25 (m, 4H), 2.97 (dd, J=13.2, 6.8 Hz, 1H), 2.84-2.77 (m, 2H), 2.34 (dd, J=13.2, 6.8 Hz, 2H), 1.11 (d, J=6.8 Hz, 3H).

Example 40: Preparation of N-cyclohexyl-2-(6-(((6-fluoroquinolin-4-yl)oxo)-2-aza-spiro[3.3]heptan-2-yl)propionamide

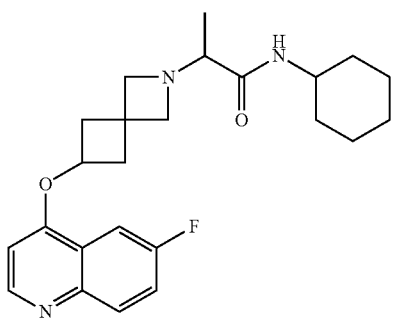 [SMILES: CC(C(=O)NC1CCCCC1)N1CC2(CC(Oc3ccnc4ccc(F)cc34)C2)C1]

According to the steps similar to those in Example 39, a white solid N-cyclohexyl-2-(6-(((6-fluoroquinolin-4-yl)oxo)-2-aza-spiro[3.3]heptan-2-yl)propionamide (56 mg, 37% yield) was prepared from 2-(6-(((6-fluoroquinolin-4-yl)oxy)-2-aza-spiro[3.3]heptan-2-yl) propionic acid (120 mg, 0.36 mmol) and cyclohexylamine (30 mg, 0.36 mmol). LC-MS (m/z) 412 (M+1).

$^1$H NMR (400 MHz, DMSO-d$_6$) δ 8.71 (d, J=5.2 Hz, 1H), 8.03 (dd, J=9.6, 5.2 Hz, 1H), 7.78 (dd, J=9.6, 2.8 Hz, 1H), 7.69-7.64 (m, 1H), 7.28 (d, J=8.4 Hz, 1H), 6.92 (d, J=5.2 Hz, 1H), 4.98-4.92 (m, 1H), 3.56-3.53 (m, 1H), 3.32-3.23 (m, 2H), 3.21-3.19 (m, 2H), 2.84-2.70 (m, 3H), 2.33 (dd, J=12.0, 6.8 Hz, 2H), 1.71-1.67 (m, 4H), 1.57 (d, J=12.0 Hz, 1H), 1.30-1.12 (m, 6H), 0.99 (d, J=6.8 Hz, 3H).

Example 41: Preparation of 2-(6-(((6-fluoroquinolin-4-yl)oxo)-2-aza-spiro[3.3]heptan-2-yl)-N-(pyridin-3-yl)propionamide

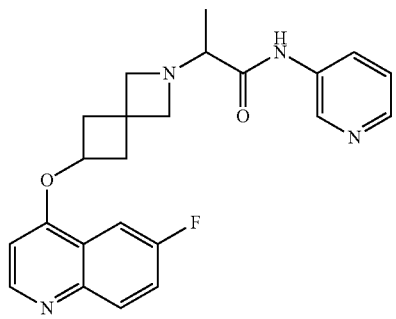 [SMILES: CC(C(=O)Nc1cccnc1)N1CC2(CC(Oc3ccnc4ccc(F)cc34)C2)C1]

According to the steps similar to those in Example 39, a white solid N-cyclohexyl-2-(6-(((6-fluoroquinolin-4-yl)oxo)-2-aza-spiro[3.3]heptan-2-yl)propionamide (15 mg, 10% yield) was prepared from 2-(6-(((6-fluoroquinolin-4-yl)oxy)-2-aza-spiro[3.3]heptan-2-yl) propionic acid (120 mg, 0.36 mmol) and 3-aminopyridine (30 mg, 0.31 mmol). LC-MS (m/z) 407 (M+1).

$^1$H NMR (400 MHz, DMSO-d$_6$) δ 9.81 (s, 1H), 8.82 (d, J=2.4 Hz, 1H), 8.68 (d, J=5.2 Hz, 1H), 8.26 (dd, J=4.8, 1.6 Hz, 1H), 8.10-8.07 (m, 1H), 8.01 (dd, J=9.6, 5.4 Hz, 1H), 7.77 (dd, J=9.6, 2.8 Hz, 1H), 7.67-7.62 (m, 1H), 7.33 (dd, J=8.4, 4.8 Hz, 1H), 6.90 (d, J=5.2 Hz, 1H), 4.97-4.905 (m, 1H), 3.380-3.27 (m, 4H), 3.00 (q, J=6.8 Hz, 1H), 2.87-2.76 (m, 2H), 2.34 (dd, J=12.0, 6.8 Hz, 2H), 1.13 (d, J=6.8 Hz, 3H).

Example 42: Preparation of tert-butyl 6-(((6-fluoroquinolin-4-yl)oxo)methyl)-3-aza-bicyclo[3.1.0]hexan-3-carboxylate

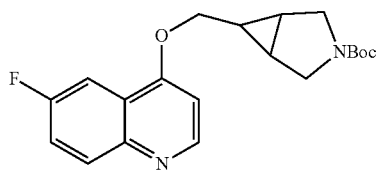 [SMILES: CC(C)(C)OC(=O)N1CC2C(COc3ccnc4ccc(F)cc34)C2C1]

According to the steps similar to those in Example 1, a white solid tert-butyl 6-(((6-fluoroquinolin-4-yl)oxo)methyl)-3-aza-bicyclo[3.1.0]hexa-3-carboxylate (50 mg, 9% yield) was prepared from tert-butyl 6-(hydroxymethyl)-3-aza-bicyclo[3.1.0]hexa-3-carboxylate (388 mg, 1.82 mmol) and 4-chloro-6-fluoroquinoline (270 mg, 1.5 mmol). LC-MS (m/z) 359 (M+1).

Example 43: Preparation of 4-((3-aza-bicyclo[3.1.0]hexan-6-yl)methoxy)-6-fluoroquinoline Hydrochloride

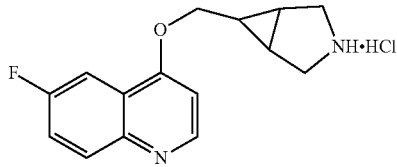

According to the steps similar to those in Example 2, a white solid 4-((3-aza-bicyclo[3.1.0]hexan-6-yl)methoxy)-6-fluoroquinoline hydrochloride (50 mg, 90% yield) was prepared from tert-butyl 6-(((6-fluoroquinolin-4-yl)oxy)methyl)-3-aza-bicyclo[3.1.0]hexan-3-carboxylate (50 mg, 0.14 mmol). LC-MS (m/z) 259 (M+1).

Example 44: Preparation of ethyl 2-(6-(((6-fluoroquinolin-4-yl)oxo)methyl)-3-aza-bicyclo[3.1.0]hexan-3-yl)propionate

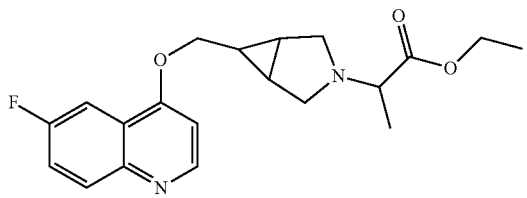 [SMILES: CCOC(=O)C(C)N1CC2C(COc3ccnc4ccc(F)cc34)C2C1]

According to the steps similar to those in Example 37, a white solid ethyl 2-(6-(((6-fluoroquinolin-4-yl)oxo)methyl)-3-aza-bicyclo[3.1.0]hexan-3-yl)propionate (30 mg, 60% yield) was prepared from 4-((3-aza-bicyclo[3.1.0]hexan-6-yl)methoxy)-6-fluoroquinoline hydrochloride (50 mg, 0.19 mmol) and ethyl 2-bromopropionate (63 mg, 0.38 mmol). LC-MS (m/z) 359 (M+1).

Example 45: Preparation of 2-(6-(((6-fluoroquinolin-4-yl)oxo)methyl)-3-aza-bicyclo[3.1.0]hexan-3-yl)propionic Acid

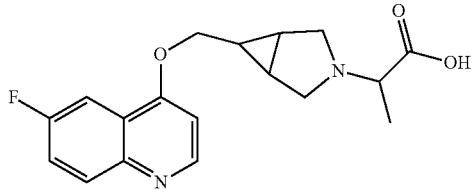 [SMILES: CC(C(=O)O)N1CC2C(COc3ccnc4ccc(F)cc34)C2C1]

According to the steps similar to those in Example 38, a white solid 2-(6-(((6-fluoroquinolin-4-yl)oxo)methyl)-3-aza-bicyclo[3.1.0]hexan-3-yl)propionic acid (25 mg, 92% yield) was prepared from ethyl 2-(6-(((6-fluoroquinolin-4-yl)oxo)methyl)-3-aza-bicyclo[3.1.0]hexan-3-yl)propionate (30 mg, 0.08 mmol). LC-MS (m/z) 331 (M+1).

Example 46: Preparation of N-(4-chlorophenyl)-2-(6-(((6-fluoroquinolin-4-yl)oxo)methyl)-3-aza-bicyclo[3.1.0]hexan-3-yl)propionamide (12659)

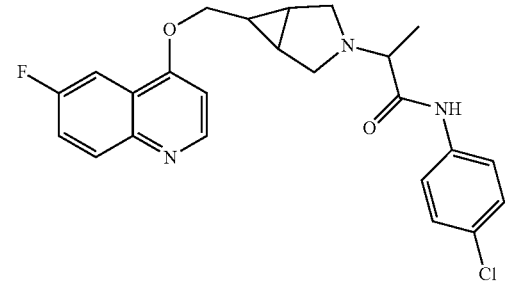 [SMILES: CC(C(=O)Nc1ccc(Cl)cc1)N1CC2C(COc3ccnc4ccc(F)cc34)C2C1]

According to the steps similar to those in Example 39, a light yellow solid N-(4-chlorophenyl)-2-(6-(((6-fluoroquinolin-4-yl)oxo)methyl)-3-aza-bicyclo[3.1.0]hexan-3-yl)propionamide (8 mg, 24% yield) was prepared from 2-(6-(((6-fluoroquinolin-4-yl)oxo)methyl)-3-aza-bicyclo[3.1.0]hexan-3-yl)propionic acid (25 mg, 0.08 mmol) and 4-chloropropionamide (20 mg, 0.16 mmol). LC-MS (m/z) 440 (M+1).

$^1$H NMR (400 MHz, DMSO-$d_6$) δ 9.76 (s, 1H), 8.70 (d, J=5.2 Hz, 1H), 8.02 (dd, J=9.2, 5.2 Hz, 1H), 7.78 (dd, J=9.2, 3.0 Hz, 1H), 7.70-7.61 (m, 3H), 7.37-7.31 (m, 2H), 7.04 (d, J=5.2 Hz, 1H), 4.25-4.07 (m, 2H), 3.19 (q, J=6.8 Hz, 1H), 3.01 (dd, J=14.4, 8.4 Hz, 2H), 2.65 (td, J=9.6, 8.4, 2.8 Hz, 1H), 2.58-2.53 (m, 1H), 1.85 (dt, J=7.2, 4.4 Hz, 1H), 1.59 (tq, J=7.2, 4.4, 3.6 Hz, 2H), 1.22 (d, J=6.8 Hz, 3H).

Example 47: Preparation of ethyl 2-(6-((6-fluoroquinolin-4-yl)oxo)-3-aza-bicyclo[3.1.0]hexan-3-yl)propionate

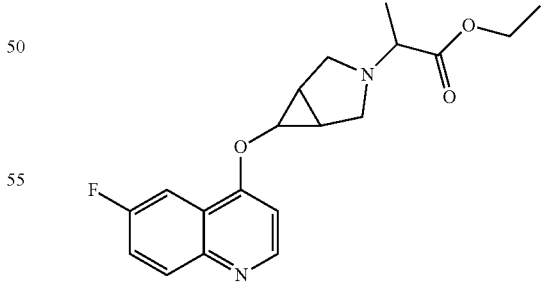

According to the steps similar to those in Example 37, a white solid ethyl 2-(6-((6-fluoroquinolin-4-yl)oxo)-3-aza-bicyclo[3.1.0]hexan-3-yl)propionate (90 mg, 90% yield) was prepared from 4-((3-aza-bicyclo[3.1.0]hexan-6-yl)oxo)-6-quinoline hydrochloride (80 mg, 0.29 mmol) and ethyl 2-bromopropionate (103 mg, 0.58 mmol). LC-MS (m/z) 345 (M+1).

Example 48: Preparation of 2-(6-((6-fluoroquinolin-4-yl)oxo)-3-aza-bicyclo[3.1.0]hexan-3-yl)propionic Acid

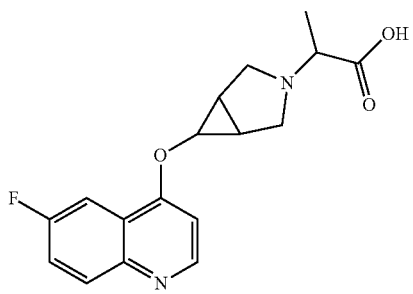 [SMILES: CC(C(=O)O)N1CC2C(C1)C2Oc1ccnc2ccc(F)cc12]

According to the steps similar to those in Example 38, a white solid 2-(6-((6-fluoroquinolin-4-yl)oxo)-3-aza-bicyclo[3.1.0]hexan-3-yl)propionic acid (100 mg, 73% yield) was prepared from ethyl 2-(6-((6-fluoroquinolin-4-yl)oxo)-3-aza-bicyclo[3.1.0]hexan-3-yl)propionate (90 mg, 0.26 mmol). LC-MS (m/z) 317 (M+1).

Example 49: Preparation of N-(4-chlorophenyl)-2-(6-((6-fluoroquinolin-4-yl)oxo)-3-aza-bicyclo[3.1.0]hexan-3-yl)propionamide

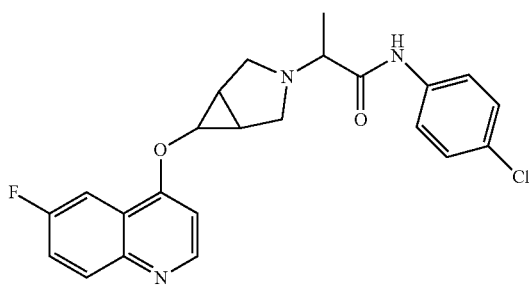 [SMILES: CC(C(=O)Nc1ccc(Cl)cc1)N1CC2C(C1)C2Oc1ccnc2ccc(F)cc12]

According to the steps similar to those in Example 39, a white solid 2-(6-((6-fluoroquinolin-4-yl)oxo)-3-aza-bicyclo[3.1.0]hexan-3-yl)propionic acid (45 mg, 36% yield) was prepared from 2-(6-((6-fluoroquinolin-4-yl)oxo)-3-aza-bicyclo[3.1.0]hexan-3-yl)propionic acid (100 mg, 0.32 mmol) and 4-chloroaniline (37 mg, 0.29 mmol). LC-MS (m/z) 426 (M+1).

$^1$H NMR (400 MHz, DMSO-$d_6$) δ 9.77 (s, 1H), 8.78 (d, J=5.2 Hz, 1H), 8.03 (dd, J=9.2, 5.2 Hz, 1H), 7.74-7.61 (m, 4H), 7.41-7.31 (m, 2H), 7.25 (d, J=5.2 Hz, 1H), 4.39 (s, 1H), 3.24-3.21 (m, 3H), 2.78-2.68 (m, 2H), 1.93 (s, 1H), 1.26 (d, J=6.8 Hz, 3H).

Example 50: Preparation of tert-butyl 6-((6-fluoroquinolin-4-yl)amino)-2-aza-spiro[3.3]heptan-2-carboxylate

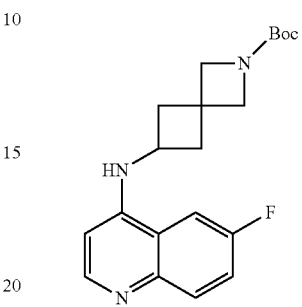

4-Chloro-6-fluoroquinoline (271 mg, 1.5 mmol), tert-butyl 6-amino-2-aza-spiro[3.3]heptan-2-carboxylate (318 mg, 1.5 mmol) and cesium carbonate (1.5 g, 4.5 mmol) were dissolved in dioxane (5 mL), then added with 2-dicyclohexylphospho-2,4,6-triisopropylbiphenyl (71 mg, 0.15 mmol) and tris(dibenzylideneacetone) dipalladium (70 mg, 0.075 mmol), and protected by nitrogen atmosphere. The reaction solution was heated to 123° C. and stirred for 7 hours, then poured into water, extracted with ethyl acetate, washed with water, and the organic phase was concentrated under reduced pressure to obtain a residue, which was separated by column chromatography [EA] to obtain a white solid tert-butyl 6-((6-fluoroquinolin-4-yl)amino)-2-aza-spiro[3.3]heptan-2-carboxylate (280 mg, 52% yield). LC-MS (m/z) 358 (M+1).

Example 51: Preparation of 6-fluoro-N-(2-aza-spiro[3.3]heptan-6-yl)quinolin-4-amine Hydrochloride

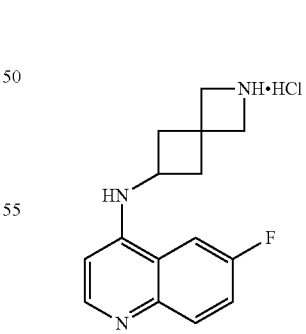

According to the steps similar to those in Example 2, a white solid 6-fluoro-N-(2-aza-spiro[3.3]heptan-6-yl)quinolin-4-amine hydrochloride (128 mg, 94% yield) was prepared from tert-butyl 6-((6-fluoroquinolin-4-yl)amino)-2-aza-spiro[3.3]heptan-2-carboxylate (180 mg, 0.51 mmol). LC-MS (m/z) 258 (M+1). LC-MS (m/z) 258 (M+1).

Example 52: Preparation of ethyl 2-(6-((6-fluoro-quinolin-4-yl)amino)-2-aza-spiro[3.3]heptan-2-yl)propionate

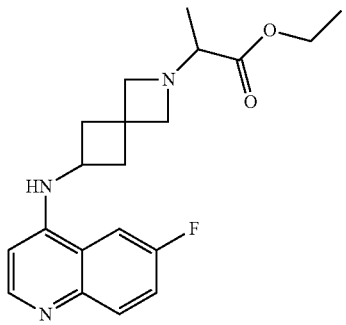 [SMILES: CCOC(=O)C(C)N1CC2(CC(Nc3ccnc4ccc(F)cc34)C2)C1]

According to the steps similar to those in Example 37, a white solid ethyl 2-(6-((6-fluoroquinolin-4-yl)amino)-2-aza-spiro[3.3]heptan-2-yl)propionate (150 mg, 83% yield) was prepared from 6-fluoro-N-(2-aza-spiro[3.3]heptan-6-yl)quinolin-4-amine hydrochloride (128 mg, 0.5 mmol) and ethyl 2-bromopropionate (100 mg, 0.55 mmol). LC-MS (m/z) 358 (M+1).

Example 53: Preparation of 2-(6-((6-fluoroquinolin-4-yl)amino)-2-aza-spiro[3.1.0]hexan-2-yl)propionic Acid

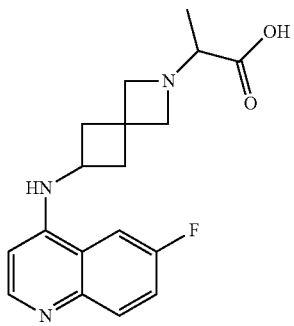 [SMILES: CC(C(=O)O)N1CC2(CC(Nc3ccnc4ccc(F)cc34)C2)C1]

According to the steps similar to those in Example 38, a white solid 2-(6-((6-fluoroquinolin-4-yl)amino)-2-aza-spiro[3.3]heptan-2-yl)propionic acid (100 mg, 72% yield) was prepared from ethyl 2-(6-((6-fluoroquinolin-4-yl)amino)-2-aza-spiro(3.3)heptan-2-yl)propionate (150 mg, 0.42 mmol). LC-MS (m/z) 330 (M+1).

Example 54: Preparation of N-(4-chlorophenyl)-2-(6-((6-fluoroquinolin-4-yl)amino)-2-aza-spiro[3.3]heptan-2-yl)propionamide

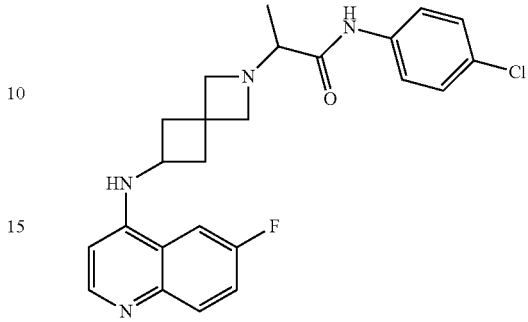

According to the steps similar to those in Example 39, a white solid N-(4-chlorophenyl)-2-(6-((6-fluoroquinolin-4-yl)amino)-2-aza-spiro[3.3]heptan-2-yl)propionamide (5 mg, 4% yield) was prepared from 2-(6-((6-fluoroquinolin-4-yl)amino)-2-aza-spiro[3.3]heptan-2-yl)propionic acid (100 mg, 0.3 mmol) and 4-chloroaniline. LC-MS (m/z) 439 (M+1).

$^1$H NMR (400 MHz, DMSO-$d_6$) δ 10.15 (s, 1H), 8.44 (d, J=5.6 Hz, 1H), 8.23 (dd, J=10.8, 2.8 Hz, 1H), 7.89 (dd, J=10.2, 5.6 Hz, 1H), 7.72-7.60 (m, 3H), 7.38 (d, J=8.4 Hz, 2H), 6.46 (d, J=5.6 Hz, 1H), 4.05 (dd, J=14.0, 6.8 Hz, 1H), 3.72-3.51 (m, 5H), 2.74 (d, J=10.0 Hz, 2H), 2.33-2.28 (m, 2H), 2.06-1.92 (m, 1H), 1.24 (d, J=4.8 Hz, 3H).

Example 55: Preparation of tert-butyl 6-((6-fluoroquinolin-4-yl)(methyl)amino)-2-aza-spiro[3.3]heptan-2-carboxylate

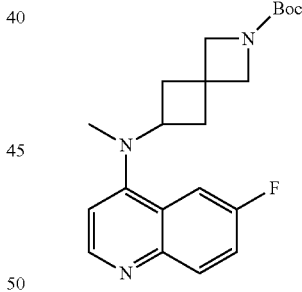

Tert-butyl 6-((6-fluoroquinolin-4-yl)amino)-2-aza-spiro[3.3]heptan-2-carboxylate (150 mg, 0.42 mmol) was dissolved in ultra-dry tetrahydrofuran (5 mL), added with sodium hydride (84 mg, 2.1 mmol), protected by nitrogen atmosphere. The reaction solution was stirred at room temperature for 5 minutes, then added with iodomethane (89 mg, 0.63 mmol), protected by nitrogen atmosphere. The reaction solution was heated to 60° C. and stirred for 7 hours, then quenched by adding water, distilled under reduced pressure to remove tetrahydrofuran, extracted with ethyl acetate, washed with water, dried, concentrated under reduced pressure to obtain a residue, which was separated by column chromatography [EA] to obtain a colorless oil tert-butyl 6-((6-fluoroquinolin-4-yl)(methyl)amino)-2-aza-spiro[3.3]heptan-2-carboxylate (50 mg, 32% yield). LC-MS (m/z) 372 (M+1).

Example 56: Preparation of 6-fluoro-N-methyl-N-(2-aza-spiro[3.3]heptan-6-yl)quinolin-4-amine Hydrochloride

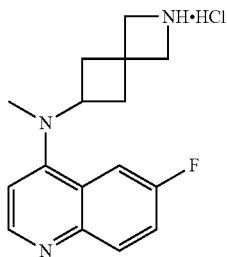

According to the steps similar to those in Example 2, a white solid 6-fluoro-N-methyl-N-(2-aza-spiro[3.3]heptan-6-yl)quinolin-4-amine hydrochloride (50 mg, 57% yield) was prepared from tert-butyl 6-((6-fluoroquinolin-4-yl)(methyl)amino)-2-aza-spiro[3.3]heptane-2-carboxylate (50 mg, 0.13 mmol). LC-MS (m/z) 272 (M+1).

Example 57: Preparation of ethyl 2-(6-((6-fluoroquinolin-4-yl)(methyl)amino)-2-aza-spiro[3.3]heptan-2-yl)propionate

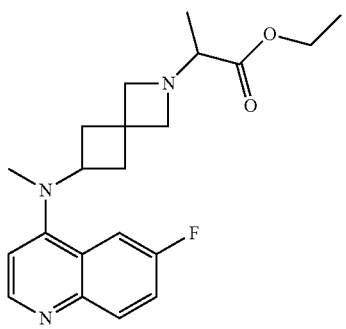 [SMILES: CCOC(=O)C(C)N1CC2(CC(N(C)c3ccnc4ccc(F)cc34)C2)C1]

According to the steps similar to those in Example 37, a white solid ethyl 2-(6-((6-fluoroquinolin-4-yl)(methyl)amino)-2-aza-spiro[3.3]heptan-2-yl)propionate (50 mg, 83% yield) was prepared from 6-fluoro-N-methyl-N-(2-aza-spiro[3.3]heptan-6-yl)quinolin-4-amine hydrochloride (50 mg, 0.16 mmol) and ethyl 2-bromopropionate (60 mg, 0.32 mmol). LC-MS (m/z) 372 (M+1).

Example 58: Preparation of 2-(6-((6-fluoroquinolin-4-yl)(methyl)amino)-2-aza-spiro[3.3]heptan-2-yl)propionic Acid

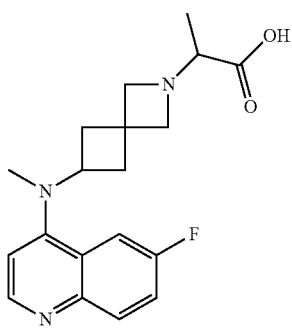 [SMILES: CC(C(=O)O)N1CC2(CC(N(C)c3ccnc4ccc(F)cc34)C2)C1]

According to the steps similar to those in Example 38, a white solid 2-(6-((6-fluoroquinolin-4-yl)(methyl)amino)-2-aza-spiro[3.3]heptan-2-yl)propionic acid (40 mg, 82% yield) was prepared from ethyl 2-(6-((6-fluoroquinolin-4-yl)(methyl)amino)-2-aza-spiro[3.3]heptan-2-yl)propionate (50 mg, 0.13 mmol). LC-MS (m/z) 344 (M+1).

Example 59: Preparation of N-(4-chloro)-2-(6-((6-fluoroquinolin-4-yl)(methyl)amino)-2-aza-spiro[3.3]heptan-2-yl)propionamide

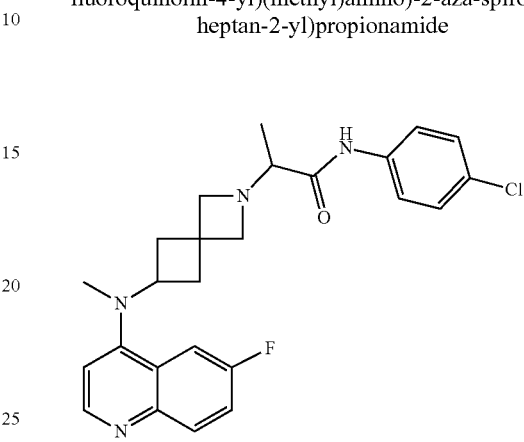

According to the steps similar to those in Example 39, a white solid N-(4-chloro)-2-(6-((6-fluoroquinolin-4-yl)(methyl)amino)-2-aza-spiro[3.3]heptan-2-yl)propionamide (6 mg, 11% yield) was prepared from 2-(6-((6-fluoroquinolin-4-yl)(methyl)amino)-2-aza-spiro[3.3]heptan-2-yl)propionic acid (40 mg, 0.12 mmol) and 4-chloroaniline (20 mg, 0.16 mmol). LC-MS (m/z) 453 (M+1).

$^1$H NMR (400 MHz, DMSO-$d_6$) δ 9.74 (s, 1H), 8.62 (d, J=5.2 Hz, 1H), 8.01 (dd, J=9.2, 5.2 Hz, 1H), 7.75-7.65 (m, 3H), 7.63-7.58 (m, 1H), 7.40-7.32 (m, 2H), 6.86 (d, J=5.2 Hz, 1H), 3.90-3.83 (m, 1H), 3.23 (s, 2H), 3.01 (s, 1H), 2.84 (s, 3H), 2.16-2.06 (m, 2H), 1.31-1.25 (m, 4H), 1.12 (d, J=6.8 Hz, 3H).

Example 60: Preparation of tert-butyl 2-(6-fluoroquinolin-4-yl)octahydro-5H-pyrrolo[3,4-c]pyridin-5-carboxylate

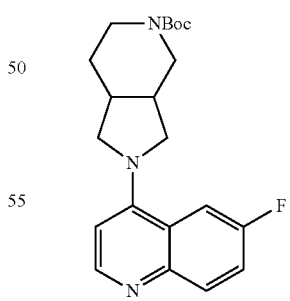

According to the steps similar to those in Example 50, a white solid tert-butyl 2-(6-fluoroquinolin-4-yl)octahydro-5H-pyrrolo[3,4-c]pyridin-5-carboxylate (400 mg, 60% yield) was prepared from tert-butyl octahydro-5H-pyrrolo[3,4-c]pyridin-5-carboxylate (457 mg, 1.7 mmol) and 4-chloro-6-fluoroquinoline (350 mg, 1.9 mmol). LC-MS (m/z) 372 (M+1).

Example 61: Preparation of 6-fluoro-4-(octahydro-2H-pyrrolo[3,4-c]pyridin-2-yl)quinoline Hydrochloride

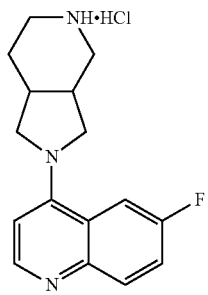

According to the steps similar to those in Example 2, a white solid 6-fluoro-4-(octahydro-2H-pyrrolo[3,4-c]pyridin-2-yl)quinoline hydrochloride (380 mg, 93% yield) was prepared from tert-butyl 2-(6-fluoroquinolin-4-yl)octahydro-5H-pyrrolo[3,4-c]pyridin-5-carboxylate (400 mg, 1.0 mmol). LC-MS (m/z) 272 (M+1).

Example 62: Preparation of ethyl 2-(2-(6-fluoroquinolin-4-yl)octahydro-5H-pyrrolo[3,4-c]pyridin-5-yl)propionate

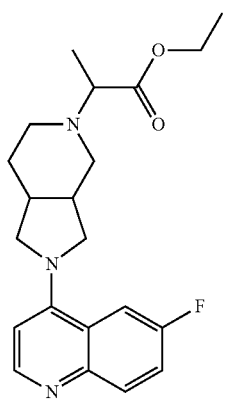 [SMILES: CCOC(=O)C(C)N1CCC2CN(c3ccnc4ccc(F)cc34)CC2C1]

According to the steps similar to those in Example 37, a pale yellow oily substance ethyl 2-(2-(6-fluoroquinolin-4-yl)octahydro-5H-pyrrolo[3,4-c]pyridin-5-yl)propionate (380 mg, 73% yield) was prepared from 6-fluoro-4-(octahydro-2H-pyrrolo[3,4-c]pyridin-2-yl)quinoline hydrochloride (380 mg, 1.2 mmol) and ethyl 2-bromopropionate (362 mg, 2.4 mmol). LC-MS (m/z) 372 (M+1).

Example 63: Preparation of 2-(2-(6-fluoroquinolin-4-yl)octahydro-5H-pyrrolo[3,4-c]pyridin-5-yl)propionic Acid

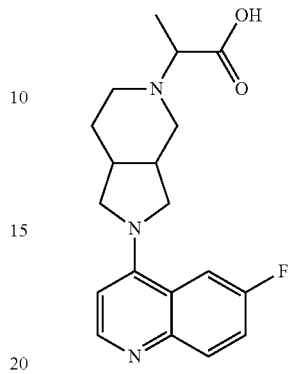

According to the steps similar to those in Example 38, a white solid 2-(2-(6-fluoroquinolin-4-yl)octahydro-5H-pyrrolo[3,4-c]pyridin-5-yl)propionic acid (300 mg, 85% yield) was prepared from ethyl 2-(2-(6-fluoroquinolin-4-yl)octahydro-5H-pyrrolo[3,4-c]pyridin-5-yl)propionate (380 mg, 1.0 mmol). LC-MS (m/z) 344 (M+1).

Example 64: Preparation of N-(4-chlorophenyl)-2-(2-(6-fluoroquinolin-4-yl)octahydro-5H-pyrrolo[3,4-c]pyridin-5-yl)propionamide

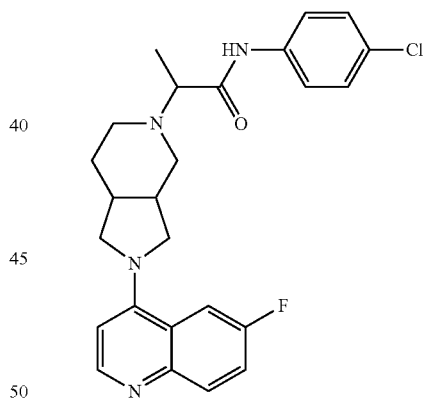

According to the steps similar to those in Example 39, a white solid N-(4-chlorophenyl)-2-(2-(6-fluoroquinolin-4-yl)octahydro-5H-pyrrolo[3,4-c]pyridin-5-yl)propionamide (20 mg, 15% yield) was prepared from 2-(2-(6-fluoroquinolin-4-yl)octahydro-5H-pyrrolo(3,4-c)pyridin-5-yl)propionic acid (100 mg, 0.29 mmol) and 4-chloroaniline (74 mg, 0.58 mmol). LC-MS (m/z) 453 (M+1).

$^1$H NMR (400 MHz, DMSO-$d_6$) δ 9.98 (s, 0.5H), 9.91 (s, 0.5H), 8.38 (dd, J=5.6, 1.6 Hz, 1H), 8.11-8.06 (m, 1H), 7.87 (dd, J=9.2, 6.0 Hz, 1H), 7.80-7.73 (m, 2H), 7.58-7.53 (m, 1H), 7.38-7.35 (m, 2H), 6.54 (dd, J=5.6, 3.2 Hz, 1H), 4.11-4.05 (m, 1H), 3.77-3.72 (m, 1H), 3.68-3.60 (m, 1H), 3.50-3.40 (m, 2H), 3.26-3.21 (m, 1H), 2.80-2.67 (m, 1H), 2.62-2.51 (m, 2H), 2.32-2.28 (m, 2H), 1.76-1.61 (m, 2H), 1.23-1.16 (m, 3H).

Example 65: Preparation of 2-(2-(6-fluoroquinolin-4-yl)octahydro-5H-pyrrolo[3,4-c]pyridin-5-yl)-N-(3-methoxyphenyl)propionamide

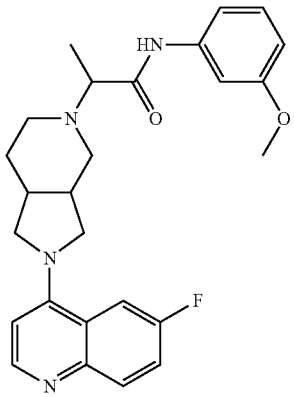 [SMILES: COc1cccc(NC(=O)C(C)N2CCC3CN(c4ccnc5ccc(F)cc45)CC3C2)c1]

According to the steps similar to those in Example 39, a white solid 2-(2-(6-fluoroquinolin-4-yl)octahydro-5H-pyrrolo[3,4-c]pyridin-5-yl)-N-(3-methoxyphenyl)propionamide (15 mg, 12% yield) was prepared from 2-(2-(6-fluoroquinolin-4-yl)octahydro-5H-pyrrolo[3,4-c]pyridin-5-yl) propionic acid (100 mg, 0.29 mmol) and 3-methoxyaniline (80 mg, 0.60 mmol). LC-MS (m/z) 449 (M+1).

$^1$H NMR (400 MHz, DMSO-$d_6$) δ 9.81 (s, 0.5H), 9.76 (s, 0.5H), 8.37 (d, J=5.6 Hz, 1H), 8.10-8.00 (m, 1H), 7.87 (dd, J=9.2, 6.0 Hz, 1H), 7.56-7.38 (m, 2H), 7.23-7.20 (m, 2H), 6.66-6.62 (m, 1H), 6.55-6.53 (m, 1H), 4.03-3.96 (m, 1H), 3.78-3.73 (m, 3H), 3.66-3.60 (m, 1H), 3.52-3.48 (m, 1H), 3.28-3.23 (m, 1H), 2.78-2.54 (m, 3H), 2.33-2.28 (m, 2H), 2.03-1.97 (m, 1H), 1.74-1.41 (m, 3H), 1.23-1.16 (m, 3H).

Example 66: Preparation of 2-(2-(6-fluoroquinolin-4-yl)octahydro-5H-pyrrolo[3,4-c]pyridin-5-yl)-N-(4-methoxyphenyl)propionamide

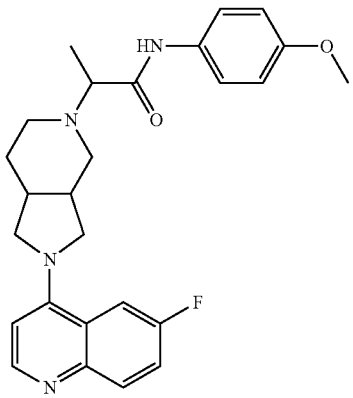 [SMILES: COc1ccc(NC(=O)C(C)N2CCC3CN(c4ccnc5ccc(F)cc45)CC3C2)cc1]

According to the steps similar to those in Example 39, a white solid 2-(2-(6-fluoroquinolin-4-yl)octahydro-5H-pyrrolo[3,4-c]pyridin-5-yl)-N-(3-methoxyphenyl)propionamide (12 mg, 11% yield) was prepared from 2-(2-(6-fluoroquinolin-4-yl)octahydro-5H-pyrrolo[3,4-c]pyridin-5-yl) propionic acid (85 mg, 0.24 mmol) and 4-methoxyaniline (65 mg, 0.48 mmol). LC-MS (m/z) 449 (M+1).

$^1$H NMR (400 MHz, DMSO-$d_6$) δ 9.70 (s, 0.5H), δ 9.64 (s, 0.5H), 8.38 (d, J=5.6 Hz, 1H), 8.11-8.06 (m, 1H), 7.89-7.85 (m, 1H), 7.63-7.53 (m, 3H), 6.92-6.87 (m, 2H), 6.55-6.53 (m, 1H), 4.08-4.04 (m, 1H), 3.78-3.72 (m, 4H), 3.68-3.62 (m, 1H), 3.50-3.46 (m, 1H), 3.23-3.18 (m, 1H), 2.79-2.67 (m, 1H), 2.615-2.55 (m, 2H), 2.33-2.296 (m, 2H), 1.78-1.61 (m, 3H), 1.23-1.16 (m, 3H).

Example 67: Preparation of 2-(2-(6-fluoroquinolin-4-yl)octahydro-5H-pyrrolo[3,4-c]pyridin-5-yl)-N-phenyl-propionamide

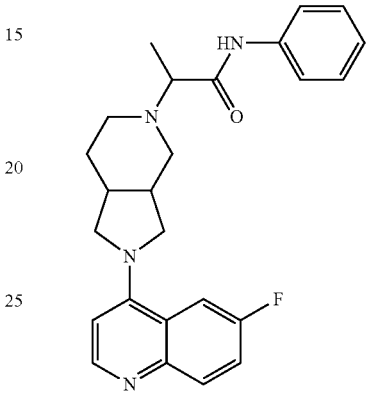

According to the steps similar to those in Example 39, a white solid 2-(2-(6-fluoroquinolin-4-yl)octahydro-5H-pyrrolo[3,4-c]pyridin-5-yl)-N-phenyl-propionamide (10 mg, 10% yield) was prepared from 2-(2-(6-fluoroquinolin-4-yl)octahydro-5H-pyrrolo[3,4-c]pyridin-5-yl)propionic acid (80 mg, 0.23 mmol) and aniline (45 mg, 0.46 mmol). LC-MS (m/z) 419 (M+1).

$^1$H NMR (400 MHz, DMSO-$d_6$) δ 9.87 (s, 0.5H), δ 9.79 (s, 0.5H), 8.42 (d, J=6.0 Hz, 1H), 8.20-8.15 (m, 1H), 7.93-7.90 (m, 1H), 7.74-7.63 (m, 3H), 7.35-7.29 (m, 2H), 7.09-7.04 (m, 1H), 6.62-6.60 (m, 1H), 4.16-4.12 (m, 1H), 3.87-3.72 (m, 2H), 3.61-3.57 (m, 1H), 3.43-3.268 (m, 3H), 2.82-2.58 (m, 3H), 2.34-2.29 (m, 2H), 1.76-1.61 (m, 2H), 1.26-1.15 (m, 3H).

Example 68: Preparation of tert-butyl 6-((6-fluoroquinolin-4-yl)amino)-3-aza-bicyclo[3.1.0]hexan-3-carboxylate

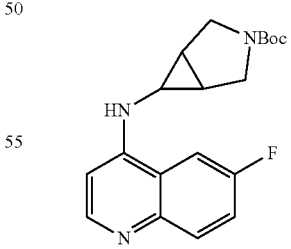

According to the steps similar to those in Example 50, a white solid tert-butyl 6-((6-fluoroquinolin-4-yl)amino)-3-aza-bicyclo[3.1.0]hexan-3-carboxylate (390 mg, 57% yield) was prepared from tert-butyl 6-amino-3-aza-bicyclo[3.1.0] hexan-3-carboxylate (440 mg, 2.2 mmol) and 4-chloro-6-fluoroquinoline (365 mg, 2.0 mmol). LC-MS (m/z) 344 (M+1).

Example 69: Preparation of N-(3-aza-bicyclo[3.1.0] hexan-6-yl)-6-fluoroquinolin-4-amine hydrochloride

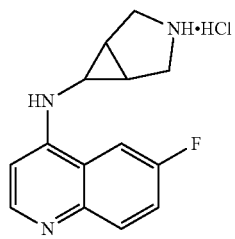

According to the steps similar to those in Example 2, a white solid N-(3-aza-bicyclo[3.1.0]hexan-6-yl)-6-fluoroquinolin-4-amine hydrochloride (300 mg, 95% yield) was prepared from tert-butyl 6-((6-fluoroquinolin-4-yl)amino)-3-aza-bicyclo[3.1.0]hexan-3-carboxylate (390 mg, 1.1 mmol). LC-MS (m/z) 244 (M+1).

Example 70: Preparation of ethyl 2-(6-((6-fluoroquinolin-4-yl)amino)-3-aza-bicyclo[3.1.0]hexan-3-yl)propionate

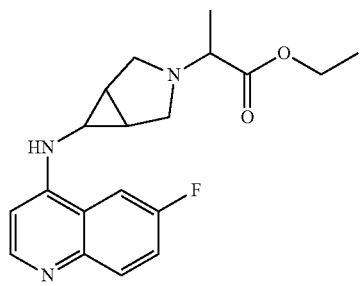 [SMILES: CCOC(=O)C(C)N1CC2C(C1)C2Nc1ccnc2ccc(F)cc12]

According to the steps similar to those in Example 37, a white solid ethyl 2-(6-((6-fluoroquinolin-4-yl)amino)-3-aza-bicyclo[3.1.0]hexan-3-yl)propionate (350 mg, 90% yield) was prepared from 6-fluoro-4-(octahydro-2H-pyrrolo[3,4-c]pyridin-2-yl)quinoline hydrochloride (300 mg, 1.1 mmol) and ethyl 2-bromopropionate (402 mg, 2.2 mmol). LC-MS (m/z) 344 (M+1).

Example 71: Preparation of 2-(6-((6-fluoroquinolin-4-yl)amino)-3-aza-bicyclo[3.1.0]hexan-3-yl)propionic Acid

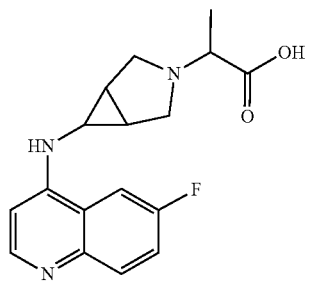 [SMILES: CC(C(=O)O)N1CC2C(C1)C2Nc1ccnc2ccc(F)cc12]

According to the steps similar to those in Example 38, a white solid 2-(6-((6-fluoroquinolin-4-yl)amino)-3-aza-bicyclo[3.1.0]hexan-3-yl)propionic acid (320 mg, 95% yield) was prepared from ethyl 2-(6-((6-fluoroquinolin-4-yl)amino)-3-aza-bicyclo[3.1.0]hexan-3-yl)propionate (350 mg, 1.0 mmol). LC-MS (m/z) 316 (M+1).

Example 72: Preparation of 2-(6-((6-fluoroquinolin-4-yl)amino)-3-aza-bicyclo[3.1.0]hexan-3-yl)-N-(4-chlorophenyl)propionamide

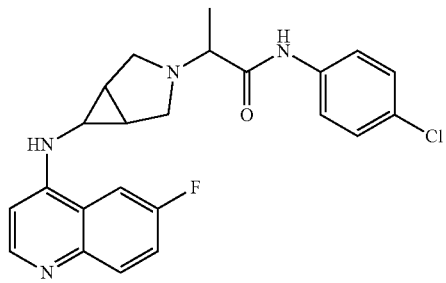 [SMILES: CC(C(=O)Nc1ccc(Cl)cc1)N1CC2C(C1)C2Nc1ccnc2ccc(F)cc12]

According to the steps similar to those in Example 39, a white solid 2-(6-((6-fluoroquinolin-4-yl)amino)-3-aza-bicyclo[3.1.0]hexan-3-yl)-N-(4-chlorophenyl)propionamide (7 mg, 7% yield) was prepared from 2-(6-((6-fluoroquinolin-4-yl)amino)-3-aza-bicyclo[3.1.0]hexan-3-yl)propionic acid (80 mg, 0.25 mmol) and 4-chloroaniline (64 mg, 0.5 mmol). LC-MS (m/z) 421 (M+1).
$^1$H NMR (400 MHz, DMSO-$d_6$) δ 9.77 (s, 1H), 8.44 (d, J=5.2 Hz, 1H), 7.99 (dd, J=11.2, 2.8 Hz, 1H), 7.83 (dd, J=9.2, 5.2 Hz, 1H), 7.68-7.65 (m, 2H), 7.53-7.48 (m, 1H), 7.39 (s, 1H), 7.36-7.32 (m, 2H), 6.69 (d, J=5.2 Hz, 1H), 3.24-3.12 (m, 3H), 2.91 (s, 1H), 2.73 (d, J=8.4 Hz, 1H), 2.65 (d, J=8.4 Hz, 1H), 1.68 (s, 2H), 1.24 (d, J=6.8 Hz, 3H).

Example 73: Preparation of 2-(6-((6-fluoroquinolin-4-yl)amino)-3-aza-bicyclo[3.1.0]hexan-3-yl)-N-(4-methoxyphenyl)propionamide

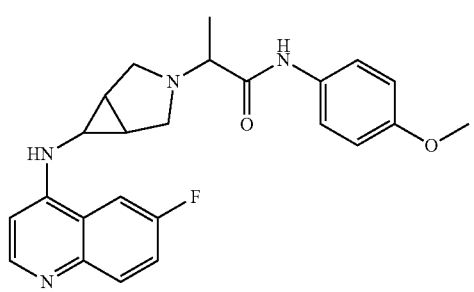 [SMILES: COc1ccc(NC(=O)C(C)N2CC3C(C2)C3Nc2ccnc3ccc(F)cc23)cc1]

According to the steps similar to those in Example 39, a white solid 2-(6-((6-fluoroquinolin-4-yl)amino)-3-aza-bicyclo[3.1.0]hexan-3-yl)-N-(3-methoxyphenyl)propionamide (12 mg, 11% yield) was prepared from 2-(6-((6-fluoroquinolin-4-yl)amino)-3-aza-bicyclo[3.1.0]hexan-3-yl)propionic acid (80 mg, 0.25 mmol) and 4-methoxyaniline (65 mg, 0.5 mmol). LC-MS (m/z) 421 (M+1).
$^1$H NMR (400 MHz, DMSO-$d_6$) δ 9.49 (s, 1H), 8.44 (d, J=5.2 Hz, 1H), 7.99 (dd, J=11.2, 2.8 Hz, 1H), 7.83 (dd, J=9.2, 5.6 Hz, 1H), 7.54-7.46 (m, 3H), 7.38 (s, 1H), 6.90-

6.82 (m, 2H), 6.69 (d, J=5.2 Hz, 1H), 3.70 (s, 3H), 3.21-3.10 (m, 3H), 2.91 (s, 1H), 2.73 (d, J=8.4 Hz, 1H), 2.65 (d, J=8.4 Hz, 1H), 1.68 (s, 2H), 1.23 (d, J=6.8 Hz, 3H).

Example 74: Preparation of 2-(6-(((6-fluoroquinolin-4-yl)amino)-3-aza-bicyclo[3.1.0]hexan-3-yl)-N-phenyl-propionamide

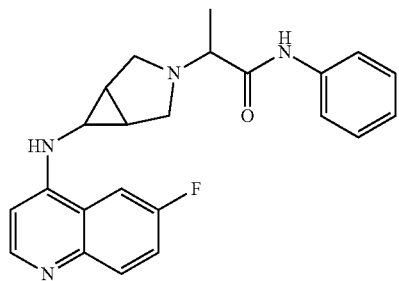 [SMILES: CC(C(=O)Nc1ccccc1)N1CC2C(C1)C2Nc1ccnc2ccc(F)cc12]

According to the steps similar to those in Example 39, a white solid 2-(6-(((6-fluoroquinolin-4-yl)amino)-3-aza-bicyclo[3.1.0]hexan-3-yl)-N-phenyl-propionamide (10 mg, 9% yield) was prepared from 2-(6-(((6-fluoroquinolin-4-yl)amino)-3-aza-bicyclo[3.1.0]hexan-3-yl)propionic acid (80 mg, 0.25 mmol) and aniline (60 mg, 0.5 mmol). LC-MS (m/z) 391 (M+1).

$^1$H NMR (400 MHz, DMSO-$d_6$) δ 9.63 (s, 1H), 8.45 (d, J=5.2 Hz, 1H), 8.00 (dd, J=11.2, 2.8 Hz, 1H), 7.83 (dd, J=9.2, 5.6 Hz, 1H), 7.62-7.62 (m, 2H), 7.54-7.49 (m, 1H), 7.42 (s, 1H), 7.28 (t, J=7.2 Hz, 2H), 7.04 (t, J=7.2 Hz, 1H), 6.70 (d, J=5.2 Hz, 1H), 3.23-3.140 (m, 3H), 2.91 (s, 1H), 2.74 (d, J=8.4 Hz, 1H), 2.66 (d, J=8.4 Hz, 1H), 1.69 (s, 2H), 1.25 (d, J=6.8 Hz, 3H).

Example 75: Preparation of 2-(6-(((6-fluoroquinolin-4-yl)amino)-3-aza-bicyclo[3.1.0]hexan-3-yl)-N-(4-methoxyphenyl)propionamide

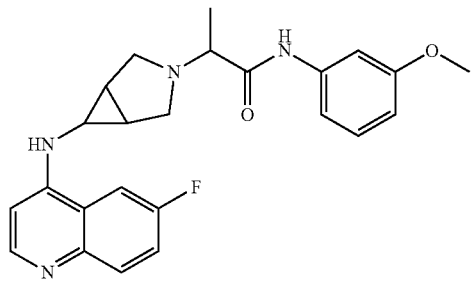 [SMILES: COc1cccc(NC(=O)C(C)N2CC3C(C2)C3Nc2ccnc3ccc(F)cc23)c1]

According to the steps similar to those in Example 39, a white solid 2-(6-(((6-fluoroquinolin-4-yl)amino)-3-aza-bicyclo[3.1.0]hexan-3-yl)-N-(4-methoxyphenyl)propionamide (20 mg, 19% yield) was prepared from 2-(6-(((6-fluoroquinolin-4-yl)amino)-3-aza-bicyclo[3.1.0]hexan-3-yl)propionic acid (80 mg, 0.25 mmol) and 3-methoxyaniline (65 mg, 0.5 mmol). LC-MS (m/z) 421 (M+1).

$^1$H NMR (400 MHz, DMSO-$d_6$) δ 9.65 (s, 1H), 8.46 (d, J=5.2 Hz, 1H), 8.03 (d, J=8.4 Hz, 1H), 7.86 (dd, J=9.2, 5.6 Hz, 1H), 7.54 (t, 1H), 7.45 (s, 1H), 7.37 (s, 1H), 7.21-7.19 (m, 2H), 6.72-6.53 (m, 2H), 3.72 (s, 3H), 3.22-3.19 (m, 3H), 2.91 (s, 1H), 2.77 (d, J=8.4 Hz, 1H), 2.67 (d, J=8.4 Hz, 1H), 1.70 (s, 2H), 1.25 (d, J=6.8 Hz, 3H).

Example 76: Preparation of 2-bromo-3-hydroxypropionic Acid

L-serine (500 mg, 4.8 mmol) and sodium bromide were dissolved in 2.5M sulfuric acid aqueous solution (10 mL), and sodium nitrite (460 mg, 6.7 mmol) was slowly added under ice-salt bath. The reaction solution was slowly warmed to room temperature and reacted for 15 hours, then added with water and ethyl acetate for extraction, washed with brine and water respectively, dried over anhydrous sodium sulfate, filtered, and distilled under reduced pressure to obtain a pale yellow oily substance 2-bromo-3-hydroxypropionic acid (400 mg, 30% yield). LC-MS (m/z) 169 (M+1).

Example 77: Preparation of 2-bromo-N-(4-chlorophenyl)-3-hydroxypropionamide

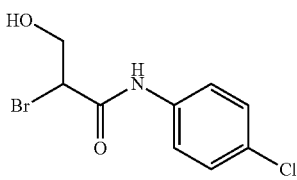 [SMILES: O=C(Nc1ccc(Cl)cc1)C(Br)CO]

2-Bromo-3-hydroxypropionic acid (200 mg, 1.2 mmol), p-chloroaniline (100 mg, 0.78 mmol) and N,N-diisopropylethylamine (0.6 mL, 3.1 mmol) were dissolved in tetrahydrofuran (5 mL), and then added with 2-(7-oxobenzotriazole)-N,N,N',N'-tetramethylurea hexafluorophosphate (600 mg, 1.6 mmol). The reaction solution was stirred at room temperature for 5 hours, then poured into water, adjusted with sodium bicarbonate aqueous solution to pH 8-10, extracted with ethyl acetate, washed with water, dried, and concentrated under reduced pressure to obtain a residue, which was separated by column chromatography [ethyl acetate/petroleum ether=1/2] to obtain a light brown solid 2-bromo-N-(4-chlorophenyl)-3-hydroxypropionamide (100 mg, 46% yield). LC-MS (m/z) 279 (M+1).

Example 78: Preparation of N-(4-chlorophenyl)-2-(6-((6-fluoroquinolin-4-yl)amino)-3-aza-bicyclo[3.1.0]hexan-3-yl)-3-hydroxypropionamide

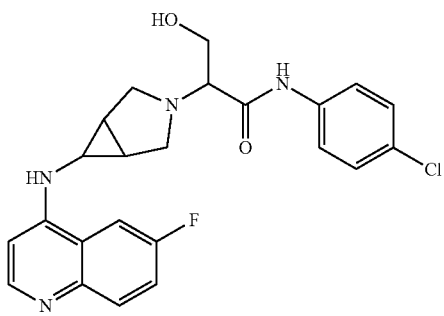 [SMILES: O=C(Nc1ccc(Cl)cc1)C(CO)N1CC2C(C1)C2Nc1ccnc2ccc(F)cc12]

2-Bromo-N-(4-chlorophenyl)-3-hydroxypropionamide (65 mg, 0.23 mmol), N-(3-aza-bicyclo[3.1.0]hexan-6-yl)-6-fluoroquinolin-4-amine hydrochloride (40 mg, 0.16 mmol) and potassium carbonate (68 mg, 48 mmol) were dissolved in acetonitrile (5 mL). The reaction solution was stirred at 80° C. for 8 hours, then poured into water, and a solid was precipitated out, filtered, and the residue was separated by column chromatography [methanol/dichloromethane=1/25] to obtain a white solid ethyl 2-(6-((6-fluoroquinolin-4-yl)oxy)-2-aza-spiro[3.3]heptan-2-yl)propionate (13 mg, 18% yield). LC-MS (m/z) 441 (M+1).

Example 79: Preparation of tert-butyl 5-((6-fluoroquinolin-4-yl)amino)hexahydro-cyclopenta[c]pyrrol-2(1H)-carboxylate

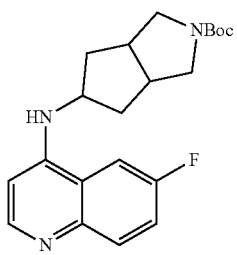 [SMILES: CC(C)(C)OC(=O)N1CC2CC(Nc3ccnc4ccc(F)cc34)CC2C1]

According to the steps similar to those in Example 50, a white solid tert-butyl 5-((6-fluoroquinolin-4-yl)amino)hexahydro-cyclopenta[c]pyrrol-2(1H)-carboxylate (200 mg, 65% yield) was prepared from tert-butyl 5-amino-hexahydro-cyclopenta[c]pyrrol-2(1H)-carboxylate (210 mg, 0.9 mmol) and 4-chloro-6-fluoroquinoline (150 mg, 0.82 mmol). LC-MS (m/z) 372 (M+1).

Example 80: Preparation of 6-fluoro-N-(octahydro-cyclopenta[c]pyrrol-5-yl) quinolin-4-amine Hydrochloride

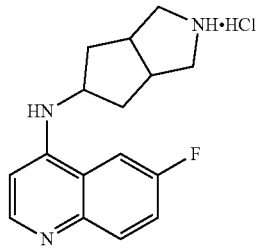

According to the steps similar to those in Example 2, a white solid 6-fluoro-N-(octahydro-cyclopenta[c]pyrrol-5-yl)quinolin-4-amine hydrochloride (150 mg, 91% yield) was prepared from tert-butyl 5-((6-fluoroquinolin-4-yl)amino)-hexahydro-cyclopenta[c]pyrrol-2(1H)-carboxylate (200 mg, 0.54 mmol). LC-MS (m/z) 272 (M+1).

Example 81: Preparation of ethyl 2-(5-((6-fluoroquinolin-4-yl)amino)-hexahydro-cyclopenta[c]pyrrol-2(1H)-yl)propionate

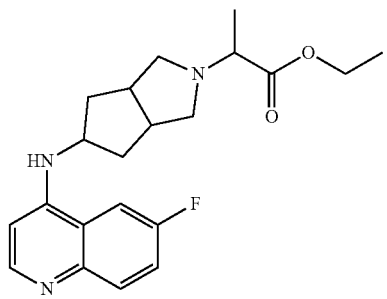 [SMILES: CCOC(=O)C(C)N1CC2CC(Nc3ccnc4ccc(F)cc34)CC2C1]

According to the steps similar to those in Example 37, a white solid ethyl 2-(5-((6-fluoroquinolin-4-yl)amino)hexahydro-cyclopenta[c]pyrrol-2(1H)-yl)propionate (100 mg, 55% yield) was prepared from 6-fluoro-N-(octahydro-cyclopenta[c]pyrrol-5-yl)quinolin-4-amine hydrochloride (150 mg, 0.49 mmol) and ethyl 2-bromopropionate (177 mg, 0.98 mmol). LC-MS (m/z) 372 (M+1).

Example 82: Preparation of 2-(5-((6-fluoroquinolin-4-yl)amino)hexahydro-cyclopenta[c]pyrrol-2(1H)-yl)propionic Acid

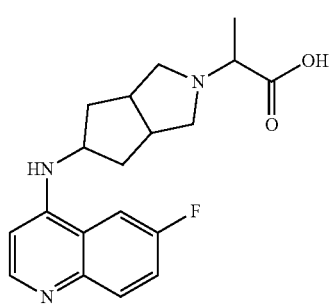 [SMILES: CC(C(=O)O)N1CC2CC(Nc3ccnc4ccc(F)cc34)CC2C1]

According to the steps similar to those in Example 38, a white solid 2-(5-((6-fluoroquinolin-4-yl)amino)hexahydro-cyclopenta[c]pyrrol-2(1H)-yl)propionic acid (80 mg, 87% yield) was prepared from ethyl 2-(5-((6-fluoroquinolin-4-yl)amino)hexahydro-cyclopenta[c]pyrrol-2(1H)-yl)propionate (100 mg, 0.27 mmol). LC-MS (m/z) 344 (M+1).

Example 83: Preparation of N-(4-chlorophenyl)-2-(5-((6-fluoroquinolin-4-yl)amino)hexahydro-cyclopenta[c]pyrrol-2(1H)-yl)propionamide

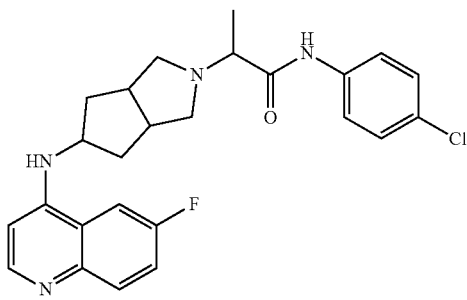 [SMILES: CC(C(=O)Nc1ccc(Cl)cc1)N1CC2CC(Nc3ccnc4ccc(F)cc34)CC2C1]

According to the steps similar to those in Example 39, a light yellow solid N-(4-chlorophenyl)-2-(5-((6-fluoroquinolin-4-yl)amino)hexahydro-cyclopenta[c]pyrrol-2(1H)-yl)propionamide (15 mg, 14% yield) was prepared from 2-(5-((6-fluoroquinolin-4-yl)amino) hexahydro-cyclopenta[c]pyrrol-2(1H)-yl)propionic acid (80 mg, 0.23 mmol) and 4-chloroaniline (60 mg, 0.46 mmol). LC-MS (m/z) 453 (M+1).

$^1$H NMR (400 MHz, DMSO-$d_6$) δ 9.84 (s, 1H), 8.37 (d, J=5.6 Hz, 1H), 8.20 (dd, J=11.2, 2.8 Hz, 1H), 7.84 (dd, J=9.2, 5.6 Hz, 1H), 7.70 (d, J=8.8 Hz, 2H), 7.57-7.52 (m, 1H), 7.37 (d, J=8.8 Hz, 2H), 6.93 (d, J=6.4 Hz, 1H), 6.56 (d, J=5.6 Hz, 1H), 4.24-4.17 (m, 1H), 3.10-3.05 (m, 1H), 2.69-2.66 (m, 4H), 2.44-2.37 (m, 1H), 2.03-1.83 (m, 5H), 1.29 (d, J=6.8 Hz, 3H).

Example 84: Preparation of methyl benzo[d][1,3]dioxol-5-yl-glycinate

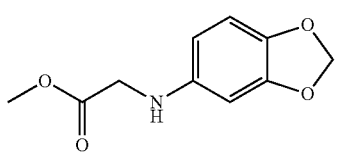

3,4-Methylenedioxyaniline (160 mg, 1.16 mmol) was dissolved in 20 ml of DMF, added with potassium carbonate (480 mg, 3.48 mmol) and ethyl bromoacetate (213 mg, 1.4 mmol), and reacted at room temperature for 16 hours. The reaction solution was poured into 40 ml of water, extracted twice with 20 ml of ethyl acetate, the organic phases were combined, dried over anhydrous sodium sulfate, filtered, subjected to rotary evaporation to remove the solvent and separated by column chromatography [ethyl acetate/petroleum ether=1/6] to obtain a brown oily substance methyl benzo[d][1,3]dioxol-5-yl-glycinate (175 mg, 72% yield). LC-MS (m/z) 210 (M+H).

Example 85: Preparation of benzo[d][1,3]dioxol-5-yl-glycine

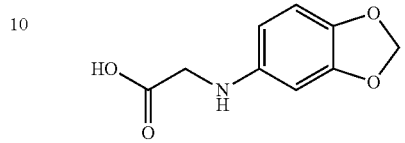

Methyl benzo[d][1,3]dioxol-5-yl-glycinate (175 mg, 3.42 mmol) was dissolved in 20 ml of methanol, added with sodium hydroxide (164 mg, 4.1 mmol), reacted at room temperature for 16 hours, poured into 20 ml of water, adjusted with hydrochloric acid to pH=4, then extracted twice with 20 ml of ethyl acetate, the organic phases were combined, dried with anhydrous sodium sulfate, filtered, the organic phase was subjected to rotary evaporation to obtain a brown solid benzo[d][1,3]dioxol-5-yl-glycine (160 mg, 98% yield). LC-MS (m/z) 196 (M+H).

Example 86: Preparation of 2-(benzo[d][1,3]dioxol-5-yl-amino)-1-(4-(2-(6-fluoro-5H-imidazo[5,1-a]isoindol-5-yl)acetyl)piperidin-1-yl)ethyl-1-one

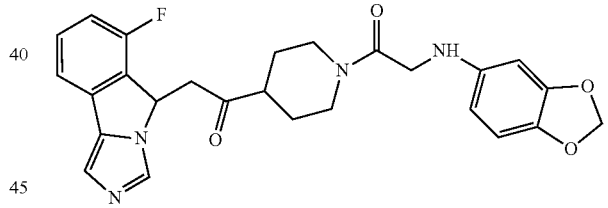

1-Boc-4-[2-(6-fluoro-5H-imidazo[5,1-a]isoindol-5-yl)acetyl]piperidine (100 mg, 0.25 mmol) was dissolved in 20 ml of dichloromethane, then added with 0.5 ml of hydrochloric acid, reacted at room temperature for 2 hours, subjected to rotary evaporation to remove the solvent, added with 10 ml of DMF and stirred until the dissolution was completed, then added with benzo[d][1,3]dioxol-5-yl-glycine (58.5 mg, 0.3 mmol) and 1-hydroxybenzotriazole (67.7 mg, 0.5 mmol), 1-(3-dimethylaminopropyl)-3-ethylcarbodiimide hydrochloride (95.6 mg, 0.5 mmol), 1 ml of N,N-diisopropylethylamine, reacted at room temperature for 16 hours, poured into 40 ml of water, extracted twice with 30 ml of ethyl acetate, the organic phases were combined, dried over anhydrous sodium sulfate, filtered, the organic phase was subjected to rotary evaporation to remove the solvent and separated by column chromatography [dichloromethane/methanol=100/3] to obtain a white solid 2-(benzo[d][1,3]dioxol-5-yl-amino)-1-(4-(2-(6-fluoro-5H-imidazo[5,1-a]isoindol-5-yl)acetyl)piperidin-1-yl)ethyl-1-one (50 mg, 42% yield). LC-MS (m/z) 477 (M+H).

Example 87: Preparation of 2-(benzo[d][1,3]dioxol-5-yl-amino)-1-(4-(2-(6-fluoro-5H-imidazo[5,1-a)isoindol-5-yl)-1-hydroxyethyl)piperidin-1-yl)ethyl-1-one

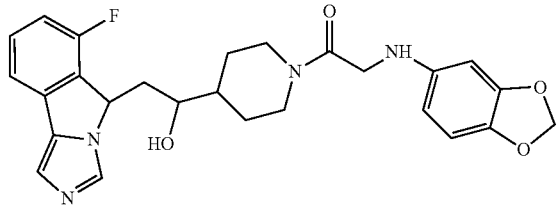 [SMILES: O=C(CNc1ccc2c(c1)OCO2)N1CCC(C(O)CC2c3c(F)cccc3-c3cncn32)CC1]

2-(Benzo[d][1,3]dioxol-5-yl-amino)-1-(4-(2-(6-fluoro-5H-imidazo[5,1-a]isoindol-5-yl)acetyl)piperidin-1-yl)ethyl-1-one (50 mg, 0.1 mmol) was dissolved in 10 ml of methanol, cooled under nitrogen protection to 0° C. with ice bath, then added with sodium borohydride (11.3 mg, 0.1 mmol), reacted at room temperature for 2 hours, added with 1 ml of saturated ammonium chloride aqueous solution, stirred for 5 minutes, poured into 20 ml of water, extracted twice with 20 ml of ethyl acetate, the organic phases were combined, dried over anhydrous sodium sulfate, the organic phase was subjected to rotary evaporation to remove the solvent and separated by column chromatography (dichloromethane/methanol=20/1) to obtain a light brown solid 2-(benzo[d][1,3]dioxol-5-yl-amino)-1-(4-(2-(6-fluoro-5H-imidazo[5,1-a]isoindol-5-yl)-1-hydroxyethyl)piperidin-1-yl)ethyl-1-one (15 mg, 30% yield).

$^1$H NMR (400 MHz, DMSO-d6) δ 8.00 (s, 0.7H), 7.97 (s, 0.3H), 7.47-7.42 (m, 2H), 7.22 (s, 0.3H), 7.20 (s, 0.7H), 7.14-7.07 (m, 1H), 6.65 (d, J=8.4 Hz, 1H), 6.42 (d, J=2.0 Hz, 1H), 6.07 (dd, J=8.4, 2.0 Hz, 1H), 5.83 (s, 2H), 5.72-5.67 (m, 0.3H), 5.64-5.57 (m, 0.7H), 5.19-5.11 (m, 0.3H), 4.73 (t, J=4.8 Hz, 0.8H), 4.42 (t, J=12.5 Hz, 1H), 3.94 (s, br, 1H), 3.80 (s, 2H), 3.43 (s, br, 1H), 3.00-2.82 (m, 1H), 2.41-2.23 (m, 1H), 2.04-1.86 (m, 0.7H), 1.87-1.76 (m, 0.3H), 1.74-1.42 (m, 3H), 1.37-0.97 (m, 4H).

LC-MS (m/z) 479 (M+H).

In Vitro Biological Evaluation

The subject of this assay was to comprehensively evaluate different compounds on their enzymatic inhibitory activity in vitro and on cell models against human indoleamine 2,3-dioxygenase 1 (hIDO1).

Example 88: Inhibitory Activity Test at Cellular Level

In addition to the constitutive expression in immune cells such as myeloid-derived suppressor cells (MDSC), IDO1 is also up-regulated in many tumor cells, or is induced by cytokine such as IFN-γ. In the present application, the inventors used Hela cells expressing IDO1 induced by IFN-γ as a model, to test the IDO1 inhibitory activity of the compounds at the cellular level.

Main Experimental Principle

HeLa cells are human cervical cancer cell lines, which can up-regulate the expression of endogenous IDO1 under the induction of human IFN-γ. By adding the substrate L-tryptophan to cell culture medium, the enzymatic catalysis product kynurenine in cell supernatant was detected. In this experiment, the cultured Hela cells were used and co-incubated with different concentrations of test compounds under stimulation of human IFN-γ for a specified period of time, and the color reaction method of enzyme product and p-dimethylaminobenzaldehyde was used to detect the effect on IDO enzyme activity of cells treated by the test compounds.

Experimental Materials and Reagents

Recombinant human IFN-γ cytokine was purchased from Sangon Biotechnology Co., Ltd., and phenol red-free DMEM for cell culture was purchased from Gibco. Detection reagents such as L-tryptophan (Sangon, A601911-0050), Kynurenine (Sigma, K8625-100MG), trichloroacetic acid (Sangon, A600968-0250), p-dimethylaminobenzaldehyde (Tianjin Damao Chemical Reagent Factory), 96-well flat bottom plate for cell culture (CORNING, costar 3599).

Experimental Method

According to the conventional cell culture experiment procedure, the experiment was carried out in a 96-well flat bottom plate.

(1) Hela cells were inoculated into 96-well culture plates at an appropriate concentration (about 20,000 cells/well). After adherent culture overnight, the culture medium was replaced with phenol red-free DMEM medium containing 200 μM L-tryptophan, 50 ng/ml cytokine human IFN-γ and test compounds with different concentration gradients (maximum final concentration was 25 μM) and NLG919 were added simultaneously, the vehicle control (DMSO) and negative control wells without cytokine and L-tryptophan were set at the same time, and triplicate wells were set. The cells were continuously cultured for 48 hours before detection.

(2) 200 μL of the supernatant in the culture well was pipetted out, added with 40 μL of the pre-prepared 30% (w/v) trichloroacetic acid solution, and reacted at 65° C. for 20 minutes, and then centrifuged at 12000 rpm for 15 minutes.

(3) 100 μL of the supernatant after centrifugation was pipetted out, added into a 96-well flat bottom plate, then added with an equal volume of 2% p-dimethylaminobenzaldehyde in glacial acetic acid and mixed well, and stood at room temperature for 10 minutes.

(4) microplate reader (ELX800NB) was used to detect the absorbance value of each well, and the detection wavelength was 492 nm.

(5) the calculation formula of enzymatic inhibition rate of test compound at cellular level was:

Enzyme activity inhibition rate (%)=
$(OD_{solvent\ control} - OD_{compound\ detection\ well}) / (OD_{solvent\ control} - OD_{negative\ control}) * 100\%$.

In addition, after the cell enzyme activity inhibition rates of test compounds with different concentration gradients were separately calculated, their cell enzyme activity half inhibition concentrations ($EC_{50}$) were calculated by using $EC_{50}$ calculator.

According to the above-mentioned experimental method, the compounds of the present application were subjected to IDO1 enzymatic evaluation at cytological level (the concentration of each test compound was all 100 nM). The data summary was shown in Table 1.

TABLE 1

Data of hIDO1-cell base inhibition rates of the representative compounds of the present application

| Example | hIDO1-cell base inhibition rate (%) |
|---|---|
| 3 | 90 |
| 4 | 49 |

TABLE 1-continued

Data of hIDO1-cell base inhibition rates of the
representative compounds of the present application

| Example | hIDO1-cell base inhibition rate (%) |
|---|---|
| 5 | 63 |
| 6 | 87 |
| 7 | 31 |
| 10 | 90 |
| 11 | 25 |
| 14 | 13 |
| 15 | 18 |
| 16 | 85 |
| 19 | 61 |
| 20 | 64 |
| 23 | 74 |
| 26 | 15 |
| 29 | 10 |
| 30 | 11 |
| 31 | 46 |
| 32 | 44 |
| 33 | 10 |
| 36 | 26 |
| 39 | 91 |
| 40 | 19 |
| 41 | 23 |
| 46 | 49 |
| 49 | 99 |
| 54 | 69 |
| 59 | 85 |
| 64 | 96 |
| 65 | 59 |
| 66 | 90 |
| 67 | 94 |
| 72 | 88 |
| 73 | 83 |
| 74 | 85 |
| 75 | 47 |
| 78 | 42 |
| 83 | 45 |
| 87 | 23 |
| NLG919 | 10 |

According to the above-mentioned experimental method, the compound of the present application was subjected to hIDO1-cell base $EC_{50}$ detection. The data summary was shown in Table 2.

TABLE 2

Data of hIDO1-cell base $EC_{50}$ (nM) of the
representative compounds of the present application

| Example | $EC_{50}$ (nM) |
|---|---|
| 3 | 14 |
| 6 | 36 |
| 16 | 33 |
| 20 | 46 |
| 23 | 26 |
| 39 | 20 |
| 49 | 5 |
| 59 | 25 |
| 72 | 8 |

Example 89: Experiment of Inhibiting Enzyme Activity of IDO in HeLa Cell Using Chidamide in Combination with the Compound of Example 3

Experimental Materials

Human cervical cancer cell line HeLa was purchased from the Cell Resource Center, Shanghai Institute of Biological Science, Chinese Academy of Sciences, and was routinely cultured at 37° C. and 5% $CO_2$; the culture medium was DMEM (Gibco) containing 10% fetal bovine serum (FBS; Gibco) and 1% Penicillin-Streptomycin (Hy-Clone). Trypsin was purchased from Gibco. Recombinant human IFN-γ cytokine was purchased from Sangon Biotech. Phenol red-free DMEM for cell culture was purchased from Gibco. Detection reagents included L-tryptophan (Sangon, A601911-0050), kynurenine (Sigma, K8625-100MG), trichloroacetic acid (Sangon, A600968-0250), p-dimethyl-aminobenzaldehyde (Tianjin Damao Chemical Reagent Factory). 96-Well flat bottom plates (CORNING, costar 3599) for cell culture.

Experimental Method

HeLa cells were digested by trypsin, collected and counted, then inoculated in a 96-well cell culture plate at $2 \times 10^4$ cells per well and cultured at 5% $CO_2$ and 37° C. After the cells were inoculated overnight, the medium was replaced with 200 μM L-tryptophan phenol red-free DMEM medium, and 50 ng/ml cytokine human IFN-γ and drugs with different concentrations (administered according to the group and final concentration shown in FIG. 1) were added simultaneously, the vehicle control (DMSO) and cytokine-free and L-tryptophan negative control wells were set at the same time, and triplicate wells were set. After 48 hours of drug treatment, 200 μL of the supernatant from culture well was pipetted out, added with 40 μL of pre-prepared 30% (w/v) trichloroacetic acid solution, reacted at 65° C. for 20 minutes, and then centrifuged at 12000 rpm for 15 minutes. 100 μL of the supernatant was pipetted out and added into a 96-well flat bottom plate, then equal volume of 2% p-dimethylaminobenzaldehyde in glacial acetic acid was added and mixed well, and stood at room temperature for 10 minutes. The absorbance value of each well at wavelength of 492 nm was read with microplate reader (ELX800NB). After subtracting the cell-free medium OD492-BLK as a blank control from the reading of each well, the OD492-T of each dosing well with subtraction of the detection background and the OD490-T0 of drug-free positive control well were obtained.

The relative enzyme activity inhibition rate against IDO of each dosing well cell was calculated according to the following formula:

$$\text{enzyme activity inhibition rate against IDO} = (OD_{492-T0} - OD_{492-T})/OD_{492-T0} \times 100\%$$

Experimental Results

As shown in FIG. 1 and Table 3, as compared with the vehicle control, both chidamide and the compound of Example 3 showed a certain inhibitory effect on enzyme activity of IDO; while the combination of the two drugs showed a significantly synergistic or superimposed inhibitory effect. Considering that HDAC inhibitor did not directly bind to and inhibited the catalytic activity of IDO protease, but indirectly inhibited IDO activity by down-regulating IDO mRNA to reduce protein expression thereof (He Y W, et al. Life Sci, 2013, 93(15):509-515), therefore, the combination of epigenetic inhibitor and IDO inhibitor actually exert a synergistic inhibitory effect on IDO enzyme activity via different mode of action.

TABLE 3 enzyme inhibition rate against IDO of chidamide and the compound of Example 3 alone and in combination

|  | vehicle control | Chidamide | Example 3 | Combination of two drugs |
|---|---|---|---|---|
| Average inhibition rate (%) | 0.5 | 24 | 31 | 49 |

Example 90: Experiment of Inhibiting Enzyme Activity of IDO in HeLa Cell Using Chidamide in Combination with the Compound of Example 20

Figure 2:
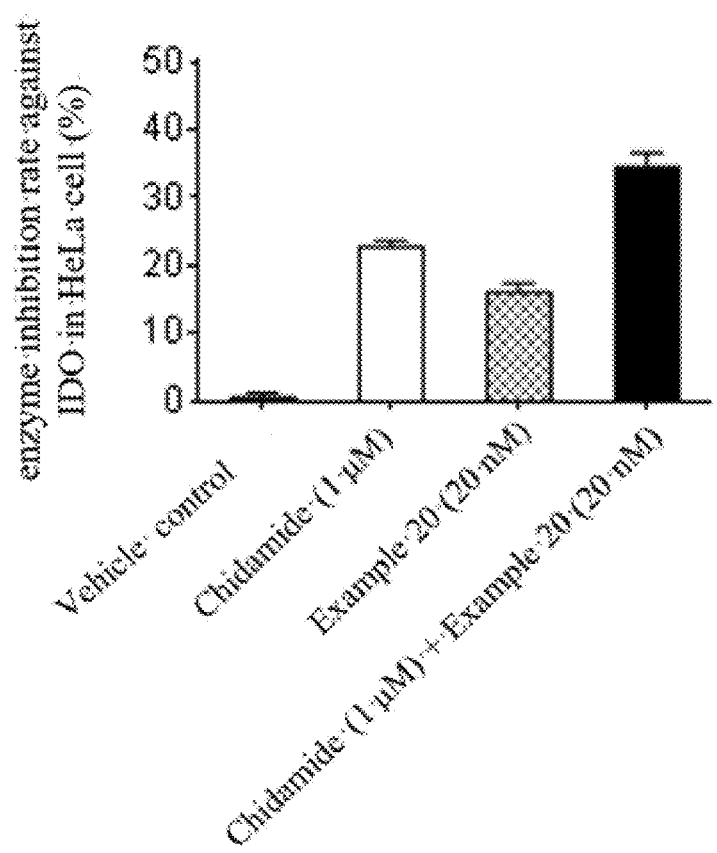
FIG. 2 shows the inhibition of IDO enzyme activity of HeLa cells by Chidamide in combination with Example 20.

The method similar to Example 89 was applied. The experimental results obtained were shown in FIG. 2 and Table 4.

TABLE 4 enzyme inhibition rate against IDO of chidamide and the compound of Example 20 alone and in combination

|  | vehicle control | Chidamide | Example 20 | Combination of two drugs |
|---|---|---|---|---|
| Average inhibition rate (%) | 0.5 | 22 | 16 | 35 |

Example 91: Experiment of Inhibiting Enzyme Activity of IDO in HeLa Cell Using Chidamide in Combination with the Compound of Example 72

Figure 3:
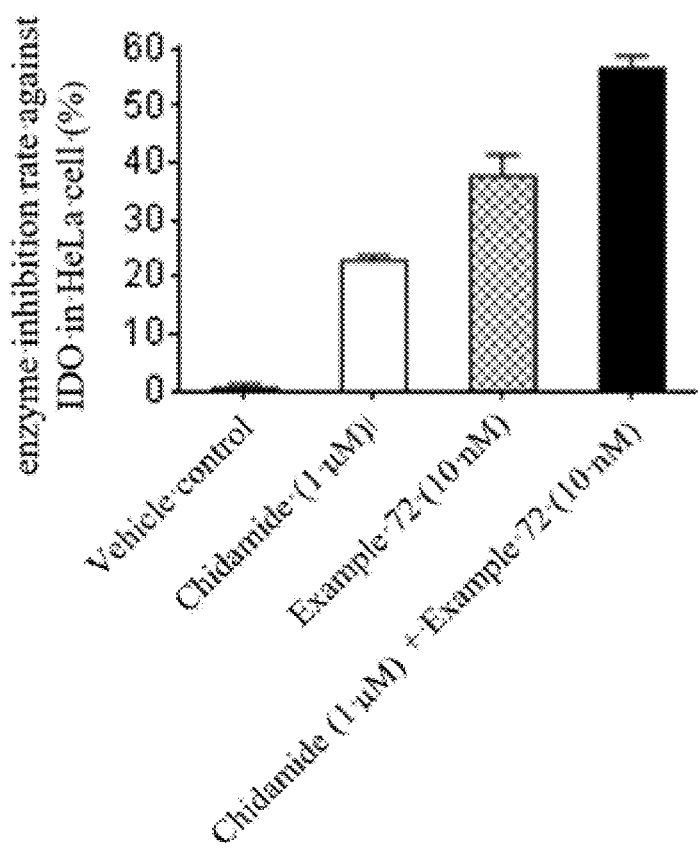
FIG. 3 shows the inhibition of IDO enzyme activity of HeLa cells by Chidamide in combination with Example 72.

The method similar to Example 89 was applied. The experimental results obtained were shown in FIG. 3 and Table 5.

TABLE 5 enzyme inhibition rate against IDO of chidamide and the compound of Example 72 alone and in combination

|  | vehicle control | Chidamide | Example 72 | Combination of two drugs |
|---|---|---|---|---|
| Average inhibition rate (%) | 0.5 | 23 | 36 | 58 |

Example 92: Experiment of Inhibiting Enzyme Activity of IDO in HeLa Cell Using Chidamide in Combination with the Compound of Example 87

Figure 4:
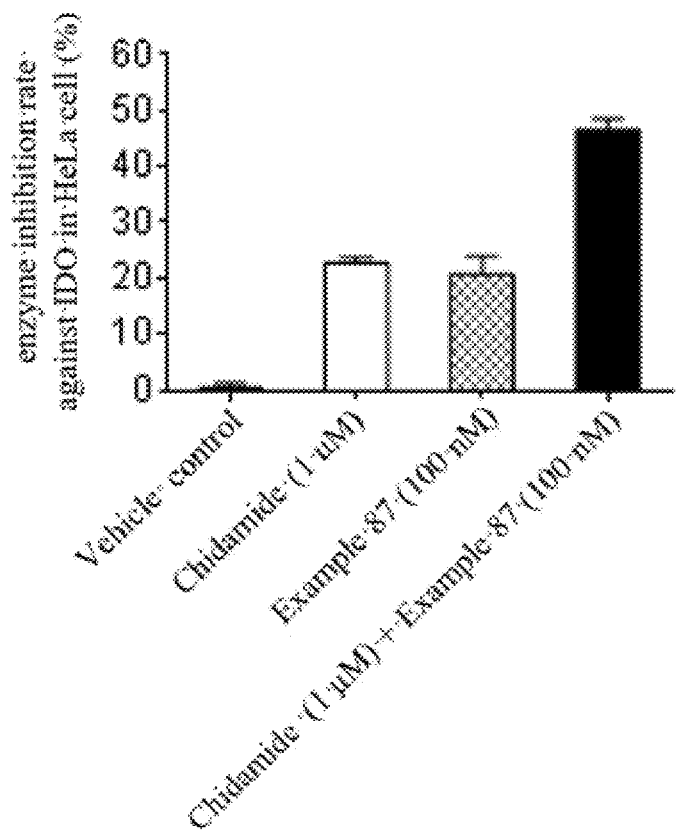
FIG. 4 shows the inhibition of IDO enzyme activity of HeLa cells by Chidamide in combination with Example 87.

The method similar to Example 89 was applied. The experimental results obtained were shown in FIG. 4 and Table 6.

TABLE 6 enzyme inhibition rate against IDO of chidamide and the compound of Example 87 alone and in combination

|  | vehicle control | Chidamide | Example 87 | Combination of two drugs |
|---|---|---|---|---|
| Average inhibition rate (%) | 0.5 | 23 | 20 | 47 |

Example 93: Efficacy Experiment of Chidamide in Combination with Example 3 on Balb/c Mouse CT-26 Tumor Model Experimental Materials The mouse colon cancer cell line CT-26 was purchased from the Cell Resource Center, Shanghai Institute of Biological Science, Chinese Academy of Sciences, and was routinely cultured at 37° C., 5% $CO_2$, and the culture medium was DMEM (Gibco) containing 10% fetal bovine serum (FBS; Gibco) and 1% Penicillin-Streptomycin (Hy-Clone); trypsin was purchased from Gibco. Normal Balb/c mice were purchased from Guangdong Medical Experimental Animal Center.

Experimental Method

CT-26 cells were subjected to multiplication culture and kept in a logarithmic growth state. After the number of cells met the requirement, the cells were digested with trypsin and collected, washed sufficiently with a large amount of PBS twice to remove trypsin and serum components, centrifuged at room temperature and 800 rpm for 10 minutes, and the supernatant was discarded. The cells were resuspended in FBS-free DMEM medium and adjusted to reach a cell concentration of $3 \times 10^7$/mL.

Under aseptic condition, the cell suspension was injected into subcutaneous of back of nude mouse at a dose of 100 µL/needle, one injection per Balb/c mouse. During the injection, 1 mL disposable medical syringe was used to ensure that the position and direction for inserting needle to each mouse was basically the same.

Eight days after cell inoculation, the tumor grew to an average volume of about 100 mm³. The tumor-bearing mice were randomly divided into four groups (9 mice in each group), namely the vehicle control group, the chidamide group (25 mg/kg, intragastric administration, once per day), Example 3 group (20 mg/kg, intragastric administration, once per day), and the combination of Chidamide and Example 3 group, and then the mice were raised in cages after labeling, the mice was administered according to groups and observed for tumor formation every day. The body weight of each mouse was weighted before administration, and the dose was calculated according to per kilogram of body weight, that was, 10 µL of CMC-Na solution per gram of body weight for the vehicle control group, 10 µL of 2.5 mg/mL Chidamide-CMC-Na suspension per gram of body weight for the chidamide group (25 mg/kg), 10 µL of 2 mg/mL the compound of Example 3-CMC-Na suspension per gram of body weight for the Example 3 group (20 mg/kg), and 10 µL of CMC-Na suspension containing 2.5 mg/ml chidamide and 2 mg/ml the compound of Example 3 per gram of body weight for the combination group were administered intragastrically. The longest diameter of tumor (length) and the widest diameter (width) perpendicular thereto were measured by vernier caliper every 2 days, and the tumor volume was calculated by the formula TS=length×(width)²/2 and recorded. Each mouse was intragastrically administered once per day at regular time; after the last administration on the $17^{th}$ day, the mice were sacrificed and the tumors of tumor-bearing mice were stripped and weighed with a meter.

The relative tumor inhibition rate of each administration group was calculated according to the following formula:

Relative tumor inhibition rate=(average tumor volume of the vehicle control group−average tumor volume of the administration group)/average tumor volume of the vehicle control group×100%

Experimental Results

Figure 5:
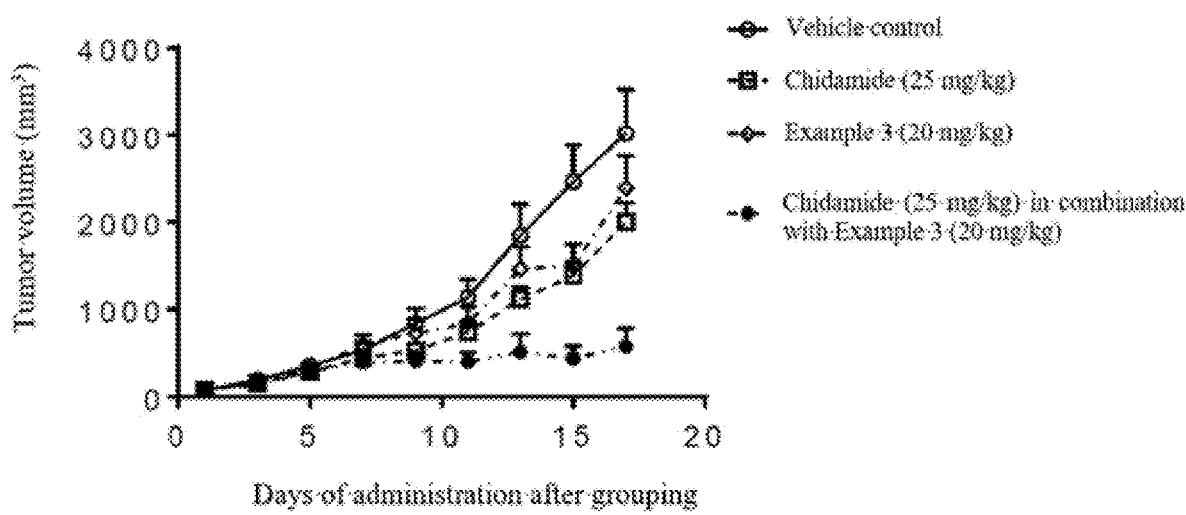
FIG. 5 shows the growth inhibition curve of Chidamide in combination with Example 3 on CT-26 tumor in mice.
Figure 6:
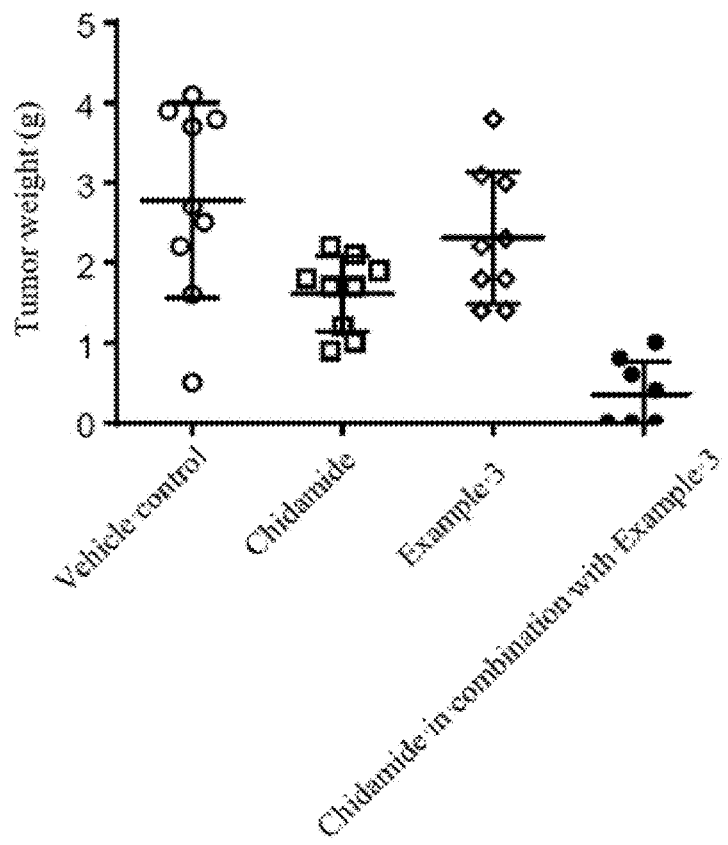
FIG. 6 shows the weight inhibition of Chidamide in combination with Example 3 on CT-26 tumor in mice.

As shown in FIG. 5 and Table 7, compared with the vehicle control group, both of the Chidamide group (25 mg/kg) and the Example 3 group (20 mg/kg) as two single-drug groups showed certain inhibition on tumor volume of mice, and the tumor inhibition rates were 33% and 20%, respectively; while the final relative tumor inhibition rate of the combination group (80%) was significantly higher than the sum of the inhibition rates of the two single-drug groups. As shown in FIG. 6, compared with the average tumor weight of 2.7 g of the vehicle group, the average tumor weights of the Chidamide group and the Example 3 group as single-drug groups were 1.6 g and 2.3 g, respectively, which showed certain inhibition; while the average tumor weight of the combination group was only 0.35 g, which was significantly smaller than the two single-drug groups. The above results showed that Chidamide and IDO inhibitor have good synergistic anti-tumor activity in tumor-bearing mice.

TABLE 7

Relative tumor inhibition rate of chidamide and the compound of Example 3 alone and in combination

|  | Chidamide | Example 3 | Combination of two drugs |
|---|---|---|---|
| Relative tumor inhibition rate (%) | 33.6 | 20.1 | 80.8 |

Figure 7:
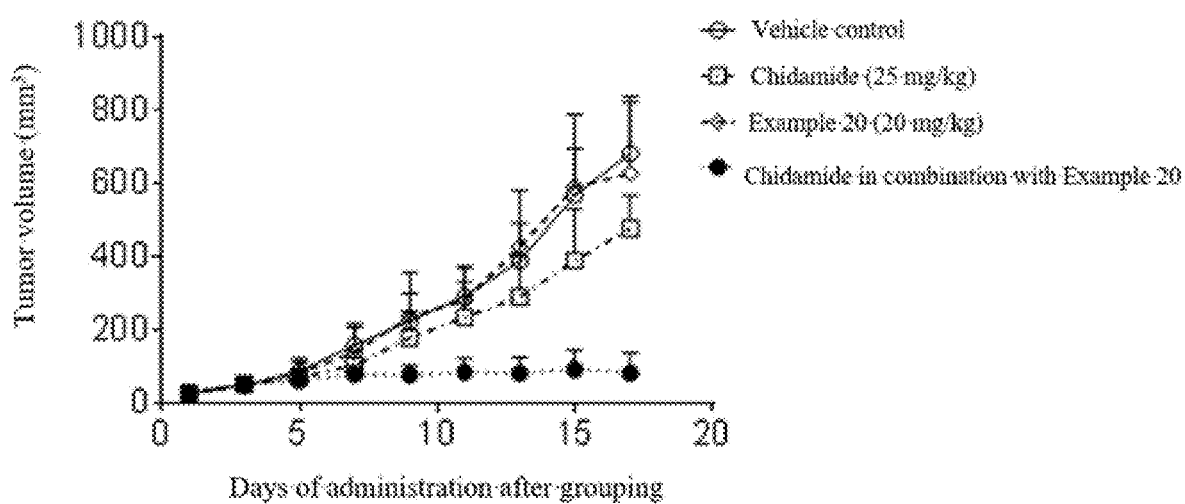
FIG. 7 shows the growth inhibition curve of Chidamide in combination with Example 20 on CT-26 tumor in mice.

Example 94: Efficacy Experiment of Chidamide in Combination with Example 20 on Balb/c Mouse CT-26 Tumor Model The method similar to that of Example 93 was applied. The experimental results obtained were shown in FIG. 7 and Table 8.

TABLE 8

Relative tumor inhibition rate of chidamide and the compound of Example 20 alone and in combination

|  | Chidamide | Example 20 | Combination of two drugs |
|---|---|---|---|
| Relative tumor inhibition rate (%) | 30 | 8.3 | 87.7 |

Figure 8:
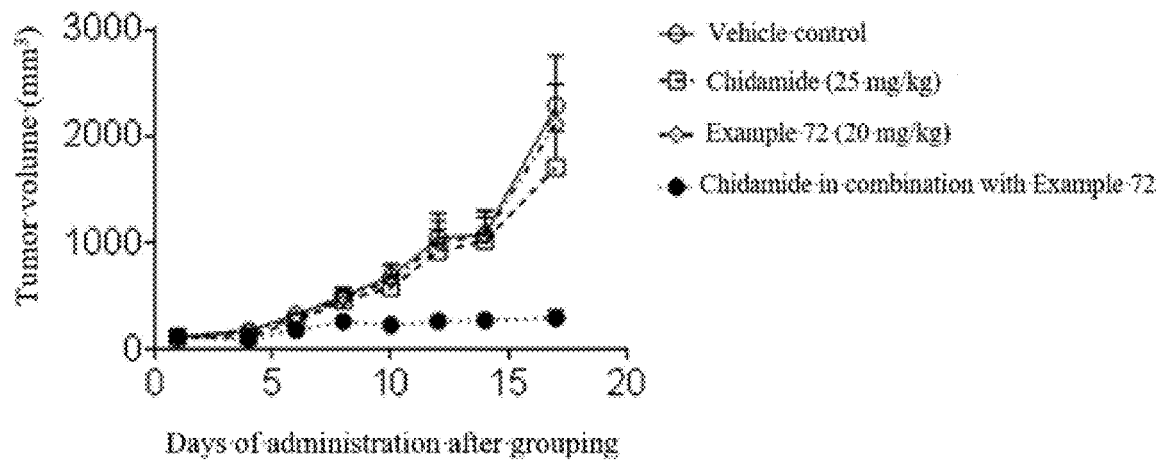
FIG. 8 shows the growth inhibition curve of Chidamide in combination with Example 72 on CT-26 tumor in mice.

Example 95: Efficacy Experiment of Chidamide in Combination with Example 72 on Balb/c Mouse CT-26 Tumor Model The method similar to that of Example 93 was applied. The experimental results obtained were shown in FIG. 8 and Table 9.

TABLE 9

Relative tumor inhibition rate of chidamide and the compound of Example 72 alone and in combination

|  | Chidamide | Example 72 | Combination of two drugs |
|---|---|---|---|
| Relative tumor inhibition rate (%) | 25.4 | 7.6 | 86.9 |

Figure 9:
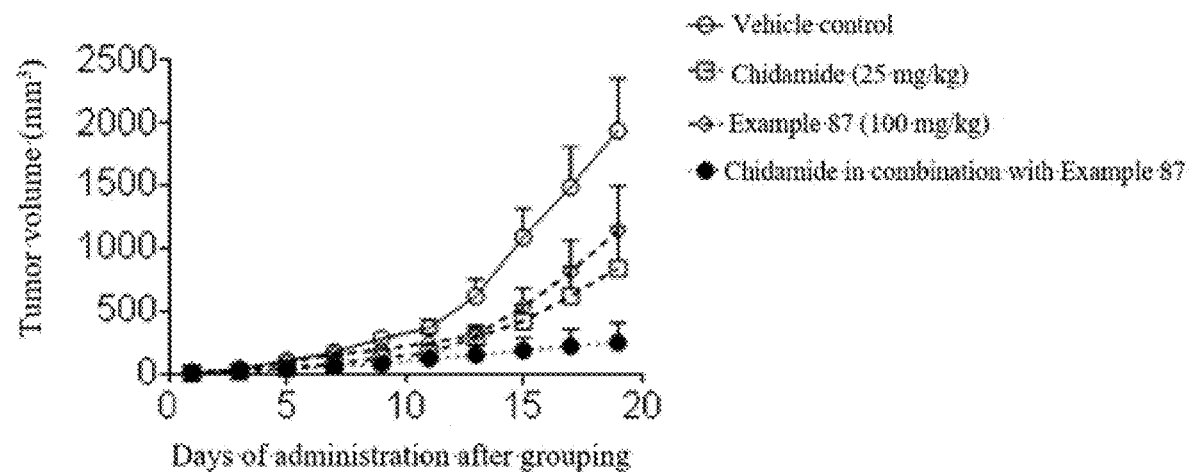
FIG. 9 shows the growth inhibition curve of Chidamide in combination with Example 87 on CT-26 tumor in mice.

Example 96: Efficacy Experiment of Chidamide in Combination with Example 87 on Balb/c Mouse CT-26 Tumor Model The method similar to that of Example 93 was applied. The experimental results obtained were shown in FIG. 9 and Table 10.

TABLE 10

Relative tumor inhibition rate of chidamide and the compound of Example 87 alone and in combination

|  | Chidamide | Example 87 | Combination of two drugs |
|---|---|---|---|
| Relative tumor inhibition rate (%) | 55 | 45 | 89.8 |

Example 97: hERG Inhibitory Activity Assay (Patch Clamp Method)

Non-cardiac drugs may cause the prolongation of myocardial action potential duration by inhibiting the hERG (IKr) channel, increasing the possibility of life-threatening torsade de pointes (TdP) ventricular arrhythmia. In this experiment, HEK293 cell line without endogenous IKr current was used as host cell (this cell line was widely used in the detection of hERG) to evaluate the cardiotoxicity of Example 85 in patent CN108203438A and Example 87 of the present application.

1. Cell Culture (1) HEK293 cell line stably expressing hERG potassium channel was cultured in DMEM medium containing 10% fetal bovine serum and 0.8 mg/mL G418 under the condition of 37° C. and 5% $CO_2$.

(2) Cell passage: the old medium was removed, the cell was washed with PBS for one time, then 1 mL of TrypLE™ Express solution was added, and incubated at 37° C. for 0.5 minutes. When the cells were detached from the bottom of the dish, 5 mL of complete medium preheated at 37° C. was added. The cell suspension was gently blown and beaten by pipette for dissociation of the aggregated cells. The cell suspension was transferred into a sterile centrifuge tube and centrifuged at 1000 rpm for 5 minutes to collect the cells. After amplifying or maintaining the culture, the cells were inoculated in 6 cm cell-culture dishes at an incubation amount of $2.5*10^5$ cells (final volume: 5 mL) for each cell culture dish.

(3) In order to maintain the electrophysiological activity of cells, the cell density must not exceed 80%.

(4) Patch clamp detection: before the experiment, the cells were separated by TrypLE™ Express, $3*10^3$ cells were spread on the cover glass, cultured in a 24-well plate (final volume: 500 μL); 18 hours later, the detection was performed.

2. Liquid Formulation

The components of the extracellular fluid used in the whole cell patch clamp experiment (mM) were: 140 NaCl; 1 $MgCl_2$; 3.5 KCl; 10 Glucose; 10 HEPES; 1.25 $NaH_2PO_4$ and 2 $CaCl_2$, NaOH was used to adjust pH value to 7.4, and sucrose was used to adjust osmotic pressure value to 300 mOsm.

The components of the intracellular fluid (mM) were: 20 KCl; 115 K-Aspartic; 1 $MgCl_2$; 5 EGTA; 10 HEPES; and 2

Na₂ATP, KOH was used to adjust pH value to 7.2, and sucrose was used to adjust osmotic pressure value to 290 mOsm.

3. Patch Clamp Detection

The voltage stimulation scheme for recording whole-cell hERG potassium current with whole-cell patch clamp was as follows: when a whole-cell seal was formed, the cell membrane voltage was clamped at −80 mV, then the clamp voltage was depolarized from −80 mV to −50 mV and maintained for 0.5 s (used for detection of leakage current), and then stepped to 30 mV and maintained for 2.5 s, and then quickly restored to −50 mV and maintained for 4 s to stimulate the tail current of hERG channel. Data were repeatedly collected every 10 s to observe the effect of drug on the hERG tail current. The stimulation of −50 mV for 0.5 s was used for detection of leakage current. The experimental data were collected by EPC-10 amplifier (HEKA) and stored in PatchMaster (HEKA) software.

A capillary glass tube was drawn into a recording electrode with a microelectrode puller. A microelectrode manipulator was operated under an inverted microscope, the recording electrode was put to contact the cells, and negative pressure suction was conducted to form a GΩ seal. After the GΩ seal was formed, fast capacitance compensation was performed, and then negative pressure was continuously conducted to suck and break cell membrane to form a whole-cell recording mode. Then, slow capacitance compensation was performed, and the membrane capacitance and series resistance were recorded. No leakage compensation was given.

When the hERG current of the whole-cell recording was stabilized, the drug was administered. After each drug concentration was applied for 5 minutes (or until the current was stable), the next concentration was tested, and a plurality of concentrations for each test sample were tested. The cover glass with spread cells was placed in a recording chamber of the inverted microscope, a working fluid of the test sample and the extracellular fluid without the compound were flowed through the recording chamber from low concentration to high concentration by gravity perfusion to act on the cell, and liquid exchange was performed by a vacuum pump during recording. The current detected for each cell in the compound-free extracellular fluid was used as its own control group. A plurality of cells were tested independently. All electrophysiological experiments were performed at room temperature.

The drug concentration was selected as 0.3, 1, 3, 10 and 30 μM.

4. Data Analysis

Firstly, the current after action of each concentration and the current of blank control were normalized $$\left(\frac{\text{Peak tail current compound}}{\text{Peak tail current vehicle}}\right),$$

and then the inhibition rate corresponding to each concentration was calculated $$\left(1 - \frac{\text{Peak tail current compound}}{\text{Peak tail current vehicle}}\right).$$

For each concentration, mean number and standard error were calculated, and the following equation was used to calculate the half inhibitory concentration of each compound:

$$\text{inhibition} = \frac{1}{1 + \left(\frac{IC50}{C}\right)^h}$$

The above equation was used to perform a non-linear fitting of the dose-dependent effect, wherein C represented the concentration of the test sample, IC50 was the half-inhibitory concentration, and h represented the Hill coefficient. The curve fitting and the calculation of IC50 were performed using IGOR software.

According to the above-mentioned experimental method, the hERG inhibition EC50 value of Example 85 in patent CN108203438A was determined, and the EC50 value was 1.9 uM. The hERG inhibition EC50 value of Example 87 of the present application was 4.6 uM.

Although the specific embodiments of the present invention have been described in detail, according to all the teachings that have been disclosed, those skilled in the art can make various modifications and substitutions to the details of the technical solutions of the present invention, and these changes are all within the protection scope of the present invention. The full scope of the present invention is given by the appended claims and any equivalents thereof.

What is claimed is:

1. A compound or a pharmaceutically acceptable salt thereof, wherein the compound is selected from the group consisting of

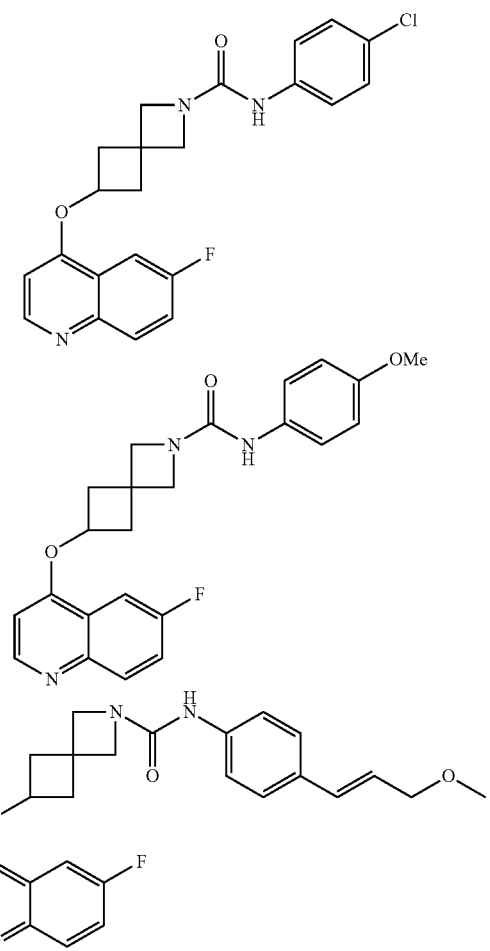

-continued

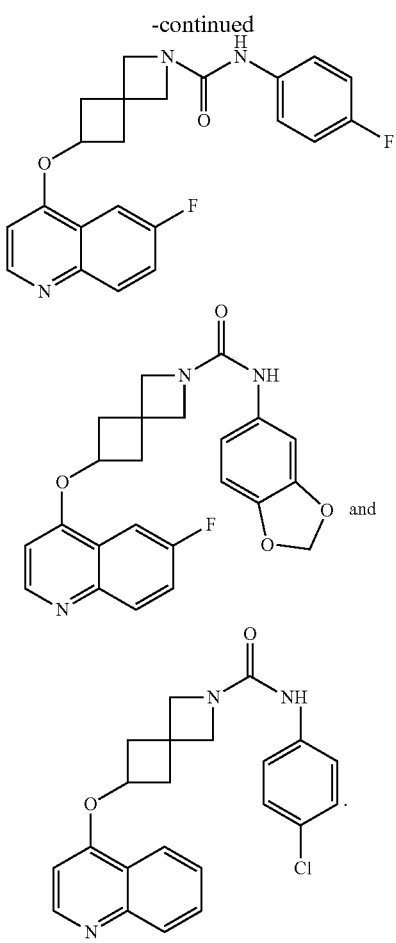

2. A pharmaceutical composition, comprising the compound or pharmaceutically acceptable salt thereof according to claim 1, and at least one pharmaceutically acceptable carriers or excipients.

3. The pharmaceutical composition according to claim 2, wherein the compound is N-(4-chlorophenyl)-6-((6-fluoroquinolin-4-yl)oxy)-2-aza-spiro[3.3]heptan-2-carboxamide or N-(benzo[d][1,3]dioxol-5-yl)-6-((6-fluoroquinolin-4-yl)oxy)-2-aza-spiro[3.3]heptan-2-carboxamide.

4. A compound or a pharmaceutically acceptable salt thereof, wherein the compound is:

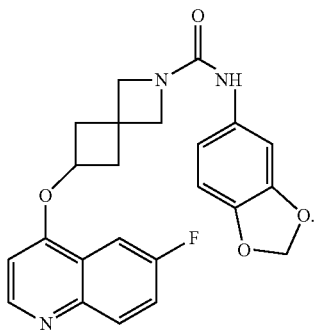 [SMILES: O=C(Nc1ccc2c(c1)OCO2)N1CC2(CC(Oc3ccnc4ccc(F)cc34)C2)C1]

5. A pharmaceutical composition, comprising the compound or pharmaceutically acceptable salt thereof according to claim 4, and at least one pharmaceutically acceptable carriers or excipients.

* * * * *